(12) United States Patent
Frees et al.

(10) Patent No.: US 6,769,013 B2
(45) Date of Patent: Jul. 27, 2004

(54) DISTRIBUTED SYSTEM FOR INTERACTIVE COLLABORATION

(75) Inventors: Lewis Frees, Bethesda, MD (US); Ann Frees, Bethesda, MD (US)

(73) Assignee: E-Wings, Inc., Bethesda, MD (US)

( * ) Notice: Subject to any disclaimer, the term of this patent is extended or adjusted under 35 U.S.C. 154(b) by 203 days.

(21) Appl. No.: 10/062,396

(22) Filed: Feb. 2, 2002

(65) Prior Publication Data

US 2003/0149681 A1 Aug. 7, 2003

(51) Int. Cl.[7] .......................... G06F 15/16; G06F 17/30
(52) U.S. Cl. .......................... 709/205; 707/10; 707/201
(58) Field of Search .................... 707/10, 201; 709/205

(56) References Cited

U.S. PATENT DOCUMENTS

| | | |
|---|---|---|
| 5,729,687 A | 3/1998 | Rothrock et al. |
| 5,799,191 A | 8/1998 | Moriyasu et al. |
| 5,854,893 A | 12/1998 | Ludwig et al. |
| 5,941,945 A | 8/1999 | Aditham et al. |
| 5,983,214 A | 11/1999 | Lang et al. |
| 5,995,951 A | 11/1999 | Ferguson |
| 6,078,924 A | 6/2000 | Ainsbury et al. |
| 6,336,134 B1 | 1/2002 | Varma |

*Primary Examiner*—Jack Choules
(74) *Attorney, Agent, or Firm*—Hamilton, Brook, Smith & Reynolds, P.C.

(57) ABSTRACT

A distribution management system can facilitate synchronous and asynchronous communications, take advantage of electronic scheduling tools, support a facilitator paradigm, and store meeting communications for later retrieval. The system can create a collaborative environment for members of a team in communication with a computer network. An interactive forum can be provided in the collaborative environment in a manner offering varying degrees of structure for collecting information from the members of the team. The information can then be used to arrive at a collaboratively derived decision.

32 Claims, 98 Drawing Sheets

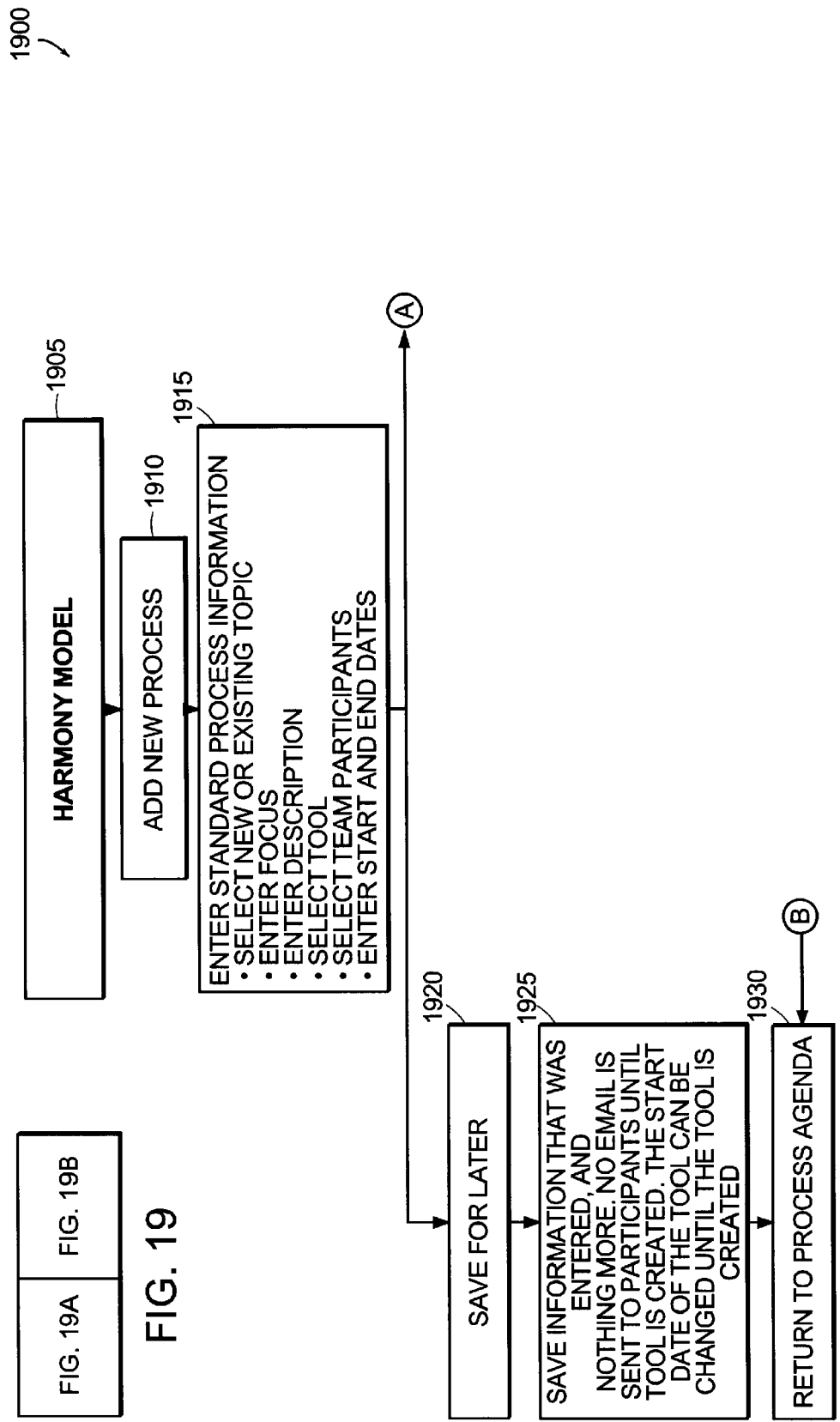

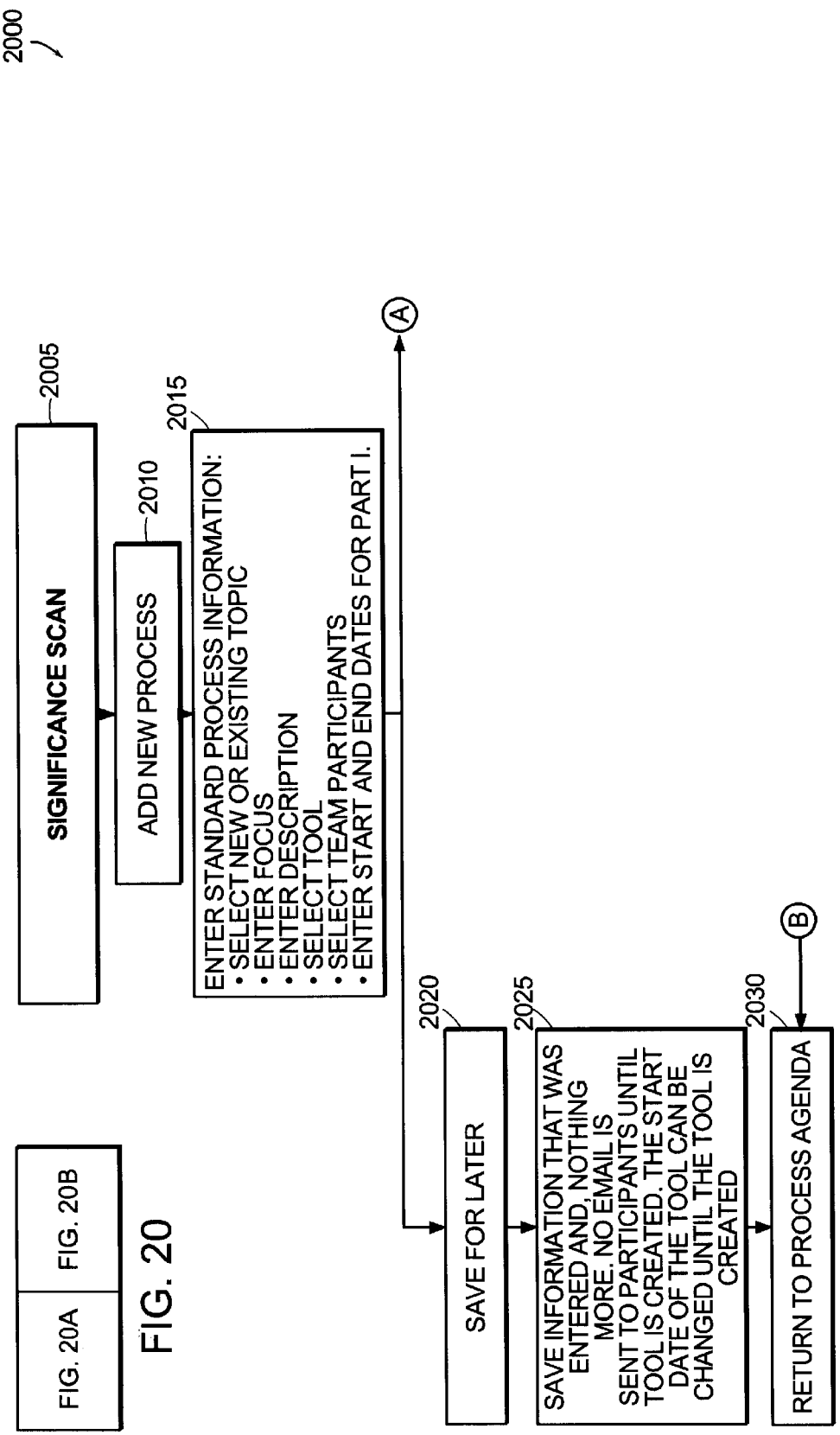

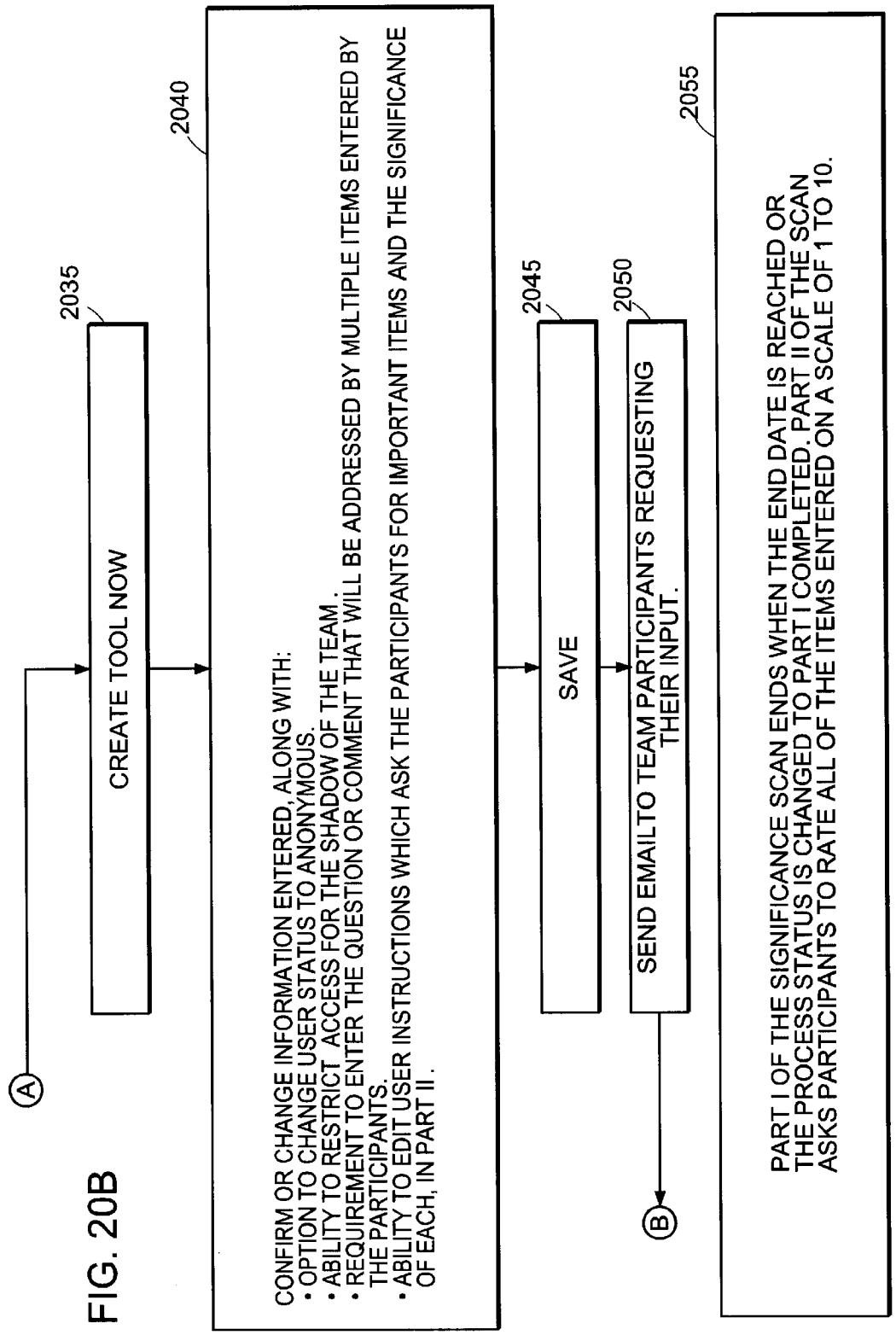

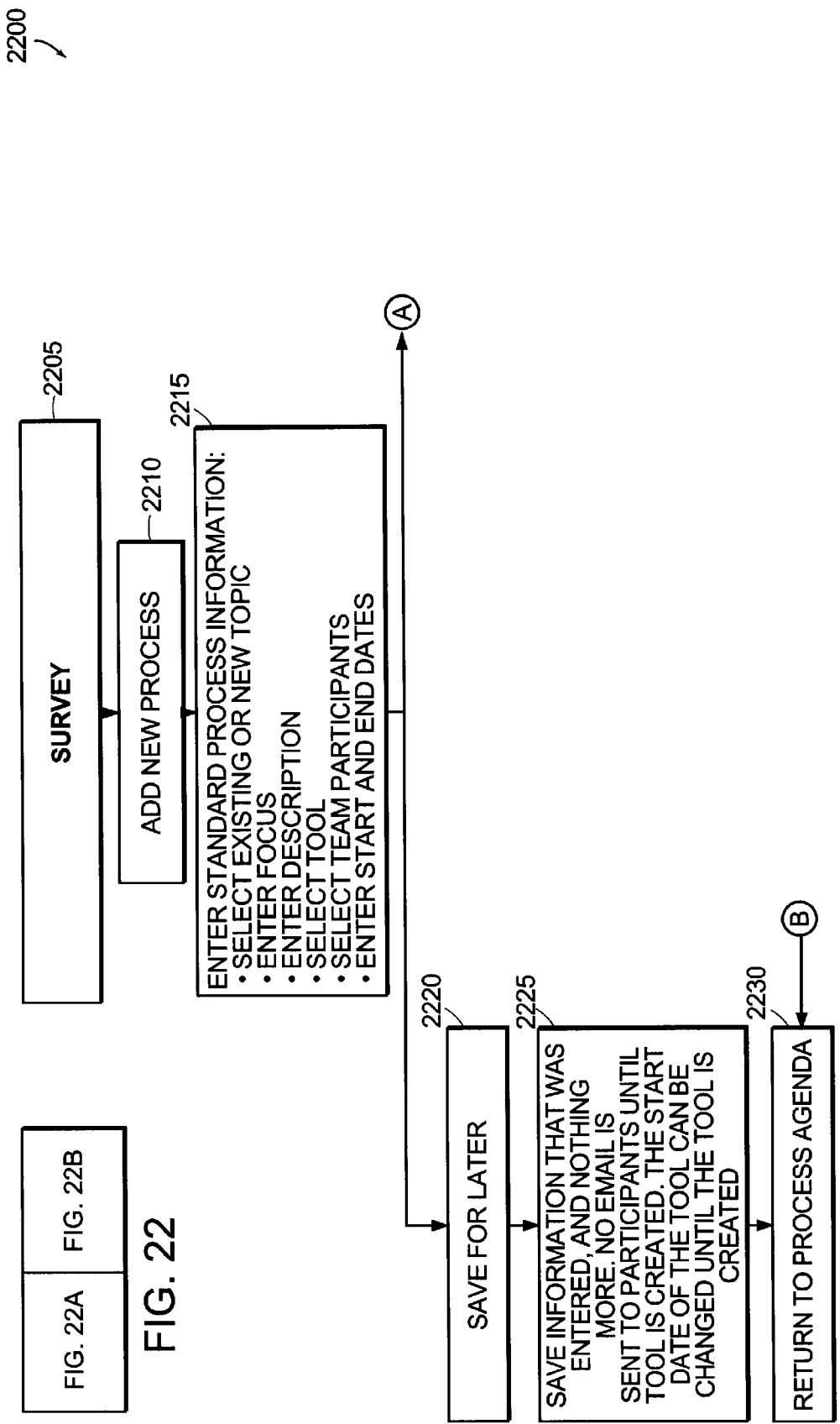

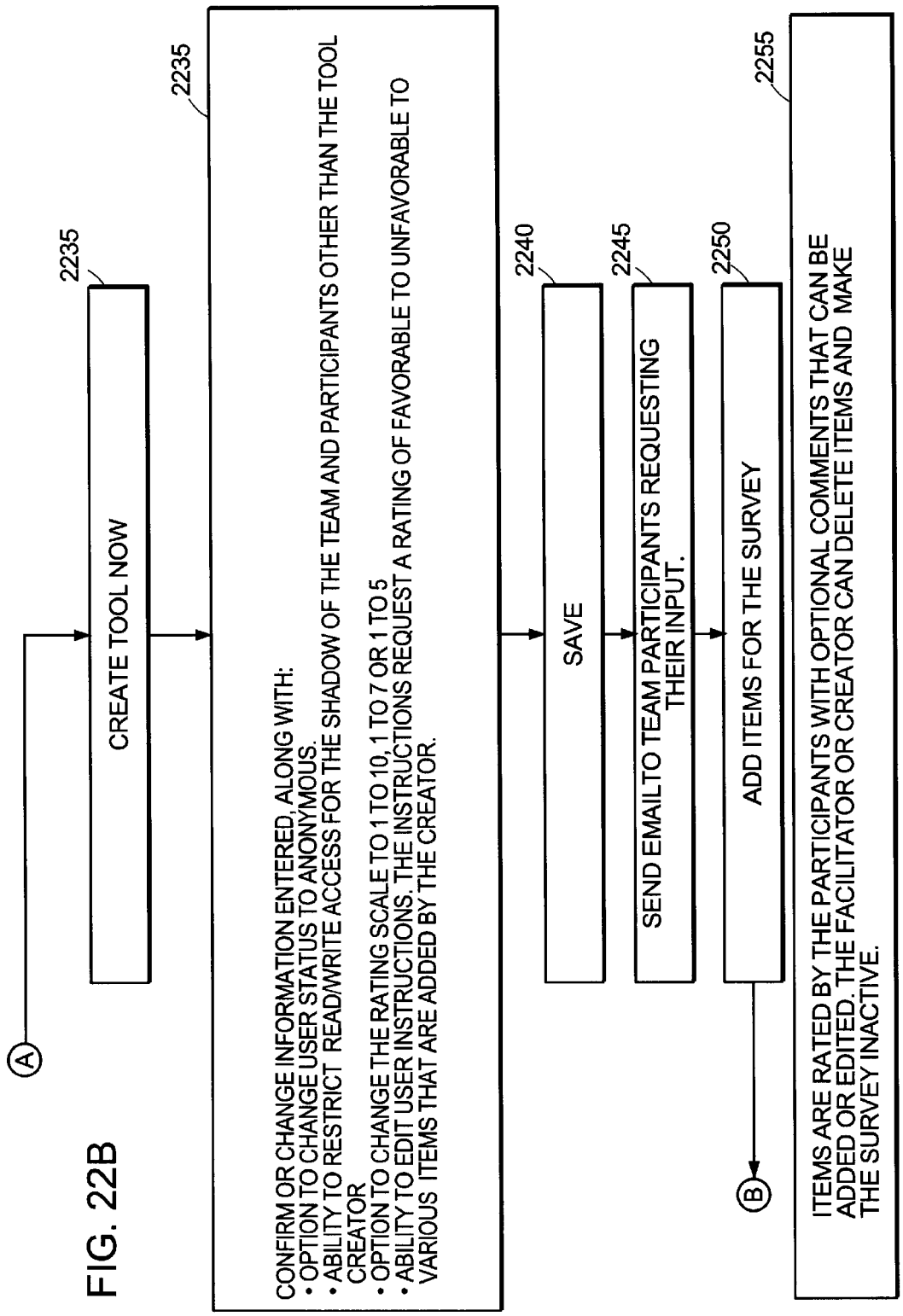

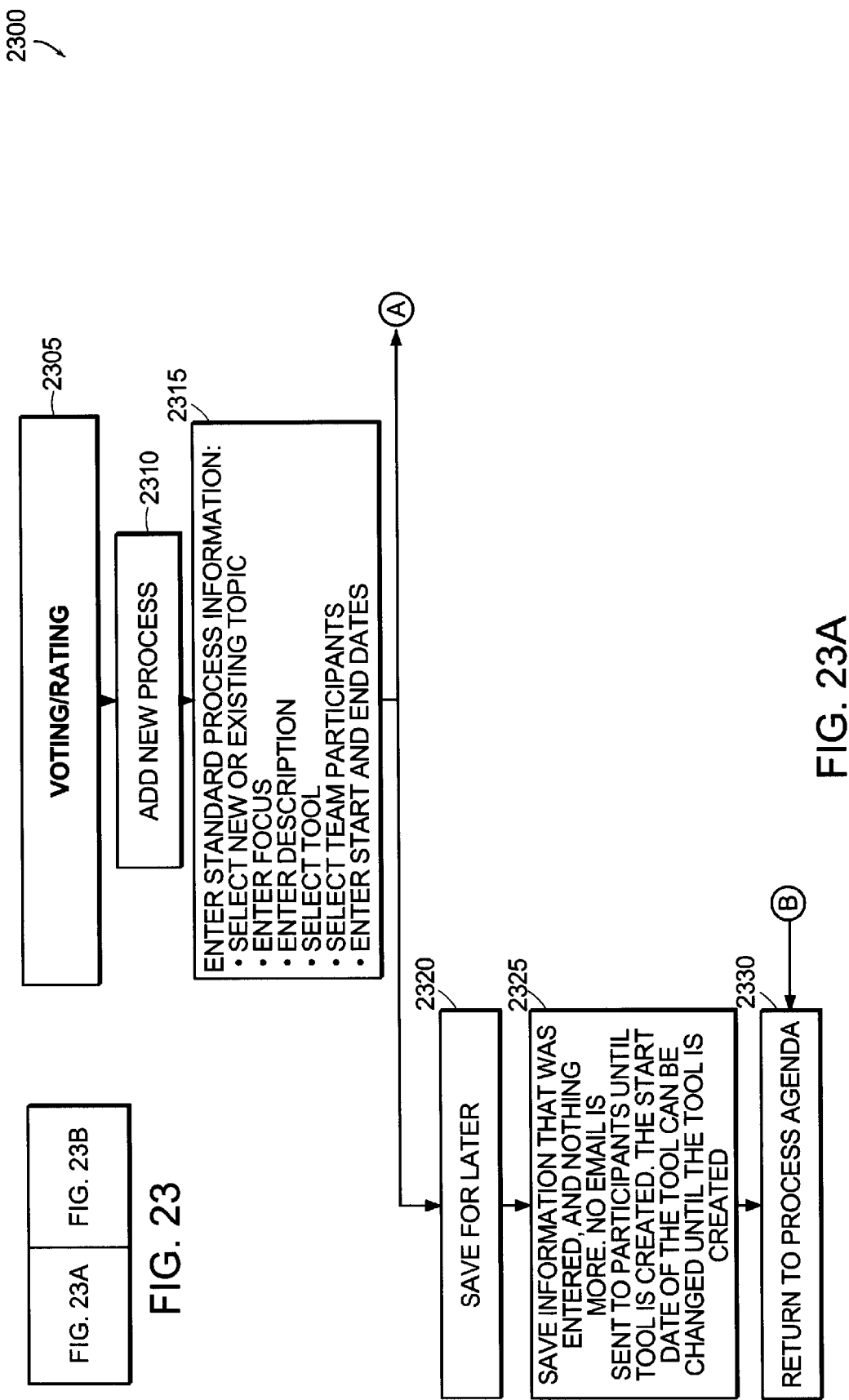

*e-Wings*

| Mail | Help | Contact Us |

- Home Page
- Team Page
- Define the Work
- Build the Team
- Have Conversations
- Analyze/Make Decisions
- Coordinate Action/Workflow
- Info / Knowledge Mgt.

WELCOME!

Number of visitors since your last visit: 2
To access your teams Process Agenda, click on 'Define the Work'.

2600

Team Information

Team Name: Balloon Promotion

Creation Date: 1/29/02

Created By: Cameron Lindstrom

Members : Genvieve Heyerdahl
Cameron Lindstrom
Rod Lundquist
Mark Svenson

Mission/Purpose
The mission of this team is to come up with new balloons and arrangements that will promote our store.

Norms
• Special vendor requests are allowed. • Build on each others thoughts.• Nothing complicated for our sales staff.

Vision
At the end of this promotion we will experience increased sales of our regular merchandise.

News Flashes

**Conversation:
Unread Thoughts**

✗ Focus: Conversation Harmony Model - Balloon Displays-Window
Posted by: Cameron Lindstrom
Posted on: 1/30/02 9:31:1.

What's Working

✗ Focus: Conversation Harmony Model - Balloon Displays-Window
Posted by: Cameron Lindstom
Posted on: 1/30/02 9:31:1.

What's Not Working

Define the Work> *Process Agenda*

2805

Balloon Promotion

The Process Agenda provides an overview of the team's online work.

Flashing lights indicate a request for your input.

( Instructions )

Outcomes: • Ideas for new balloons • Ideas for new arrangements • Gifts for community organizations

2600

Background: We currently sell cartoon character, birthday, wedding and holiday balloons in rubber and Mylar. It is time for a change!

2800

| Add Topic | Add New Process | Attachments | Restore from Archived |

| Topic | Focus | Process | Who | Starting Date | Closing Date |
|---|---|---|---|---|---|
| △ Balloon Displays | Window Display | Harmony Model-Part 1, Here and Now | All | 1/30/02 | 2/6/02 |
| △ Vendor Requests | Ideas for Different Balloons | Significance Scan-Part 1, Adding Items | All | 1/29/02 | 2/10/02 |

Sidebar:
- Home Page
- Team Page
- Define the Work
- Build the Team
- Have Conversations
- Analyze / Make Decisions
- Coordinate Action / Workflow
- Info / Knowledge Mgt.
- Log Out Top bar: Print | Mail | Help | Contact Us e-Wings — Action Manager

FIG. 28 e-Wings

| Mail | Help | Contact Us |

Action Manager
- Significance Scan
- Significance Test
- Voting/ Rating
- Survey

- ☐ Home Page
- ☐ Team Page
- ☐ Define the Work
- ☐ Build the Team
- ☐ Have Conversations
- ☐ Analyze / Make Decisions
- ☐ Coordinate Action / Workflow
- ☐ Info / Knowledge Mgt.
- ☐ Log Out

Process Agenda> Significance Scan >

Balloon Promotion

PART I

Focus: Ideas for Different Balloons

Description: This significance scan will collect possible requests that we can make for different, more innovative balloons.

Starting Date: 1/29/02   Closing Date: 2/10/02   Input: Identified

Purpose: This Significance Scan allows a team to identify the most important that need to be addressed and the relative importance of each to identify the items or areas related to the question for your input.

( Instructions )

Question: What kinds of balloons or balloon arrangements do you think would be popular with our customers? This includes balloons that do not exist.

| Add Item | Delete | Results | Attachments | Back |

Input Items

☐ Write-on balloons — View History
☐ Mylar balloons with yellow ribbons. — View History
☐ Fruit and Candy shapes. — View History

FIG. 32 e-Wings

Print | Mail | Help | Contact Us

Action Manager
Process Agenda

Define the Work > Process Agenda

- Home Page
- Team Page
- Define the Work
- Build the Team
- Have Conversations
- Analyze / Make Decisions
- Coordinate Action / Workflow
- Info / Knowledge Mgt.
- Log Out

Balloon Promotion

The Process Agenda provides an overview of the team's online work.

Flashing lights indicate a request for your input.

( Instructions )

Outcomes: • Ideas for new balloons • Ideas for new arrangements • Gifts for community organizations Background: We currently sell cartoon character, birthday, wedding and holiday balloons in rubber and Mylar. It is time for a change!

| Add Topic | Add New Process | Attachments | Restore from Archived |

| Topic | Focus | Process | Who | Starting Date | Closing Date |
|---|---|---|---|---|---|
| △ Balloon Displays | Window Display | Harmony Model-Part 1, Here and Now | All | 1/30/02 | 2/6/02 |
| △ Vendor Requests | Ideas for Different Balloons | Significance Scan-Part 2, Rating Items | All | 1/30/02 | 2/6/02 |

FIG. 34

From: Cameron Lindstrom
Sent: Wednesday, January 30, 2002 12:30 PM
To: Genvieve Heyerdahl; Cameron Lindstrom; Rod Lundquist; Mark Svenson
Subject: e-Wings: Part II of Significance Scan (Ideas for Different Balloons) opened for the 'Balloon Promotion' team.

Part II of the Significance Scan (Ideas for Different Balloons) has been created. You may add input starting January 30, 2002. You may review the ratings submitted by team members and edit your ratings until the closing date of February 06, 2002.

Please visit e-Wings at http://dev.e-wings.net

FIG. 35 e-Wings

Mail | Help | Contact Us

Action Manager

- Home Page
- Team Page
- Define the Work
- Build the Team
- Have Conversations
- Analyze / Make Decisions
- Coordinate Action / Workflow
- Info / Knowledge Mgt.
- Log Out Process Agenda > Significance Scan > *Input*

Balloon Promotion

PART II
Focus: Ideas for Different Balloons

Description: This significance scan will collect possible requests that we can make for different, more innovative balloons.

Part II Starting Date: 1/30/02   Part II Closing Date: 2/6/02   Input: Identified Question: What kinds of balloons or balloon arrangements do you think would be popular with our customers? This includes balloons that do not exist.

Below are the items or areas which team members have identified and your facilitator has revised. Please rate these items on a scale of 1-10. Ten indicates high importance; one indicates low importance.

( Instructions )

To save changes made on this page, you must click on 'Save' before navigating

| Results | Save | Attachments | Back to Revised Item | Original Items |

| Item: | Rating: |
|---|---|
| Balloons that look and are shaped like candy, fruit and vegetables. | [▼] |
| Balloons with a scratch-and-sniff patch. | [▼] |
| Coupons included with balloons. | [▼] |
| Design that coordinates with party papers. | [▼] |
| Write-on balloons. | [▼] |
| Write-on balloons with special pen. | [▼] |
| Mylar balloons with yellow ribbons. | [▼] |
| Fruit and Candy shapes. | [▼] |
| String licorice for the string. | [▼] |

FIG. 36 e-Wings

Mail | Help | Contact Us

Action Manager
- Significance Scan
- Significance Test
- Voting/ Rating
- Survey Process Agenda > Significance Scan > *Input*

Balloon Promotion

- ☐ Home Page
- ☐ Team Page
- ☐ Define the Work
- ☐ Build the Team
- ☐ Have Conversations
- ☐ Analyze / Make Decisions
- ☐ Coordinate Action / Workflow
- ☐ Info / Knowledge Mgt.
- ☐ Log Out

PART II

Focus: Ideas for Different Balloons

Description: This significance scan will collect possible requests that we can make for different, more innovative balloons.

Part II Starting Date: 1/30/02   Part II Closing Date: 2/6/02   Input: Identified Question: What kinds of balloons or balloon arrangements do you think would be popular with our customers? This includes balloons that do not exist.

Below are the items or areas which team members have identified and your facilitator has revised. Please rate these items on a scale of 1-10. Ten indicates high importance; one indicates low importance.

( Instructions )

To save changes made on this page, you must click on 'Save' before navigating     3700

| Results | Save | Attachments | Back to Revised Item | Original Items |

| Item: | Rating: |
|---|---|
| Balloons that look and are shaped like candy, fruit and vegetables. | 3 |
| Balloons with a scratch-and-sniff patch. | 10 |
| Coupons included with balloons. | 5 |
| Design that coordinates with party papers. | 6 |
| Write-on balloons. | 8 |
| Write-on balloons with special pen. | 7 |
| Mylar balloons with yellow ribbons. | 5 |
| Fruit and Candy shapes. | 4 |
| String licorice for the string. | 8 |

FIG. 37

*Significance Scan / Rating*

Balloon Promotion

| Back | ╱ 3800

Thank you! Your input has been submitted.

FIG. 38 e-Wings

[Print] [Mail] [Help] [Contact Us]

Action Manager

- Significance Scan
- Significance Test
- Voting/ Rating
- Survey

Sidebar:
- ☐ Home Page
- ☐ Team Page
- ☐ Define the Work
- ☐ Build the Team
- ☐ Have Conversations
- ☐ Analyze / Make Decisions
- ☐ Coordinate Action / Workflow
- ☐ Info / Knowledge Mgt.
- ☐ Log Out Process Agenda > Significance Scan > *Results*

Balloon Promotion

PART II

Focus: Ideas for Different Balloons

Description: This significance scan will collect possible requests that we can make for different, more innovative balloons.

Part II Starting Date: 1/30/02  Part II Closing Date: 2/6/02

Input: Identified

Question: What kinds of balloons or balloon arrangements do you think would be popular with our customers? This includes balloons that do not exist

3900

| Items | Mean | Median | High | Low |
|---|---|---|---|---|
| Balloons with a scratch-and-sniff patch. | 10 | 10 | 10 | 10 |
| Write-on balloons. | 8.5 | 8.5 | 9 | 8 |
| Write-on balloons with special pen. | 8.5 | 8.5 | 10 | 7 |
| Fruit and Candy shapes. | 6.5 | 6.5 | 9 | 4 |
| Design that coordinates with party papers. | 6 | 6 | 6 | 6 |
| String licorice for the string. | 6 | 6 | 8 | 4 |
| Mylar balloons with yellow ribbons. | 5.5 | 5.5 | 6 | 5 |
| Balloons that look and are shaped like candy, fruit and vegetables. | 4.5 | 4.5 | 6 | 3 |
| Coupons included with balloons. | 4.5 | 4.5 | 5 | 4 |

[Edit] [Attachments] [Original Items] [Back]

| | | | |
|---|---|---|---|
| Balloons that look and are shaped like candy, fruit and vegetables. | View History | Mark Svenson 3 | Cameron Lindstrom 6 |
| Balloons with a scratch-and-sniff patch. | View History | Mark Svenson 10 | Cameron Lindstrom 10 |
| Coupons included with balloons. | View History | Mark Svenson 5 | Cameron Lindstrom 4 |
| Design that coordinates with party papers. | View History | Mark Svenson 6 | Cameron Lindstrom 6 |
| Write-on balloons. | View History | Mark Svenson 8 | Cameron Lindstrom 9 |
| Write-on balloons with special pen. | View History | Mark Svenson 7 | Cameron Lindstrom 10 |
| Mylar balloons with yellow ribbons. | View History | Mark Svenson 5 | Cameron Lindstrom 6 |
| Fruit and Candy shapes. | View History | Mark Svenson 4 | Cameron Lindstrom 9 |
| String licorice for the string. | View History | Mark Svenson 8 | Cameron Lindstrom 4 |

From: Cameron Lindstrom
Sent: Wednesday, January 30, 2002 12:39 PM
To: Genvieve Heyerdahl; Cameron Lindstrom; Rod Lundquist; Mark Svenson
Subject: e-Wings: Part II of Significance Scan (Ideas for Different Balloons) completed and results available for the 'Balloon Promotion' team.

Part II of the Significance Scan (Ideas for Different Balloons) has been completed and both the original and revised results are available.

Please visit e-Wings at http://dev.e-wings.net

FIG. 40

Action Register

Balloon Promotion

( Instructions )

When you have completed an item, you may either click on 'Save and New' to save this item and input another item or you may click on 'Save and Close' to complete your adding of items. When you click on 'Save and Close' you will be given an option to send an e-mail announcement of the last Action Register item added. You will only have the option of sending an e-mail if you click on 'Save and Close'. If you wish to send an e-mail announcement of previously entered items, you may utilize the 'Mail' button located at the top of most e-Wings pages.

Due Date: [Jan ▼] [30 ▼] 2002

Status: [Pending ▼]

Permissions: Currently set to default View/Change

Who :
Check here if the Who is all the team members ☐

Or

Select Who from the left list

| ·········· Select Who ·········· | | ···· Who for this process ···· |
| Genvieve Heyerdahl | > | |
| Cameron Lindstrom | | |
| Rod Lundquist | < | |
| Mark Svenson | | |

[ Save and New ] [ Save and Close ] [ Close ]

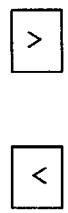

Spelling Check

| Call vendor about getting locorice strings. |

[Change] [Ignore] [Done]

Enter new Spelling [                    ]

Spell check complete!

(Instructions)

*Action Register*

Balloon Promotion

[Done] ⟋ 4400

Thank you! Your input has been submitted.
An Action Item e-mail notification has been sent.

e-Wings

[Print] [Mail] [Help] [Contact Us]

Action Manager
- Action Register
- Reminders

*Coordinate Action/Workflow >*
*Action Register*
Balloon Promotion

- ☐ Home Page
- ☐ Team Page
- ☐ Define the Work
- ☐ Build the Team
- ☐ Have Conversations
- ☐ Analyze / Make Decisions
- ☐ Coordinate Action / Workflow
- ☐ Info / Knowledge Mgt.
- ☐ Log Out Purpose: The Action Register allows the team to keep track of what needs to be done, when it needs to be done and who needs to do it.

[Instructions]

[Add Item]      ⟋4500

| Activity | Who | Due Date | Status | Created By | Date Created | View History |
|---|---|---|---|---|---|---|
| Call the vendor about getting licorice strings. | Mark Svenson | 1/30/02 | Pending | Mark Svenson | 1/30/02 | View |
| Get scratch and sniff. | Cameron Lindstrom | 1/30/02 | Pending | Mark Svenson | 1/30/02 | View |

FIG. 45

From: Mark Svenson

Sent: Wednesday, January 30, 2002 12:45 PM

To: Mark Svenson

Subject: e-Wings: Action Item Assignment for the 'Balloon Promotion'

You have been assigned the Action Item (Call the vendor about getting licorice strings.) for the 'Balloon Promotion' team. You are to complete this action by January 30, 2002.

Please visit e-Wings at http://dev.e-wings.net

FIG. 46

From: Cameron Lindstrom

Sent: Wednesday, January 30, 2002 9:33 AM

To: Cameron Lindstrom; Rod Lundquist; Mark Svenson

Subject: e-Wings:Harmony Model Created (Window Display) and Here and Now Opened for the 'Balloon Promotion' team.

The Harmony Model (Window Display) has been created. Input for Part I, Here and Now, starts on Wednesday, January 30, 2002. All information must be inputted by Wednesday, February 06, 2002, the closing date. After you have submitted your initial input, you may review the team's input to date and add to or edit your input by the closing date. To provide input, click on the following link: Enter Harmony Model Input Please visit e-Wings at http://dev.e-wings.net

FIG. 47

WELCOME!

Number of visitors since your last visit: 5
To access your teams' Process Agenda, click on 'Define the Work'.

2805

Team Information

2600 Team Name: Balloon Promotion

Creation Date: 1/29/02

Created By: Cameron Lindstrom

Members : Genvieve Heyerdahl
Cameron Lindstrom
Rod Lundquist
Mark Svenson

Mission/Purpose
The mission of this team is to come up with new balloons and arrangements that will promote our store.

Norms
• Special vendor requests are allowed. • Build on each others thoughts.• Nothing complicated for our sales staff.

Vision
At the end of this promotion we will experience increased sales of our regular merchandise.

Sidebar: e-Wings | Home Page | Team Page | Define the Work | Build the Team | Have Conversations | Analyze/Make Decisions | Coordinate Action/Workflow | Info / Knowledge Mgt.

Top bar: Mail | Help | Contact Us

News Flashes

Conversation:
Unread Thoughts

✗Focus: Conversation Harmony Model - Balloon Displays-Window
Posted by: Cameron Lindstrom
Posted on: 1/30/02 9:31:1.

What's Working

✗Focus: Conversation Harmony Model - Balloon Displays-Window
Posted by: Cameron Lindstrom
Posted on: 1/30/02 9:31:1.

What's Not Working

FIG. 48

Harmony Model

Balloon Promotion

You can add a new item here. You can add more later if you want. You can also go back and edit your input later. When you are done with one item you may either click on 'Save and New' to save this item and input another item or you may click on 'Save and Close' to save this item and return to the Previous Page. To go to the Previous Page without Saving Click on 'Done'.

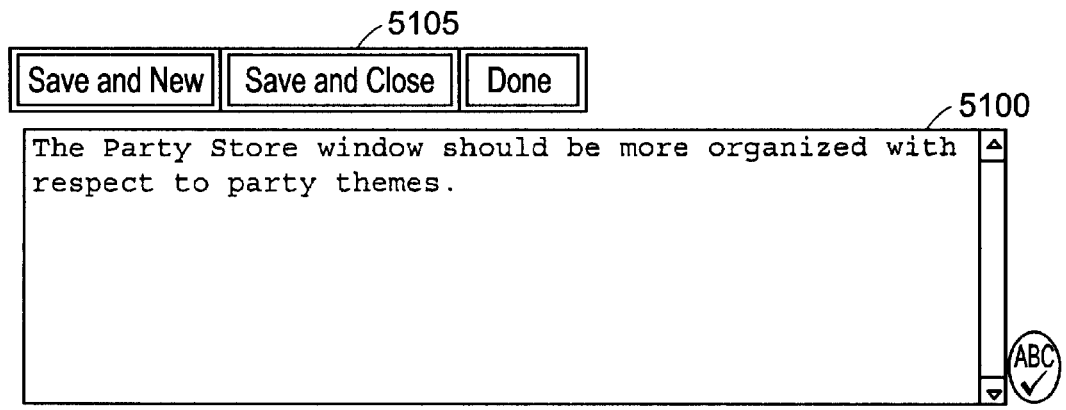

FIG. 51

*Harmony Model*

Balloon Promotion

You can add a new item here. You can add more later if you want. You can also go back and edit your input later. When you are done with one item you may either click on 'Save and New' to save this item and input another item or you may click on 'Save and Close' to save this item and return to the Previous Page. To go to the Previous Page without Saving Click on 'Done'.

| Save and New | Save and Close | Done |

5400

The balloon colors and backdrops are appealing, especially at night with the colored lights illuminating the balloons.

FIG. 54

*e-Wings*

Mail | Help | Contact Us

Action Manager

- ☐ Home Page
- ☐ Team Page
- ☐ Define the Work
- ☐ Build the Team
- ☐ Have Conversations
- ☐ Analyze / Make Decisions
- ☐ Coordinate Action / Workflow
- ☐ Info / Knowledge Mgt.
- ☐ Log Out

**Process Agenda > Harmony Model >
Here and Now > *Input***

Balloon Promotion

Focus: Window Display
Description: Evaluate our current window display and see how it can be improved.
Starting Date: 1/30/02    Closing Date: 2/6/02
Purpose: The Harmony Model is used to create a shared vision or a desired result related to the team as a whole or any aspect of the team's work. The first step is to describe the 'Here and Now' of the team.

( Instructions )

| Here and Now Guidelines | Attachments | Combined Team Input | Back |

Conversation ☐

/—5015

| Add |

What's Not Working

| Items | Edit/Delete |
|---|---|
| The Party Store window should be more organized with respect to party themes. | Edit Delete |
| Deflated balloons are not replaced often enough | Edit Delete |

/—5015

| Add |

What's Working

| Items | Edit/Delete |
|---|---|
| The cartoon balloons get a lot of attention. | Edit Delete |
| Balloon arrangements get requests from customers. | Edit Delete |
| The balloon colors and backdrops are appealing, especially at night with the colored lights illuminating the balloons. | Edit Delete |

FIG. 55 e-Wings

Print | Mail | Help | Contact Us

Action Manager

Process Agenda> Harmony Model >
Here And Now >*Results*

Balloon Promotion

- Home Page
- Team Page
- Define the Work
- Build the Team
- Have Conversations
- Analyze / Make Decisions
- Coordinate Action / Workflow
- Info / Knowledge Mgt.
- Log Out Focus: Window Display Description: Evaluate our current window display and see how it can be improved.

Starting Date: 1/30/02

Closing Date: 1/30/02

Instructions: The purpose of this page is to view the items listed by the team members.
To view the history of the changes made to each item, click on the item.

| Here and Now Guidelines | Attachments | Back | Tools |

5000
Conversation☐
5605

| What's Not Working | | What's Working | |
|---|---|---|---|
| Team Member | Items 5015 | Team Member | Items 5020 |
| Cameron Lindstrom | When red balloons are mixed with pink, they look bad. | Cameron Lindstrom | Whenever we have a cartoon character balloon, customers ask for "the balloon in the window." |
| Cameron Lindstrom | Balloons are left in the window too long and start to look old. | Cameron Lindstrom | Putting the strobe light on the balloons gets a lot of attention. |
| Cameron Lindstrom | Adding peripheral character products with balloons in the window has not made a difference with sales. | Cameron Lindstrom | Playing holiday or cartoon character music has worked. |
| Mark Svenson | The Party Store Window should be more organized with respect to party themes. | Mark Svenson | The cartoon balloons get a lot of attention. |
| Mark | Deflated balloons are | Mark Svenson | Balloon arrangements get requests from customers. |

FIG. 56A

Svenson  not replaced often
         enough
                        Mark
                        Svenson The balloon colors and
backdrops are
appealing, especially at
night with the colored
lights illuminating the
balloons.

From: Cameron Lindstrom
Sent: Wednesday, January 30, 2002 12:54 PM
To: Genvieve Heyerdahl; Cameron Lindstrom; Rod Lundquist; Mark Svenson
Subject: e-Wings:Completion of Here and Now of Harmony Model - Window Display and availability of results for 'Balloon Promotion' team.

Here and Now of the Harmony Model - Window Display has been completed and the results are available. You may view both the original and revised results as edited by the facilitator. To provide input, click on the following link: Enter Harmony Model Input Please visit e-Wings at http://dev.e-wings.net

FIG. 58

From: Cameron Lindstrom
Sent: Wednesday, January 30, 2002 12:54 PM
To: Genvieve Heyerdahl; Cameron Lindstrom; Rod Lundquist; Mark Svenson
Subject: e-Wings:Opening of Vision/Results of the Harmony Model - Window Display for- 'Balloon Promotion' team.

Input for Vision/Results of the Harmony Model - Window Display starts on Wednesday, January 30, 2002. All information must be submitted by Wednesday, February 06, 2002. After you have submitted your initial input, You may review the teams input to date and edit or add to your input until Wednesday, February 06, 2002. To provide input, click on the following link: Enter Harmony Model Input Please visit e-Wings at http://dev.e-wings.net e-Wings

[Print] [Mail] [Help] [Contact Us]

Action Manager

- ☐ Home Page
- ☐ Team Page
- ☐ Define the Work
- ☐ Build the Team
- ☐ Have Conversations
- ☐ Analyze / Make Decisions
- ☐ Coordinate Action / Workflow
- ☐ Info / Knowledge Mgt.
- ☐ Log Out

**Define the Work> *Process Agenda***

Balloon Promotion

The Process Agenda provides an overview of the teams online work.

Flashing lights indicate a request for your input.

(Instructions)

Outcomes: • Ideas for new balloons • Ideas for new arrangements. • Gifts for community organizations Background: We currently sell cartoon character, birthday, wedding and holiday balloons in rubber and Mylar.

It is time for a change!

[Add Topic] [Add New Process] [Attachments] [Restore from Archived]

| Topic | Focus | Process | Who | Starting Date | Closing Date |
|---|---|---|---|---|---|
| △ Balloon Displays | Window Display | Harmony Model-Part 2, Vision/Results | All | 1/30/02 | 2/6/02 |
| Vendor Requests | Ideas for Different Balloons | Significance Scan-Part 2 Completed | All | 1/30/02 | 1/30/02 |

FIG. 59 e-Wings

Mail | Help | Contact Us

Action Manager

Process Agenda> Harmony Model > Vision Results > Input

Balloon Promotion

Focus: Window Display

Description: Evaluate our current window display and see how it can be improved.

Starting Date: 1/30/02   Closing Date: 2/6/02

Category: Overall

Instructions: In the Vision/Results section below, list the desired future related to the category mentioned above. If you could move past the limitations described below and be/have the results that you would like most to be/have, what would you/it be like? Describe the desired future clearly. To review the Vision Guidelines for creating Vision/Results, click on 'Vision Guidelines'.

5000  Conversation  5020

5015

- Home Page
- Team Page
- Define the Work
- Build the Team
- Have Conversations
- Analyze / Make Decisions
- Coordinate Action / Workflow
- Info / Knowledge Mgt.
- Log Out Original Items

| Team Member | What's Not Working |
|---|---|
| Cameron Lindstrom | When red balloons are mixed with pink they look bad. |
| Cameron Lindstrom | Balloons are left in the window too long and start to look old. |
| Cameron Lindstrom | Adding peripheral character products with balloons in the window has not made a difference with sales. |
| Mark Svenson | The Party Store window should be more organized with respect to party themes. |
| Mark Svenson | Deflated balloons are not replaced often enough |

Original Items

| Team Member | What's Working |
|---|---|
| Cameron Lindstrom | Whenever we have a cartoon character balloon, customers ask for "the balloon in the window." |
| Cameron Lindstrom | Putting the strobe light on the balloons gets a lot of attention. |
| Cameron Lindstrom | Playing holiday or cartoon character music has worked. |
| Mark Svenson | The cartoon balloons get a lot of attention. |
| Mark Svenson | Balloon arrangements get requests from customers. |
| Mark Svenson | The balloon colors and backdrops are appealing, especially at night with the colored lights illuminating the balloons. |

| Add | Vision Guidelines | Attachments | Results | Back |

Vision/Results                                                    Edit/Delete

No Vision/Results available.

FIG. 61B e-Wings

Mail | Help | Contact Us

Action Manager

- Home Page
- Team Page
- Define the Work
- Build the Team
- Have Conversations
- Analyze / Make Decisions
- Coordinate Action / Workflow
- Info / Knowledge Mgt.
- Log Out Process Agenda> Harmony Model > Vision Results > *Input*

Balloon Promotion

Focus:   Window Display

Description:   Evaluate our current window display and see how it can be improved.

Starting Date: 1/30/02   Closing Date: 2/6/02
Category:   Overall

Instructions: In the Vision/Results section below, list the desired future related to the category mentioned above. If you could move past the limitations described below and be/have the results that you would like most to be/have, what would you/it be like? Describe the desired future clearly. To review the Vision Guidelines for creating Vision/Results, click on 'Vision Guidelines'.

Conversation

Original Items | Original Items

| Team Member | What's Not Working | Team Member | What's Working |
|---|---|---|---|
| Cameron Lindstrom | When red balloons are mixed with pink they look bad. | Cameron Lindstrom | Whenever we have a cartoon character balloon, customers ask for "the balloon in the window." |
| Cameron Lindstrom | Balloons are left in the window too long and start to look old. | | |
| Cameron Lindstrom | Adding peripheral character products with balloons in the window has not made a difference with sales. | Cameron Lindstrom | Putting the strobe light on the balloons gets a lot of attention. |
| | | Cameron Lindstrom | Playing holiday or cartoon character music has worked. |
| Mark Svenson | The Party Store window should be more organized with respect to party themes. | Mark Svenson | The cartoon balloons get a lot of attention. |
| Mark Svenson | Deflated balloons are not replaced often enough | Mark Svenson | Balloon arrangements get requests from customers. |
| | | Mark Svenson | The balloon colors and backdrops are appealing, especially at night with the colored lights illuminating the balloons. |

FIG. 62A

| Add | Vision Guidelines | Attachments | Results | Back |

Vision/Results                                                    Edit/Delete

Balloons are replaced regularly but the display                   Edit
remains the same for too many days a time                         Delete
which loses customer interest.

FIG. 62B e-Wings

[Print] [Mail] [Help] [Contact Us]

Action Manager

- ☐ Home Page
- ☐ Team Page
- ☐ Define the Work
- ☐ Build the Team
- ☐ Have Conversations
- ☐ Analyze / Make Decisions
- ☐ Coordinate Action / Workflow
- ☐ Info / Knowledge Mgt.
- ☐ Log Out

**Define the Work > *Process Agenda***

Ballon Promotion

The Process Agenda provides an overview of the team's online work.

Flashing lights indicate a request for your input.

( Instructions )

Outcomes: · Ideas for new ballons · Ideas for new arrangements · Gifts for community organizations Background: We currently sell cartoon character, birthday, wedding and holiday ballons in rubber and Mylar. It is time for a change!

[Add Topic] [Add New Process] [Attachments] [Restore from Archived]

| Topic | Focus | Process | Who | Starting Date | Closing Date | Restore |
|---|---|---|---|---|---|---|
| Ballon Displays | Window Display | Harmony Model-Part 3, Shared Vision | All 6500 | 1/30/02 | 2/6/02 | restore |
| Vendor Requests | Ideas for Different Ballons | Significance Scan-Part 2 Completed | All | 1/30/02 | 1/30/02 | restore |

FIG. 65 e-Wings

Print | Mail | Help | Contact Us

Action Manager

- ☐ Home Page
- ☐ Team Page
- ☐ Define the Work
- ☐ Build the Team
- ☐ Have Conversations
- ☐ Analyze / Make Decisions
- ☐ Coordinate Action / Workflow
- ☐ Info / Knowledge Mgt.
- ☐ Log Out

**Define the Work > *Process Agenda***

Ballon Promotion

The Process Agenda provides an overview of the team's online work.

Flashing lights indicate a request for your input.

( Instructions )

Outcomes: · Ideas for new ballons · Ideas for new arrangements · Gifts for community organizations Background: We currently sell cartoon character, birthday, wedding and holiday ballons in rubber and Mylar. It is time for a change!

| Add Topic | Add New Process | Attachments | Restore from Archived |

| Topic | Focus | Process | Who | Starting Date | Closing Date | Restore |
|---|---|---|---|---|---|---|
| Ballon Displays | Window Display | Harmony Model-Part 3, Completed | All | 1/30/02 | 1/30/02 | restore |
| Vendor Requests | Ideas for Different Ballons | Significance Scan-Part 2 Completed | All | 1/30/02 | 1/30/02 | restore |

~6905

FIG. 69 e-Wings

Print | Mail | Help | Contact Us

Action Manager

- Home Page
- Team Page
- Define the Work
- Build the Team
- Have Conversations
- Analyze / Make Decisions
- Coordinate Action / Workflow
- Info / Knowledge Mgt.
- Log Out

**Define the Work > *Process Agenda***

Ballon Promotion

The Process Agenda provides an overview of the team's online work.

Flashing lights indicate a request for your input.

(Instructions)

Outcomes: · Ideas for new ballons · Ideas for new arrangements · Gifts for community organizations Background: We currently sell cartoon character, birthday, wedding and holiday ballons in rubber and Mylar. It is time for a change!

| Add Topic | Add New Process | Attachments | Restore from Archived |

| Topic | Focus | Process | Who | Starting Date | Closing Date | Restore |
|---|---|---|---|---|---|---|
| Ballon Displays | Window Display | Harmony Model-Part 4, Action Plan  (7105) | All | 1/30/02 | 2/6/02 | restore |
| Vendor Requests | Ideas for Different Ballons | Significance Scan-Part 2 Completed | All | 1/30/02 | 1/30/02 | restore |

FIG. 71

*Conversation*

Balloon Promotion

Conversation for Harmony Model - Action Plan

To post a new thought or idea, click on 'Post New Thought'. To build on/reply to an existing thought or idea, click on the highlighted thought/idea. To collapse thread, click on minus (-). To end your input for this time, click on 'Close'.

| Post New Thought | Expand All | Collapse All | Print | Close |

Conversation

Topic:    Conversation For Harmony Model - BalloonDisplays - Window Display

Focus:    Window Display

Description: Evaluate our current window display and see how it can be improved.

--- What's Working

Cameron Lindstrom, 1/30/02 9:31:18 AM
  --- What's Not Working

Cameron Lindstrom, 1/30/02 9:31:18 AM
  --- More customers at our window who come in the store.

clindstrom, 1/30/02
  --- Ballons are replaced regularly, but the display remains the same for too many days at a time, which loses customer interest.
msvenson, 1/30/02

FIG. 74

**Action Register - *Edit***

Ballon Promotion

( Instructions )

To save changes made on this page, click on 'Save' before navigating further.

Due Date: [Jan ▼] [30 ▼] [2002 ▼] ~7605

Status: [Pending ▼] ~7610

Who:
```
---- Who for this process ----
Mark Svenson                    ~7615
```

[ Save ]

7620
```
Mark has to replace those
ballons every Wednesday
```

From: Cameron Lindstrom

Sent: Wednesday, January 30, 2002 1:08 PM

To: Mark Svenson

Subject: e-Wings: Action Item Assignment for the 'Balloon Promotion'

You have been assigned the Action Item (Mark has to replace those balloons every Wednesday!) for the 'Balloon Promotion' team. You are to complete this action by January 30, 2002.

Please visit e-Wings at http://dev.e-wings.net

FIG. 77 e-Wings

Mail | Help | Contact Us

Team Management

Balloon Promotion

- Home Page
- Team Page
- Team Creation
- Build the Team
- Process Agenda
- Action Register
- Reminders
- Have Conversations
- Archived Tools
- Log Out

WELCOME!

There have been no visitors since your last visit.
To access your teams' Process Agenda, click on 'Process Agenda'.

8005

Team Information

2600  Team Name: Ballon Promotion
Creation Date: 1/29/02
Created By: Cameron Lindstrom
Members: Genvieve Heyerdahl
Cameron Lindstrom
Rod Lundquist
Mark Svenson

Mission/Purpose
The mission of this team is to come up with new balloons and arrangements that will promote our store.

Norms
• Special vendor requests are allowed. • Build on each others thoughts.• Nothing complicated for our sales staff.

Vision
At the end of this promotion we will experience increased sales of our regular merchandise.

News Flashes

Conversation:
Unread Thoughts

✗ Focus: Conversation Harmony
Model - Balloon Displays-Window
Posted by: Cameron Lindstrom
Posted on: 1/30/02 9:31:1.

What's Working

✗ Focus: Conversation Harmony
Model - Balloon Displays-Window
Posted by: Cameron Lindstom
Posted on: 1/3002 9:31:1.

What's Not Working

FIG. 80

Facilitator > Process Agenda

Balloon Promotion

Outcomes: • Ideas for new balloons • Ideas for new arrangements • Gifts for community organizations Background: We currently sell cartoon character, birthday wedding and holiday balloons in rubber and Mylar. It is time for a change!

Purpose: The Process Agenda allows you to organize and plan the online work.

( Instructions )

| Add Topic | Add New Process | Edit Outcomes | Edit Background | Attachments |

| Topic | Focus | Process | Who |
|---|---|---|---|
| ☐ Ballon Displays | Window Display | Harmony Model-Part 1. Here and Now | All |
| ☐ Vendor Requests | Ideas for Different Ballons | Significance Scan-Part 1. Adding Items | All |

↘8100

FIG. 81 e-Wings

Mail | Help | Contact Us

Team Managment

Facilitator > Process Agenda > Harmony Model > Here and Now > *Edit*

Balloon Promotion

Purpose: This page allows you to edit or close Part I, the Here and Now, of the Harmony Model.

To close Part I, change the Test Status to 'Part I Completed'. To edit the Here and Now, click on 'View Results' or 'Edit' from the Process Agenda page after Part I is closed.

[Instructions]

To save changes made on this page, you must click on 'Save' before navigating further.

| HERE AND NOW | VISION / RESULTS | SHARED VISION | ACTION PLAN |

[Save] [Attachments] [Tools] [Back to Process Agenda]  ←8200

Focus: Window Display  ←8205

Description: Evaluate our current window display and see how it can be improved.  ←8210

Process/Tool: Harmony Model       Edit ←8212

Starting Date of Part I: Jan 30 2002  ←8215

Closing Date of Part I: Feb 6 2002  ←8220

Part I Instructions: Instructions can be edited and will be viewed by the user.  ←8225

The Harmony Model is used to create a shared vision or a desired result related to the team as a whole or any aspect of the team's work. The first step is to describe the 'Here and Now' of the team. On the left hand side of the User Status: ● Identified  ←8230
             ○ Anonymous   ←8235

Test Status: Part I Open

Sidebar: Home Page, Team Page, Team Creation, Build the Team, Process Agenda, Action Register, Reminders, Have Conversations, Archived tools, Log Out

FIG. 82A

| | | |
|---|---|---|
| Permissions: | View/Change | ← 8240 |
| Shadow: | ------------- Select Shadow------- ------ | ← 8245 |
| Left List Heading: | What's Not Working | 8250 ABC✓ |
| Right List Heading: | What's Working | 8255 ABC✓ |
| Who List: | View/Change | ← 8260 |
| Here And Now Guidelines: | View/Edit | ← 8265 |
| Vision/Desired Result Guidelines: | View/Edit | ← 8270 |

FIG. 82B e-Wings

Mail | Help | Contact Us

Team Managment

Facilitator > Analyze / Make Decisions > Significance Scan

Balloon Promotion

Instructions: To modify the Process associated with this tool, click on the 'Edit' link corresponding to 'Process/Tool'. To edit the 'Permissions' granted to each user, go on the 'View/Change' link corresponding to Permissions and modify.

The Significance Scan allows a team to identify the most important items or any that need to be addressed in order for the team to succeed and to assess the relative importance of each. It is broken down into two parts: items/areas Ratings.

When Part one is active, to manually close part one change the status to 'Part One Completed' and change the closing date to the current date. When Part 1 is closed, click on results to edit the items/areas that will be rated in Part 2 - Rating the items/areas.

To save changes made on this page, you must click on 'Save' before navigating further.

Sidebar:
- ☐ Home Page
- ☐ Team Page
- ☐ Team Creation
- ☐ Build the Team
- ☐ Process Agenda
- ☐ Action Register
- ☐ Reminders
- ☐ Have Conversations
- ☐ Archived tools
- ☐ Log Out

| Save | Attachments | Delete | Results |

Focus: Ideas for Different Balloons

Description: This significance scan will collect possible requests that we can make for different, more innovative User Instructions:

Part One
This Significance Scan allows a team to identify the most important items that nee be addressed and the relative importance o each. Please identify the items or areas related to the question for your input.

Part Two
Below are the items or areas which team me have identified and your facilitator has revised. Please rate these items on a scal 1-10. Ten indicates high importance. One indicates low importance.

Process/Tool: Significance Scan    Edit

Test Status:

FIG. 83A

| Part One Active ▼ |

| | |
|---|---|
| Date Created: | 1/29/02 |
| Part One Starting Date: | Jan ▼ 29 ▼ 2002 ▼ |
| Part One Closing Date: | Feb ▼ 10 ▼ 2002 ▼ |
| User Status: | ○ Anonymous<br>⦿ Identified |
| Permissions: | View/Change |
| Shadow: | ------------Select Shadow------------ |
| Whos List: | View/Change |
| Question/Comment : | What kinds of balloons or balloon arrangements do you think would be popular with our customers? This includes balloons that do not exist. |

FIG. 83B

Genvieve Heyerdahl

Cc:

Subject: e.Wings: Part I of Significance Scan (ideas for Difference ABC✓)

Body: Part I of the Significance Scan (Ideas for Different Balloons) has been completed and both the original and revised results are available.

FIG. 84B

From: Cameron Lindstrom
Sent: Wednesday, January 30, 2002 12:26 PM
To: Genvieve Heyerdahl; Cameron Lindstrom; Rod Lundquist; Mark Svenson
Subject: e-Wings: Part I of Significance Scan (Ideas for Different Balloons) completed and results available for the 'Balloon Promotion' team.

Part I of the Significance Scan (Ideas for Different Balloons) has been completed and both the original and revised results are available.

Please visit e-Wings at http://dev.e-wings.net

FIG. 86

DISTRIBUTED SYSTEM FOR INTERACTIVE COLLABORATION

BACKGROUND

Organizations are increasingly operating in a geographically dispersed environment. As this trend continues, it is increasingly important to have effective "distributed project management" (i.e., project management processes and technologies that support individuals and teams that span multiple physical locations). To work effectively and decisively as a team, there must be effective communication and collaboration between the individual personnel/team members. Face-to-face meetings among team members have been the traditional manner of communicating. But, with geographically dispersed teams, face-to-face meetings are typically difficult to schedule, require travel time, and are expensive.

To improve the process, facilitators (i.e., a person designated to organize and monitor meetings), are sometimes used to enhance the efficiency of the face-to-face meetings. While improving the efficiency of the face-to-face meeting, the facilitator's dedicated time is an additional cost.

Video conferencing can be used to have remote face-to-face meetings. Video conferencing saves travel time and cost, but all parties must be available at the same time at a facility with the requisite equipment. So, even though the traveling is reduced or eliminated, the inefficiency and difficulty in scheduling remain the same.

With the advent of wide area computer networks, such as the Internet, less expensive communications have become possible for distributed project management. Besides being less expensive, computer network communications allow for two forms of communications: synchronous and asynchronous.

An example of synchronous or 'live' computer network communications is web conferencing, where all the team members having a computer attached to the computer network can take part in the discussion without travel, but must be on-line at the same time and are not as convenient as email since the team members must be at their computers during the conference and a record of the conversation is generally not saved. Asynchronous communications, which is more time flexible for the team members, includes instant massaging, document storage and sharing, group e-mail, message boards, and instant printing. The asynchronous forms of computer network communications may or may not store transactions occurring during the meeting.

Furthermore, the asynchronous forms of network communications tend to be become unfocused due to a lack of structure. For example, e-mails, which are quick and inexpensive, may get intermingled with e-mails pertaining to non-team matters and tend to proliferate. Conversation threads in these e-mails can be severed in the event a team member accidentally sends a "reply" rather than a "reply to all" when participating in a collaborative email discussion. Message boards provide another example where the lack of structure and lack of discipline of team members may lead to the discussion's becoming unfocused.

Thus far, there has not been an effective bridge of the gap between technology and human interaction in distributed project management.

SUMMARY

A distribution management system can facilitate synchronous and asynchronous communications, take advantage of electronic scheduling tools, support a facilitator paradigm, and store meeting communications for later retrieval. The system can keep the team focused through a use of processes and tools having varying degrees of structure.

Accordingly, one aspect of the system can be used to create a collaborative environment for members of a team in communication with a computer network. An interactive forum can be provided in the collaborative environment in a manner offering varying degrees of structure for collecting information from the members of the team. The information can then be used to arrive at a collaboratively derived decision.

The system can receive a topic from the facilitator or team member to be interactively and collaboratively considered by the members of the team. The system can then collect information from team members regarding the topic and/or interactive process. Collection techniques may include requesting the members to consider at least one option for the matter being considered. The data collected may be in the form of an absolute metric, relative measure, or free-form input.

The system may automatically inform team members of the topic or process through a notice in an asynchronous manner, such as through an email. A direct link to respond to the notice may be provided in the notice.

The system may employ a process that solicits input from the team members for a present state of the topic, an end state of the topic, and a process for proceeding from the present state to the end state. The system may also employ a process that allows a non-team member to coach a subset of members on the problem solving process and techniques in a manner that is driven by the team member.

Among many tasks, the facilitator or a selected team member (i.e., leader) can set-up a team, choose a topic, provide a focus for the topic, choose a process through which the collaboration is conducted, define start and end times for team members to provide input, and control the flow of the process through decision-making based on the input from the team members. The team members can provide input to the collaboration in a manner defined by the process.

BRIEF DESCRIPTION OF THE DRAWINGS

FIG. 20 is a flow diagram of a method used to create a 'significance scan' tool of FIG. 10;

FIG. 22 is a flow diagram of a method used to create a 'survey' tool of FIG. 10;

FIGS. 24–28 are screen shots of an example login through team page sequence corresponding to FIGS. 5–7;

FIGS. 29–46 are screen shots of an example 'significance scan' tool usage sequence corresponding to steps 1048 and 1080 of FIG. 10;

FIGS. 47–77 are screen shots of an example 'harmony model' tool usage sequence corresponding to steps 1044 and 1076 of FIG. 10; and FIGS. 78–86 are screen shots of an example set of tasks capable of being performed to organize the process described in the sequence of FIGS. 29–46 and 47–77.

Figure 1A:
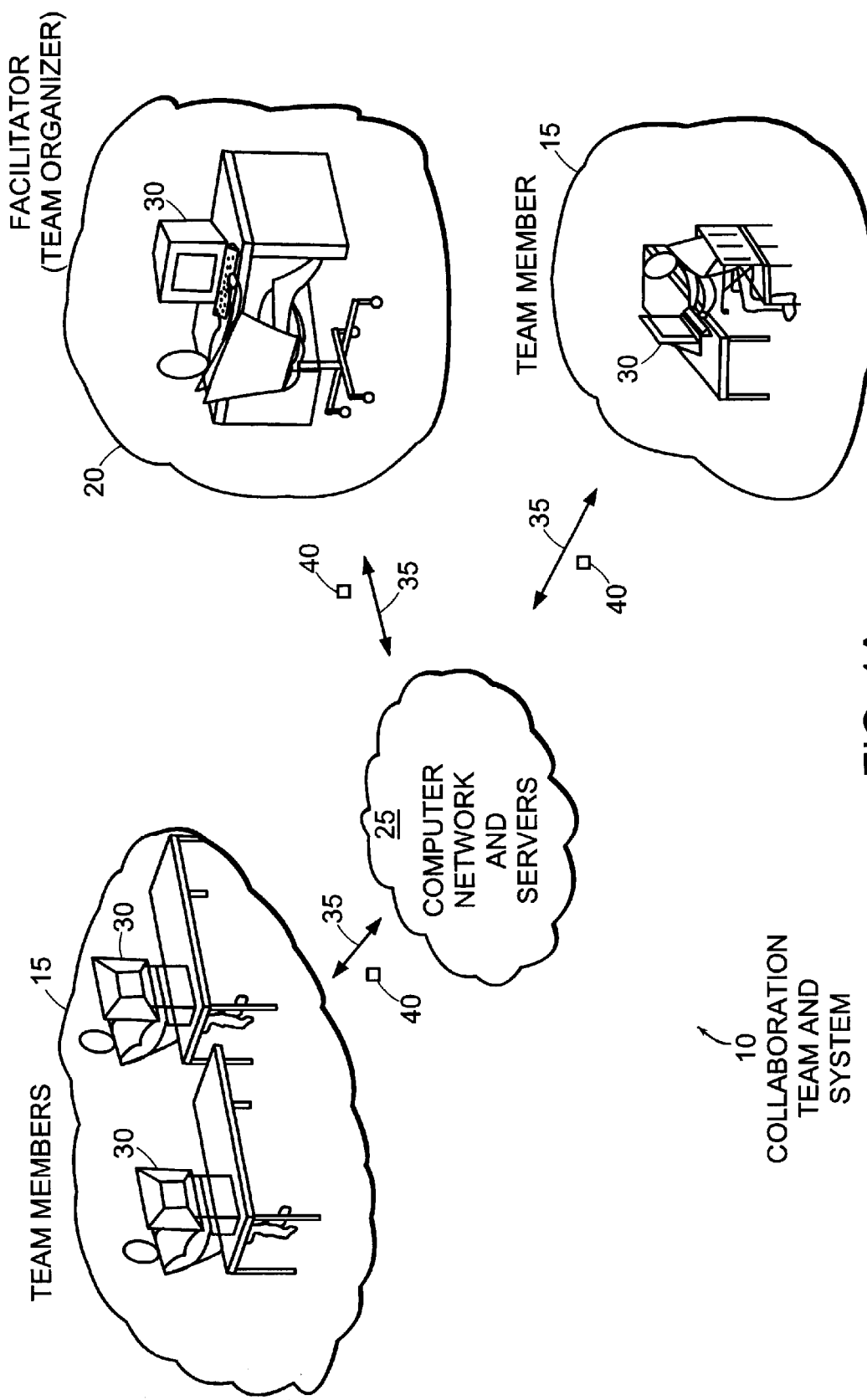
FIG. 1A is a pictorial diagram of a team distributed about a network, collaborating on a project using the interactive collaboration techniques according to the principles of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An example for which a collaborative process could be used is for a group of individuals to define a way to improve a business. The group may come up with a list of topics to address, such as advertising, overhead cost reduction, employee bonuses, and so forth. The group leader may then select one of the topics, say advertising, and schedule a meeting of the group to discuss ways to improve the advertising of the business. During this meeting, the group members may choose to focus on television advertising and further discuss cable and network television advertising. A survey may then be taken from the members, where network television advertising scores higher than cable television advertising. An action item may then be assigned to one of the team members to research per-minute advertising costs for both network and cable television advertising, and a second action item may be assigned to another team member to research advertisement production costs.

In the past, a face-to-face meeting or conference call would be used to get input from a team. More recently, video conferencing has been used. Each method has associated cost, schedule, time constraint, and efficiency problems. With the advent of the Internet, electronic exchanges have taken place, such as email, chat, email voting, whiteboards, and document sharing. these techniques have been more efficient than previous methods, but have their own problems, including a problem with the structure of the collaboration.

A system using the principles of the present invention has been designed (e-Wings, see www.ewings.net) that provides collaboration and paradigm advantages of face-to-face meetings with the efficiency and technical advantages of network collaboration.

Figure 2A:
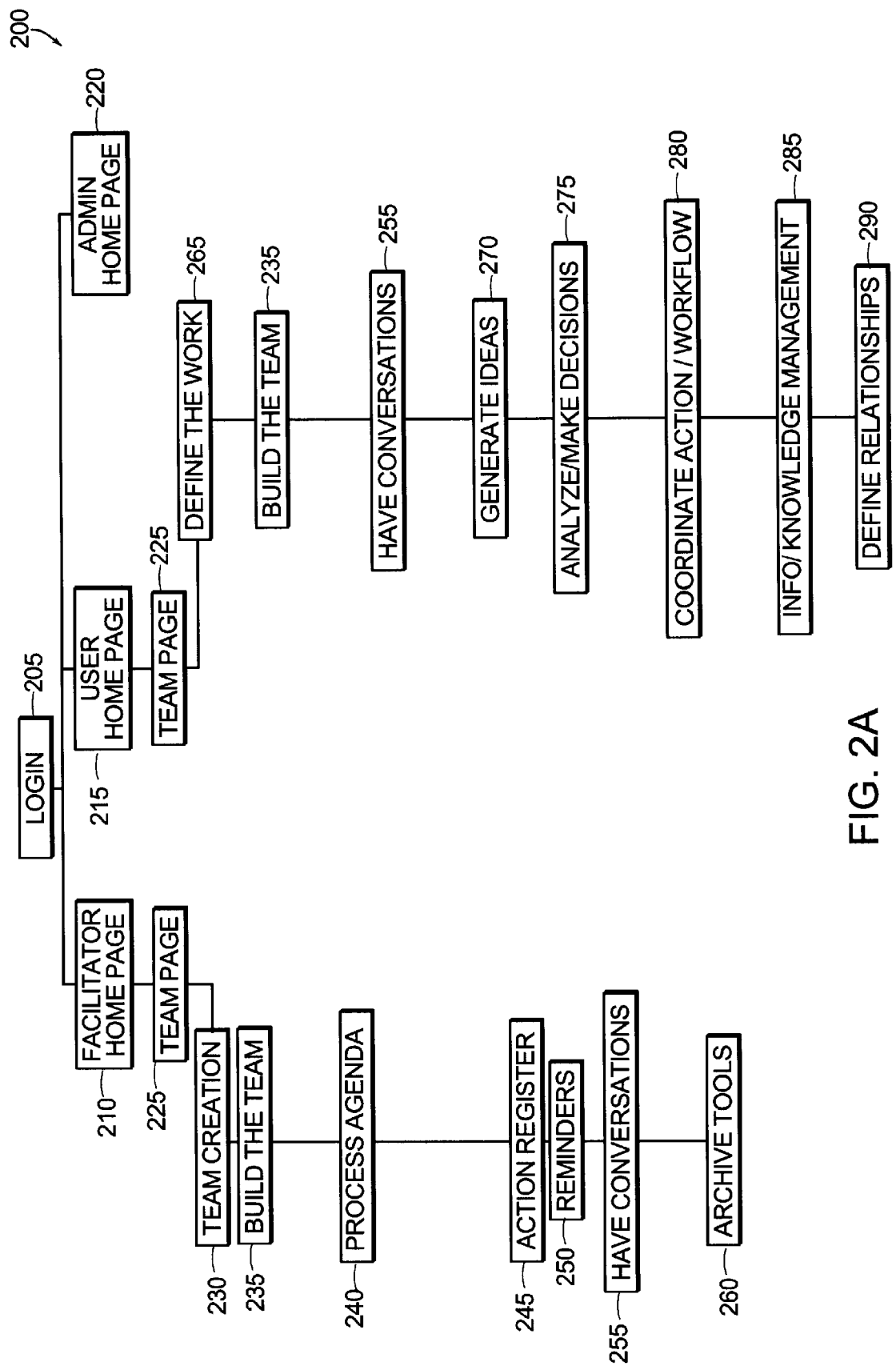
FIG. 2A is a generalized block diagram of software components that may be used to provide the interactive collaboration of FIG. 1A.
Figure 2B:
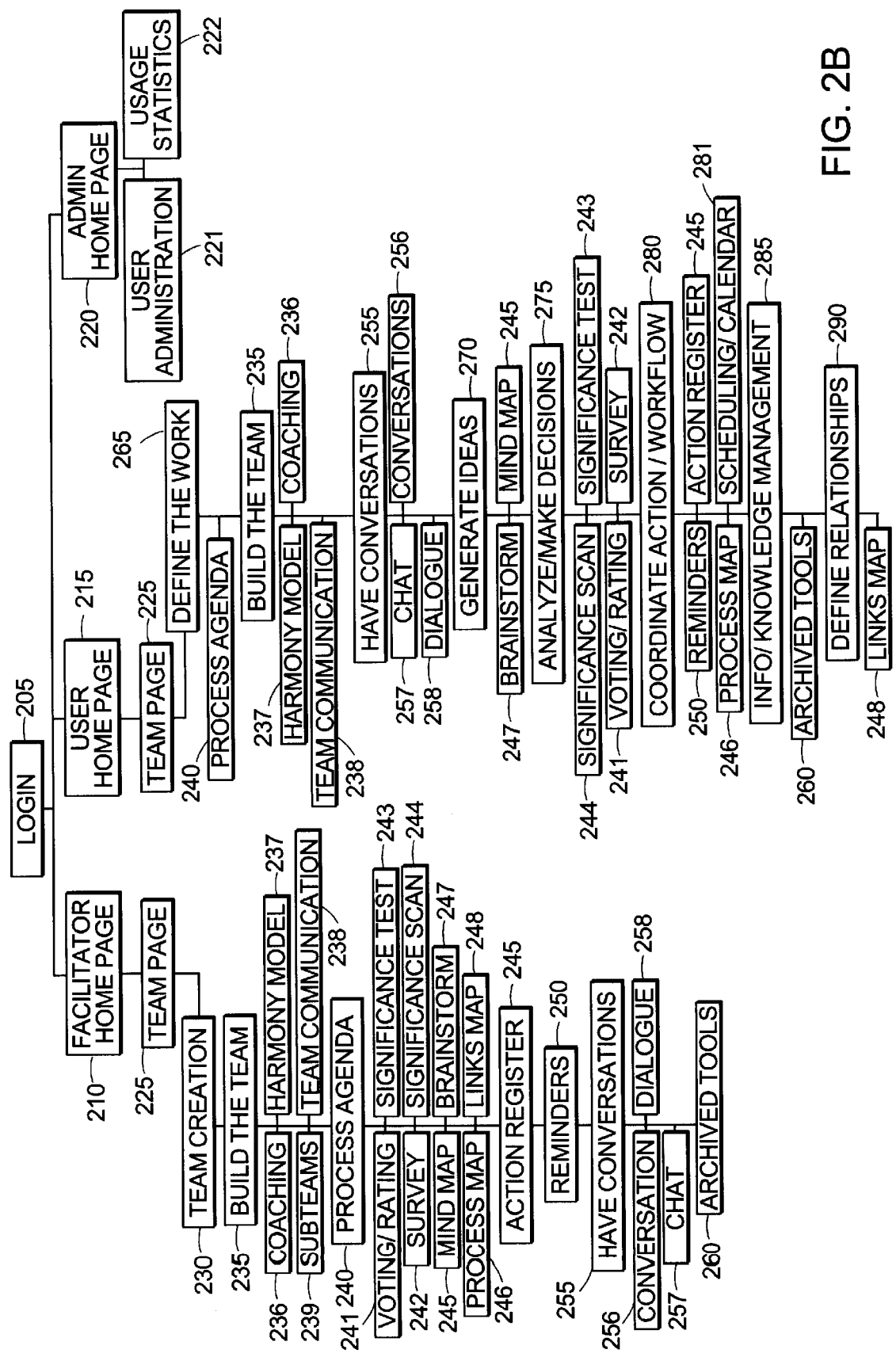
FIG. 2B is a detailed schematic diagram of FIG. 2A.
Figure 3:
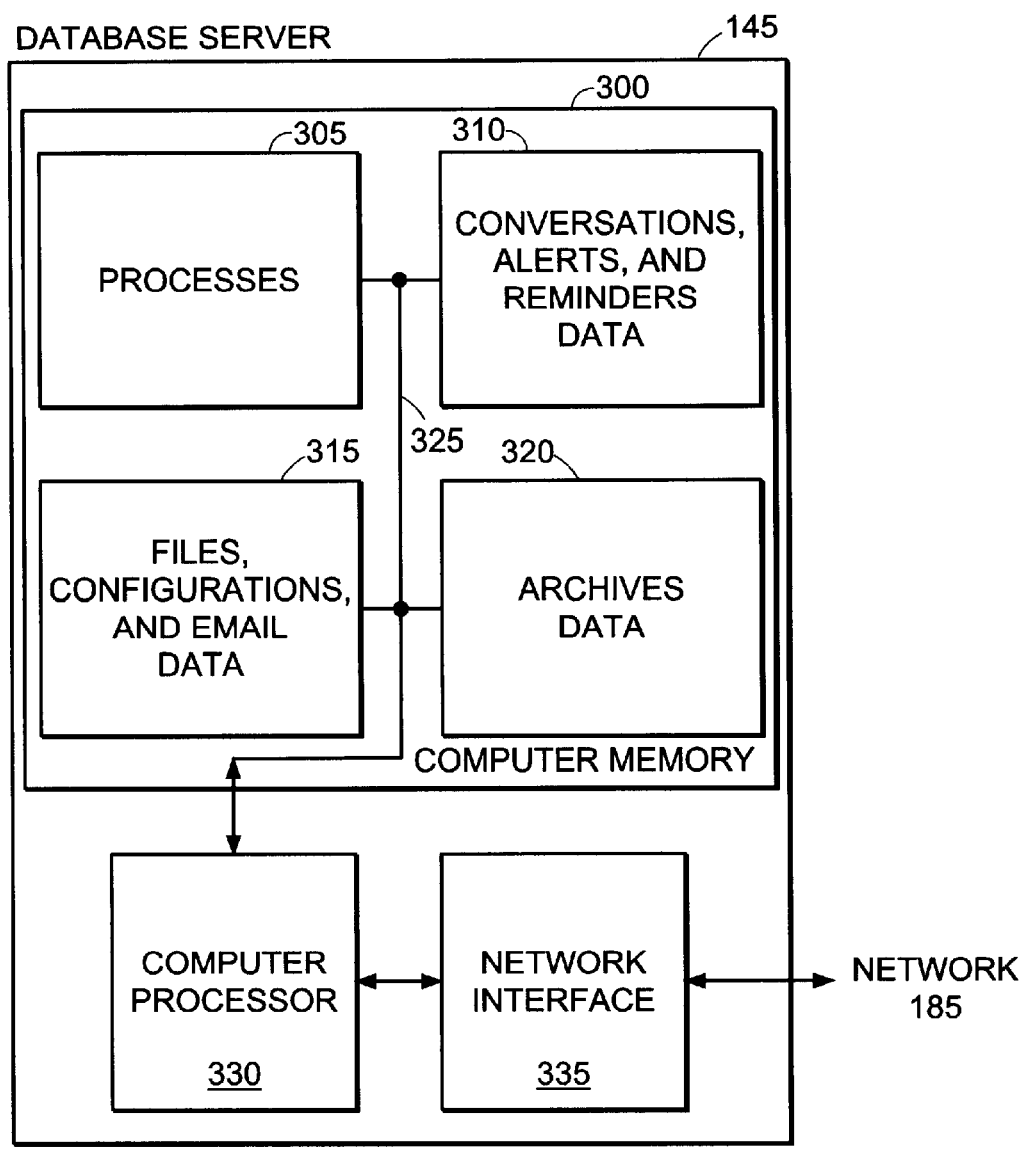
FIG. 3 is a block diagram of a database server deployed in the computer network of FIG. 1B.
Figure 4A:
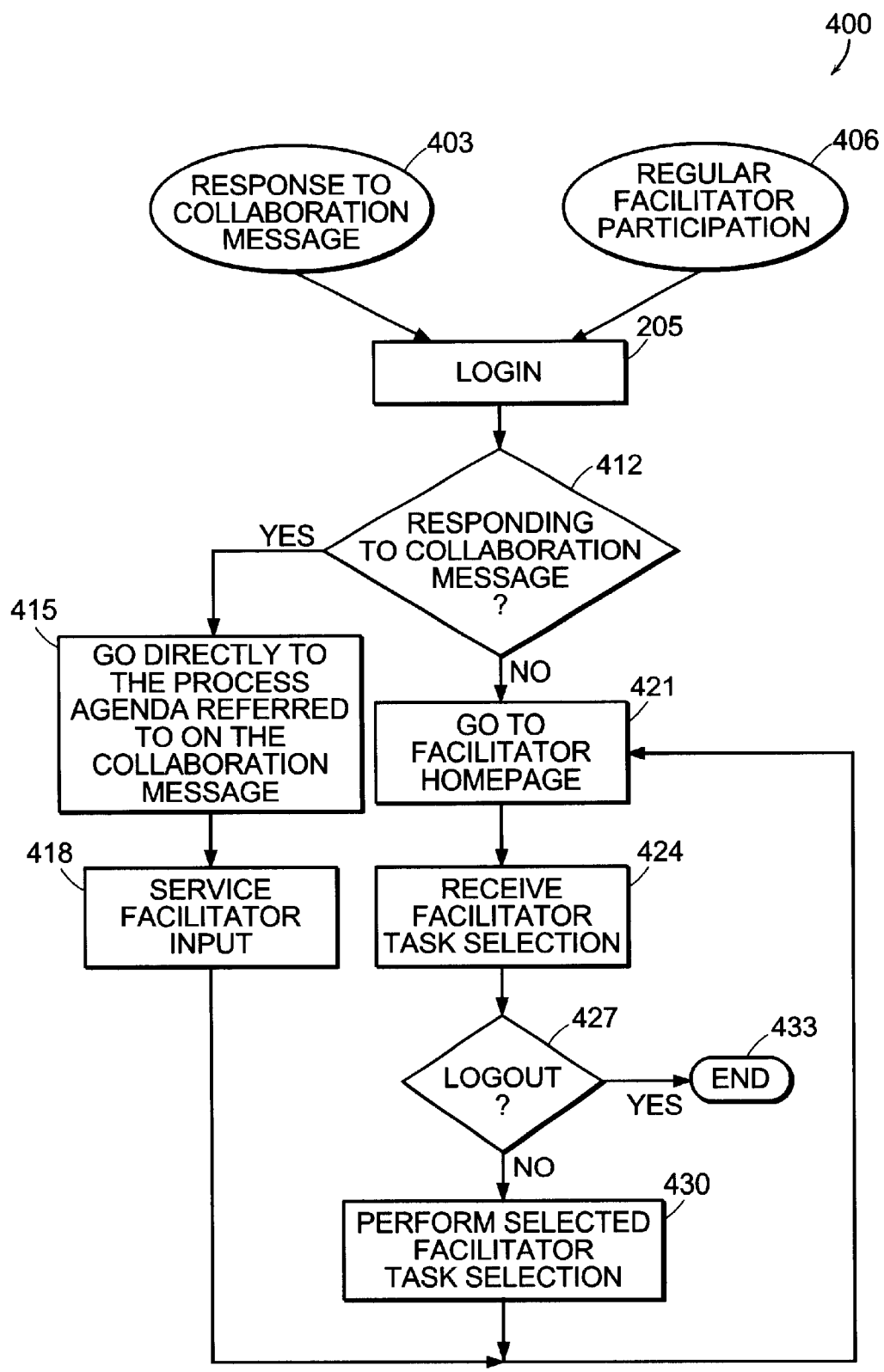
FIG. 4A is a generalized flow diagram of a method that may be used to support a facilitator of FIG. 1A.
Figure 4B:
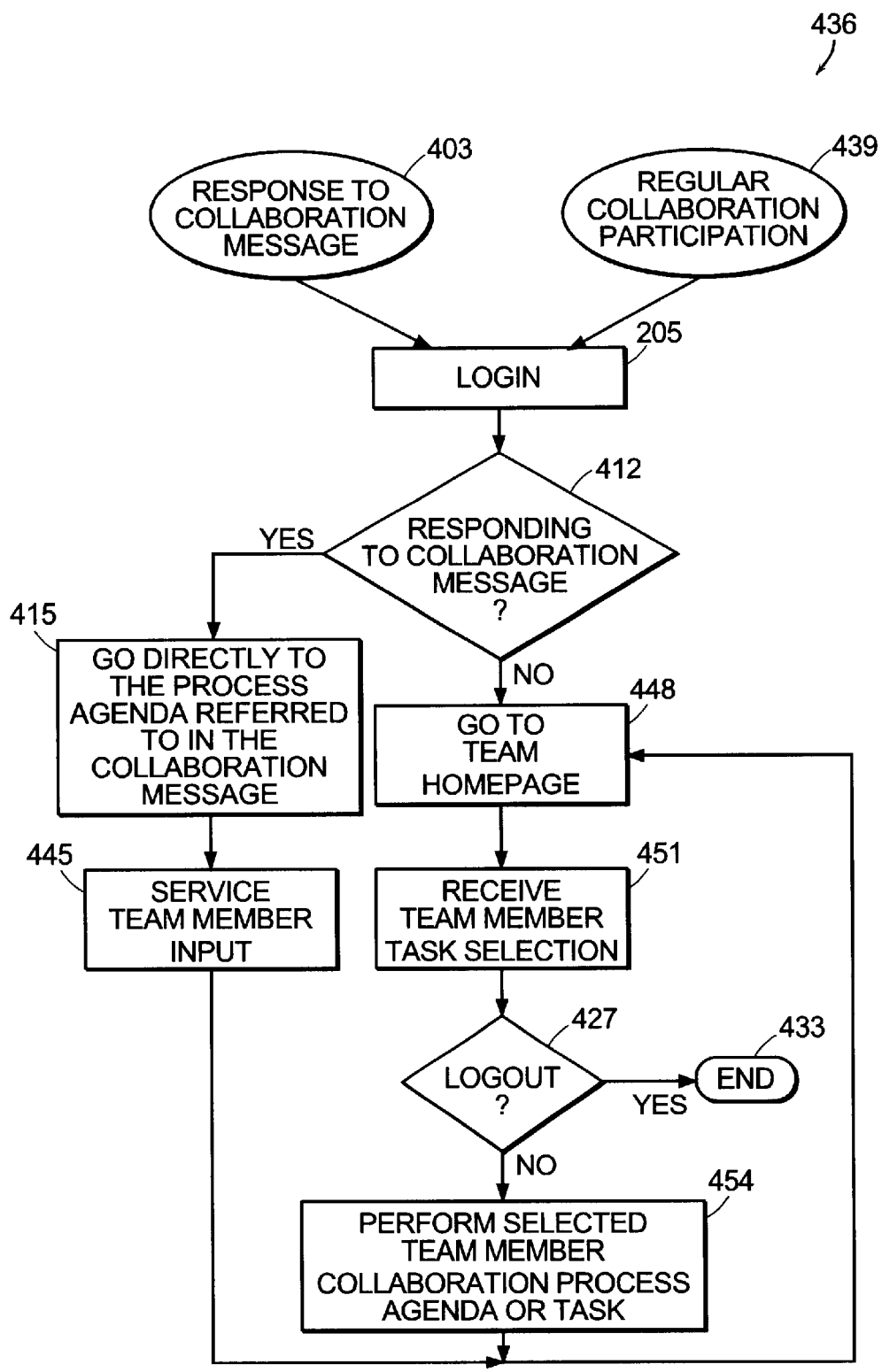
FIG. 4B is a generalized flow diagram of a method supporting a team member of FIG. 1A.

FIGS. 1 through 3 provide a broad overview of users of the system and a particular embodiment of the system. FIGS. 4A and 4B provide a generalized example of a facilitator and team members' interaction with the system. FIGS. 5 through 23 provide example methods employed by the system for supporting the interactive collaboration over a computer network.

Referring now to FIG. 1A, a collaboration team and system 10 are depicted operating in a computer networking environment. The team includes team members 15 and a facilitator 20, sometimes referred to as a team organizer and mediator. The team members 15 and facilitator 20 each use a respective computing device 30, such as a desktop computer, wireless computer, network enabled phone, personal digital assistant (PDA), or other electronic device capable of interacting with a computer network and servers 25 via communication links 35. Communications typically occur in data packets 40 commonly employed in computer network communications.

The team members 15 are organized (in detail below) by the facilitator 20 to collaborate on a given subject. Because the team members 15 are distributed about the computer network 10, the network and servers 25 act as a conduit for collecting collaborative inputs from the team members 15. Thus, a collaborative environment for the team members 15 is said to be provided on the computer network. In the collaborative environment, an interactive forum is provided, where the interactive forum offers varying degrees of structure to collect information from the members of the team. The collected information is used to arrive at a collaboratively derived decision.

The facilitator 20 defines the membership of the team. A server (not shown) in the network stores the membership information and is used to provide a "centralized" location for the interactive collaboration among the team members 15. It should be understood that the server may be a distributed network of servers. Excluding the task of defining the membership of the team, the team members 15 typically have access to other functions described herein with regard to processes and tools defined for the interactive collaboration.

The computer network used to provide the interactive collaboration allows the team members 15 to participate in meetings using a computer network (e.g., Internet) enabled personal computer 30. When used online, team members 15 are able to brainstorm, contribute, provide information or files, vote, etc. in "virtual conference rooms" or other virtual forum, including interactive or non-interactive forums, during sessions that may be mediated, or organized, coordinated, etc. by the facilitator 20 or selected team member leader. When used offline, team members 15 can view available information for a conference room, make a contribution, and later upload the contribution.

The team members 15 are able to design meetings in this collaboration team and system 10 arrangement. To design a meeting, the designer creates an agenda, having a sequence of activities through which the team 15 proceeds, in order to successfully complete the meeting objective.

The facilitator 20 and/or team members 15 are able to facilitate group processes. A group process may include making process interventions that facilitate group learning about the way group members interact with each other. Process interventions may be built into the design of the meeting or may be made by the facilitator at any point in a discussion.

The system may also includes tools that maybe used by team members 15, possibly with the facilitator 20, to accomplish its goals. The tools, discussed in detail later, include idea generation, idea sorting, idea evaluation, idea prioritizing, project mapping, scheduling, document editing and storing, etc.

Examples of businesses in which the interactive collaboration of the present invention may be employed include companies that utilize cross functional teams, representing all aspects of the business at multiple locations to manage value streams, such as consumer products companies, financial services (e.g. banking and insurance), engineering firms, architectural firms, industrial companies with multiple manufacturing facilities and/or national or international markets, and federal government agencies. Other examples of companies include companies with functions having central and regional offices, such as sales, procurement, engineering, customer service, finance/accounting, and advertising. Still further companies that utilize project teams include companies making new products, systems installations, such as computer systems, integrated software systems, manufacturing installations and others.

The ability for teams to communicate, collaborate, and coordinate synchronously, asynchronously, and remotely on a timely basis through use of the system described herein for interactive collaboration increases team effectiveness while decreasing cost and travel time, decreases cycle time and responding to changes in the business environment, increases utilization of intellectual capital, with an ability to record, store, share and analyze information on a timely basis among other factors. The system for interactive collaboration further provides an increased learning velocity/smaller learning curve to reach higher effectiveness sooner with better efficiency. The system further provides an ability for teams to conduct synchronous/same place meetings, synchronous/different place meetings, and asynchronous/remote meetings. A continuity between face-to-face meetings may be augmented with the asynchronous meetings to maintain momentum.

Figure 1B:
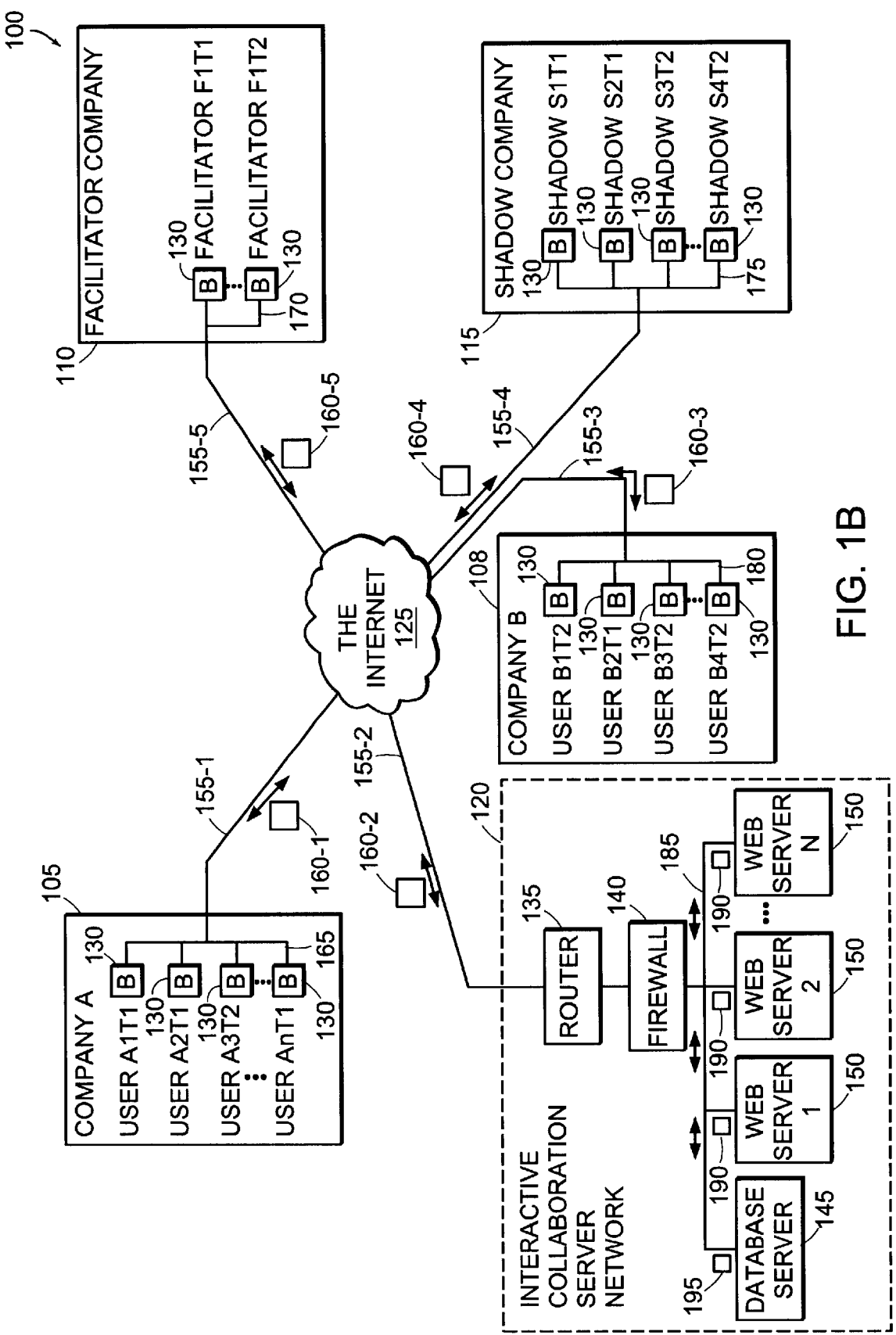
FIG. 1B is a schematic diagram of an exemplary computer network supporting the distributed team of FIG. 1A.

FIG. 1B includes a Company A 105, Company B108, facilitator company 110, shadow company 115, and interactive collaboration server network 120. The companies 105, 108, 110, 115, and interactive collaboration server network 120 are in communication with each other via the Internet 125. Data 160 is transmitted among the companies and server network via communication links 155. The communication links 155 may be wire, wireless, or optical links capable of support computer network communications.

FIG. 1B illustrates a computer network 100 providing an ability for team members 15 and facilitator 20 to interact with the processes occurring in the interactive collaboration system disposed in the computer network 100. In this example, Company A 105 includes, user A1T1, user A2T1, user A3T2, . . . , and user AnT1. Each of the users employs a respective personal computer 130 for communicating with the interactive collaboration system in the network 120. Internal to Company A is an internal computer network 165 that connects to a communication link 155-1, which connects Company A to the Internet 125. A data packet 160-1 represents data packets traveling along the link 155-1 between Company A and the Internet 125. It should be understood that the communication links 155 and network 165 may be wire, wireless, or optical communication links capable of supporting electronic or optical communications.

The facilitator company 110 includes a team one facilitator, F1T1, and a team two facilitator, F1T2. Each facilitator employs a respective personal computer 130, and both computers are interconnected by an internal network 170. The internal network 170 is connected to a communications link 155-5 that spans between the Internet 125 and the facilitator company 110. A data packet 160-5 represents data traveling between the facilitator location 110 and the Internet 125.

The shadow location 115 includes four shadow personnel. There are two "shadows" associated with each team, Team 1 and Team 2. Shadows S1T1 and S2T1 are shadows for Team 1, and shadows S3T2 and S4T2 are shadows for Team 2. Each of the shadows employs a personal computer 130, interconnected to the others via an internal network 175. The internal network 175 is connected to a communications link 155-4 spanning between the Internet 125 and the shadow company 115. A data packet 160-4 represents data transmitting between the Internet 125 and the shadow location 115 along link 155-4.

A Company B 108 includes four users: user B1T2, user B2T1, user B3T2, and user B4T2. Each of the users (i.e. team members) employs a personal computer 130, interconnected to the others via an internal network 180. The internal network 180 is connected to a communications link 155-3 spanning between Company B and the Internet 125. A data packet 160-3 represents data transmitting between company B 180 and the Internet 125 via communications link 155-3.

The interactive collaboration server network 120 includes a router 135, firewall 140, database server 145, and web servers 150. The servers 145, 150 are connected to the firewall 140 through an internal network 185.

The interactive collaboration server network 120 is connected to the Internet 125 via a communications link 155-2. A data packet 160-2 represents data flowing between the interactive collaboration server network 120 and the Internet 125. Data packets 190 and 195 represent data flowing between the database server 145 and web servers 150 or data flowing between any of the servers 145, 150 and the firewall 140 for later transmission to the Internet 125, as represented by data packet 160-2 along the communications link 155-2 to the internet 125.

The data packets 160, 190, 195 may include any type of data, for example, e-mails, web pages, files (e.g., text, spread sheet, graphics), interactive collaboration system data (e.g., custom team setting), conversations, alerts, reminders, and archive data. In the aggregate, the data carried in the data packets 160, 190, 195 may be representative of the information and input provided by the team members 15 and/or facilitator 20 taking part in an interactive collaboration session.

FIG. 2A is a block diagram of a software system 200 having modules that provide processes and tools for the team members 15 and facilitators 20. The software system 200 includes a login page 205 for authenticating the team members 15 and facilitators 20 for access to the rest of the system. In this embodiment, facilitators 20 then proceed to a facilitator home page 210, and team members 15 proceed to a user home page 215. Administrators, which may include a subset of facilitators 20, team members 15, shadows 115, or other person not defined herein, proceed to an administrator home page 220 in this same embodiment.

The facilitator 20 has a different level of access to the interactive collaboration system software 200, allowing the facilitator 20 to provide input and services on a higher level than the team members 15. The facilitator 20 may be considered a super-user based on his or her privileges within the software system 200. Accordingly, the software modules below the facilitator home page 210 are different from those below the user home page 215 and the administrator home page 220. The differences between the capabilities of a team member 15 and the facilitator 20 is further highlighted in the more detailed flow diagram of FIG. 2B.

Continuing to refer to FIG. 2A, the facilitator 20 selects a team, from among a number of teams with which he is associated, with which to interact or provide services. Based on the team selection, the facilitator 20 is directed to a corresponding Team Page 225. In practice, the browser on the computer 130 the facilitator 20 is using ____ directed to the corresponding Team Page 225. From that Team Page 225, the facilitator 20 can visit any of the pages 230 through 260. These pages 230 through 260 include a "team creation" page 230, "build the team" page 235, "process agenda" page 240, "action register" page 245, "reminders" page 250, "have conversations" page 255, and "archived tools" page 260. Details regarding these pages are provided below in reference to FIGS. 8–23.

In this particular embodiment, a team member 15 logging into the software system 200 is directed to the user home page 215. From the user home page 215, the team member 15 selects a team with which he is associated for engaging in an interactive collaboration session. After selecting the team, the team member 15 is directed to the respective team page 225. From the team page 225, the team member 15 can select any of the pages 265 through 290. These pages may include a "define the work" page 265, "build the team" page 235, "have conversations" page 255, "generate ideas" page 270, "analyze/make decisions" page 275, "coordinate action/workflow" page 280, "info/knowledge management" 285, and "define relationships" page 290. Further details regarding these pages are discussed below in reference to FIGS. 8–23. It should be understood that the pages are supported functionally by underlying software modules or subsystems.

An administrator logging into the software system 200 is directed to an administrator home page 220. The administrator home page 220 may include similar items as provided on the facilitator home page 210 and user home page 215, and may also include software and/or network administrative settings, controls interfaces and details regarding the administrator home page.

FIG. 2B is a block diagram of the same software system 200, but with a plurality of pages beneath a subset of the pages described in reference to FIG. 2A. Below the facilitator home page 225, the "build the team" page 235 includes four subpages, sometimes referred to as "tools." These tools include a "coaching" tool 236, "harmony model" tool 237, "team communication" tool 238, and "subteams" tool 239.

Likewise, the "process agenda" page 240 includes eight tools. These tools include a 'voting/rating' tool 241, 'survey' tool 242, 'significance test' tool 243, 'significance scan' tool 244, 'mind map' tool 245, 'process map' tool 246, 'brainstorm' tool 247, and 'links map' tool 248.

The 'have conversations' page 255 includes three tools. These tools include a 'conversation' tool 256, 'chat' tool 257 and 'dialogue' tool 258.

Below the user home page 215, the 'define the work' page 265 includes a 'process agenda' tool 240. The 'build the team' page 235 includes a 'coaching' tool 236, 'harmony model' 237, and 'team communication' tool 238.

The 'have conversations' page 255 includes a 'conversations' tool 256, 'chat' tool 257, and 'dialogue' tool 258.

The 'generate ideas' page 270 includes a 'brainstorm' tool 247 and 'mind map' tool 245.

The 'analyze/make decisions' page 275 includes a 'voting/rating' tool 241, 'survey' tool 242, 'significance test' tool 243 and 'significance scan' tool 244.

The 'coordinate/work flow' page 280 includes an 'action register' tool 245, 'process map' tool 246, 'reminders' tool 250, and 'scheduling/calendar' tool 281.

The 'info/knowledge management' page 285 includes an 'archive tools' tool 260. The 'define relationships' page 290 includes a 'links map' tool 248.

Beneath the administrative home page 220 are links to a 'user administration' tool 221 and 'usage statistics' tool 222.

Links are typically provided on a page to a tool associated with that page, where the links in a particular embodiment are provided as selectable, graphical icons on a graphical user interface. Each selectable, graphical icon may be selected, for example, by a computer mouse, voice command, touch screen, keyboard, or other means of selection. With today's graphical user interfaces, the links may also be provided as selectable text labels in drop-down menus, radio buttons, or other graphical selectable icon.

Descriptions of each of the tools listed above will be discussed below in reference to FIGS. 5–23, as occurring.

FIG. 3 is a block diagram of a particular embodiment of processes and data stored in a memory 300 on the database server 145 of FIG. 1B. The database server 145 includes processes 305; data related to conversations, alerts, and reminders 310; files, configurations, and e-mail data 315, and archived data 320. The processes and information stored in the memory 300 provides service to the team members 15 and facilitator 20 distributed about the computer network 100 (FIG. 1B). The processes 305 are representative of software modules in the software system 200 of FIGS. 2A and 2B.

The software underlying the processes 305 and the ____ is stored in the memory 300, which is typically a computer readable medium, such as random access memory (RAM), read only memory (ROM), optical or magnetic disk, or other suitable computer readable medium. The software supporting the processes 305 is loaded by a computer processor 330 and executed. The results of the execution are sent from the computer processor 330 to a network interface 335, which sends those results out to the network 185. The information is similarly accessed by the computer processor 330, used by the software on the computer processor 330, or sent to other processors or storage facilities on the network 185 via the network interface 335.

FIG. 4A is a flow diagram of an example generalized method 400 through which a facilitator 20 interacts with the interactive collaboration software system 200. The process 400 begins with the facilitator 20 (i) responding to a collaboration message (step 403), typically received as an e-mail notice from the software 200 or (ii) deciding to conduct some regular facilitator participation on his own accord (step 406). In either case, the facilitator 20 arrives at the login page 205 and enters a user name and password to gain access to the software system. It should be understood that, in an embodiment of the software system 200 (FIG. 2A) operating in the example network 100 defined in FIG. 1B, these actions are done through use of a browser on a computer 130 across the Internet 125 to access a web server 150 and/or data server 145.

Following the login page 205, the methods 400 continues to decision block 412, in which the method 400 determines whether the facilitator 20 is responding to a collaboration message(step 403). If yes, then the method 400 continues to step 415, in which the method 400 proceeds directly to a page referred to in a link selected in the collaboration message received by the facilitator. The process agenda may be sent to the database server 145 by the facilitator's browser 130 executing on the personal computer 30. Typical of network protocols, the referenced page may be transferred to the method 400 as a parameter in a uniform resource locator (URL) or through some other mechanism. At step 418, the method 400 services the facilitators' input provided in step 415. The method 400 continues to step 421, where the facilitator is directed to the facilitator home page 210 (FIG. 2A).

If the facilitator 20 is not responding to a collaboration message, as determined in step 412, then the method 400 proceeds directly to the facilitator home page at step 421. At step 421, the facilitator 20 makes a task selection, which is received at step 424. At step 427, the method 400 determines whether the task selection received from the facilitator 20 is a logout request. If yes, then the process ends at step 433. Otherwise, the method 400 continues to step 430, in which case the process performs the selected facilitator task selection. After completing the desired task, the method 400 returns back to the facilitator home page 210 at step 421.

It should be understood that the flow diagram here is merely an example of an embodiment and general in nature. Alternative embodiments and flows may be implemented by one of ordinary skill in the art. For example, rather than returning to the facilitator home page 210 in step 421 each time, the method 400 may return back to a page beneath the facilitator home page 210, such as the team page 225 (FIG. 2A) or process agenda page 240 (FIG. 2A).

FIG. 4B is a generalized flow diagram of a particular embodiment of a method 436 that occurs when a team member 15 (i) responds to a collaboration message (step 403) or (ii) conducts regular collaboration participation (step 439). The team member 15 is authenticated into the software system at the login page 205. Following a successful authentication, the method 436 is essentially the same as the method 400 for the facilitator 20, with differences being reflective of respective privileges granted to a facilitator 20 and team member 15. These differences will be brought forth are more where relevant in the details of FIGS. 5 through 23, discussed below.

Figure 5:
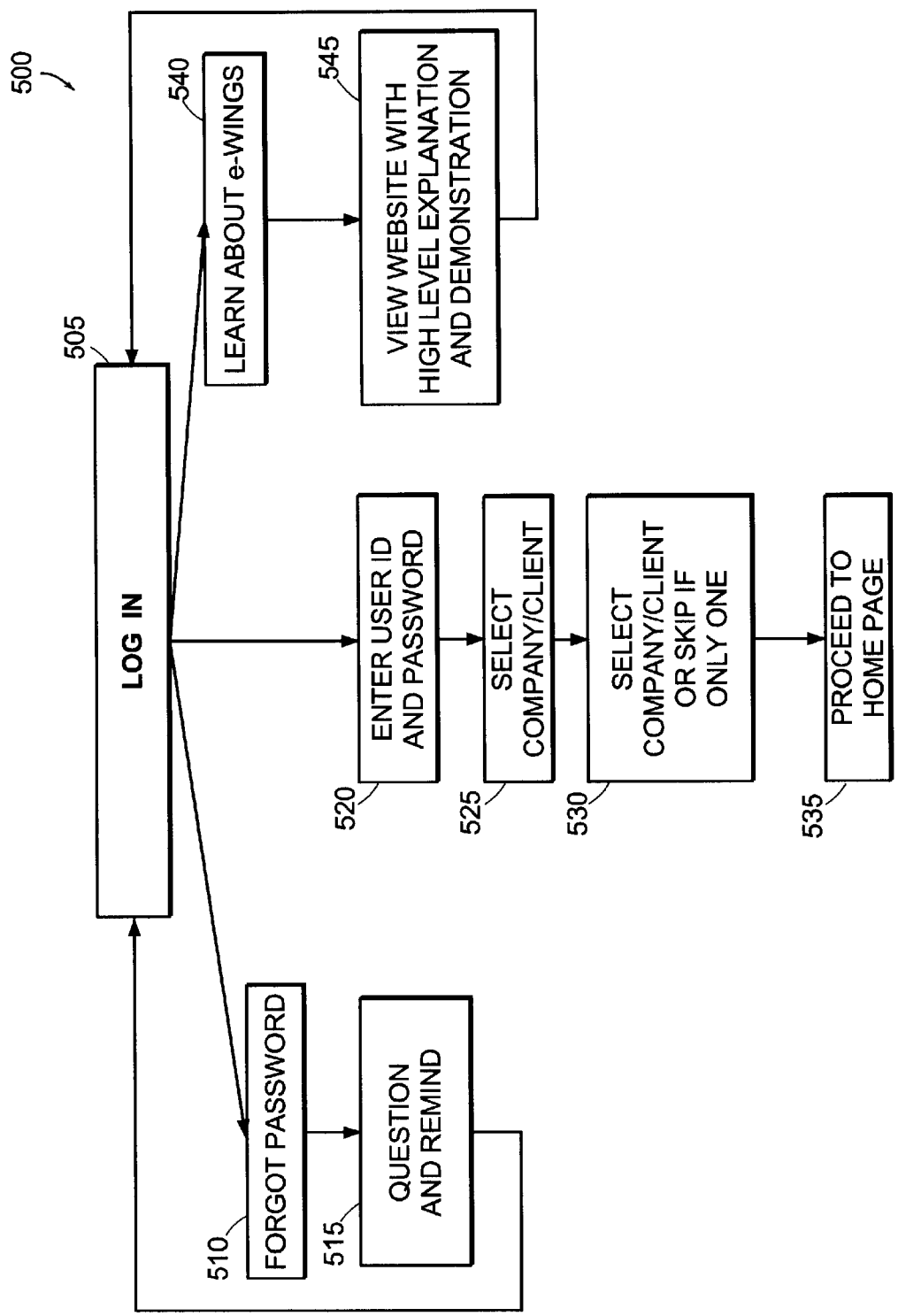
FIG. 5 is a flow diagram of a login process of FIGS. 4A and 4B.

FIG. 5 is a flow diagram of a method 500 a team member 15, facilitator 20, or shadow 115 experiences when logging into a website providing the interactive collaboration. For purposes of this discussion, the team members 15, facilitator 20, and shadows 115 will be referred to generically as a "user" unless otherwise specified.

At the 'login' step 505, the user can select typical website features when logging into a website. Here, the user can go to a 'forgot password' step 510. In step 515, the method 500 asks the user for an answer to a secret question that was set when the user was added. After the user answers the question and is reminded of his password, the user returns back to the 'login' step 505. The user may also choose to learn about e-wings™ in step 540. In step 545, the user views information about the source of the website, which contains a high-level explanation of the source of the website along with a demonstration and option to contact the company. Following step 545, the method 500 returns back to the 'login' step 505.

The user may also choose to enter the website. In step 520, the user enters an ID and password and "clicks" a soft-button to enter the website. In step 525, the user selects a company/client. In step 530, if the user is associated with more than one company or client, the user selects one. In a particular embodiment if the user is associated with only one company or client, the 'select company/client' page is skipped. In step 535, the user proceeds to the home page 210, 215, 220 (FIG. 2A) for the facilitator 20, team member 15, or administrator, respectively.

Figure 6:
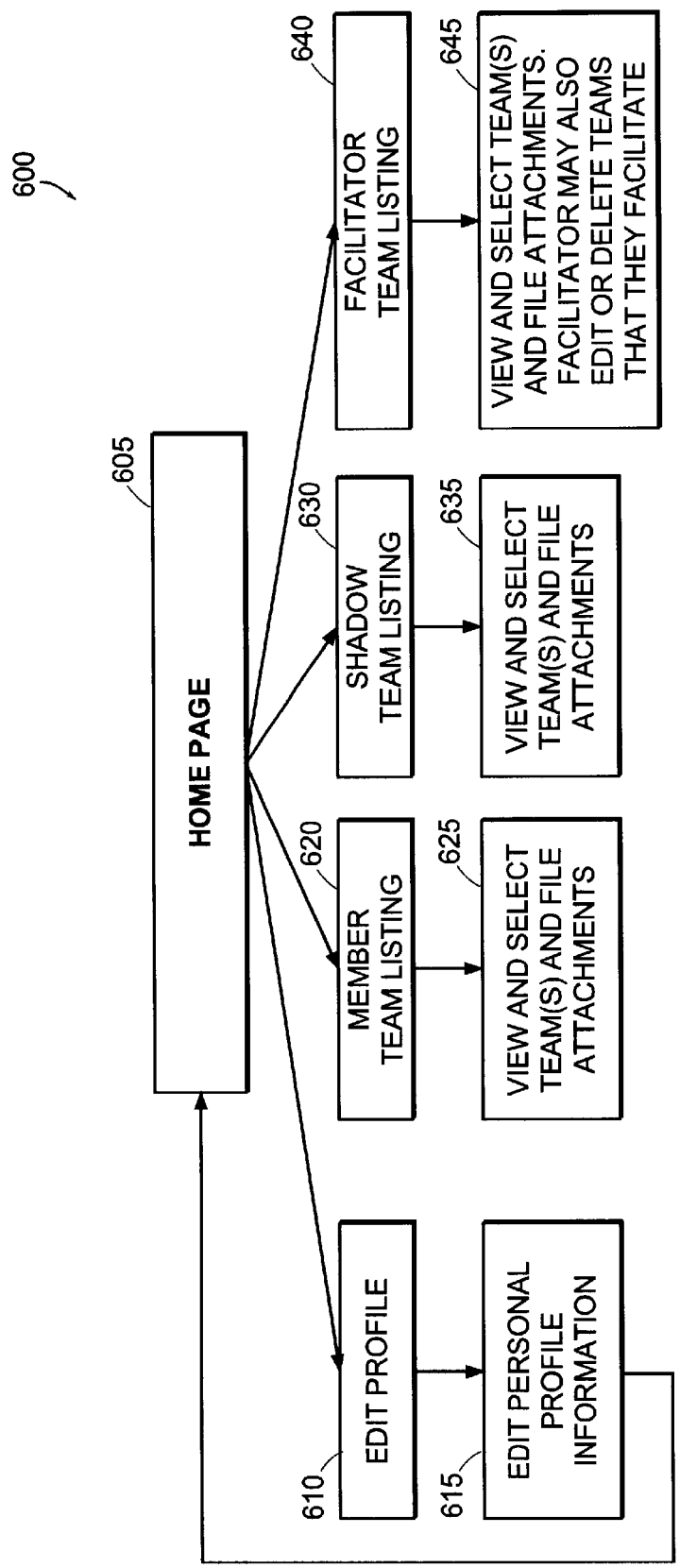
FIG. 6 is a flow diagram of a method of a home page of FIGS. 4A and 4B.

FIG. 6 is a flow diagram of a method 600 experienced by a user at the home page associated with the user. In step 605, the user can make a selection to proceed in one of four directions in the method 600. If the user proceeds to step 610, the user edits a profile. In step 615, the user edits personal profile information, such as a name, email address, phone number, or password. Once done, the method 600 returns to step 605.

If the user proceeds to step 620, the user receives a member team listing. In step 625, the user views and selects any team of which he is a member and adds or views file attachments for the team.

If the user proceeds to step 630, the user, who is typically a shadow user, receives a shadow team listing. In step 635, the user views and select a team of which he is a shadow and adds or views the attachments for the team.

If the user is a facilitator, then the user may go to step 640 to view a facilitator team listing. In step 645, the facilitator views and selects any team of which he is a facilitator and adds or views file attachments for the team. In this particular embodiment, this facilitator team listing only appears on the facilitator home page 210 (FIG. 2A). Facilitators may also edit or delete teams that they facilitate.

Figure 7:
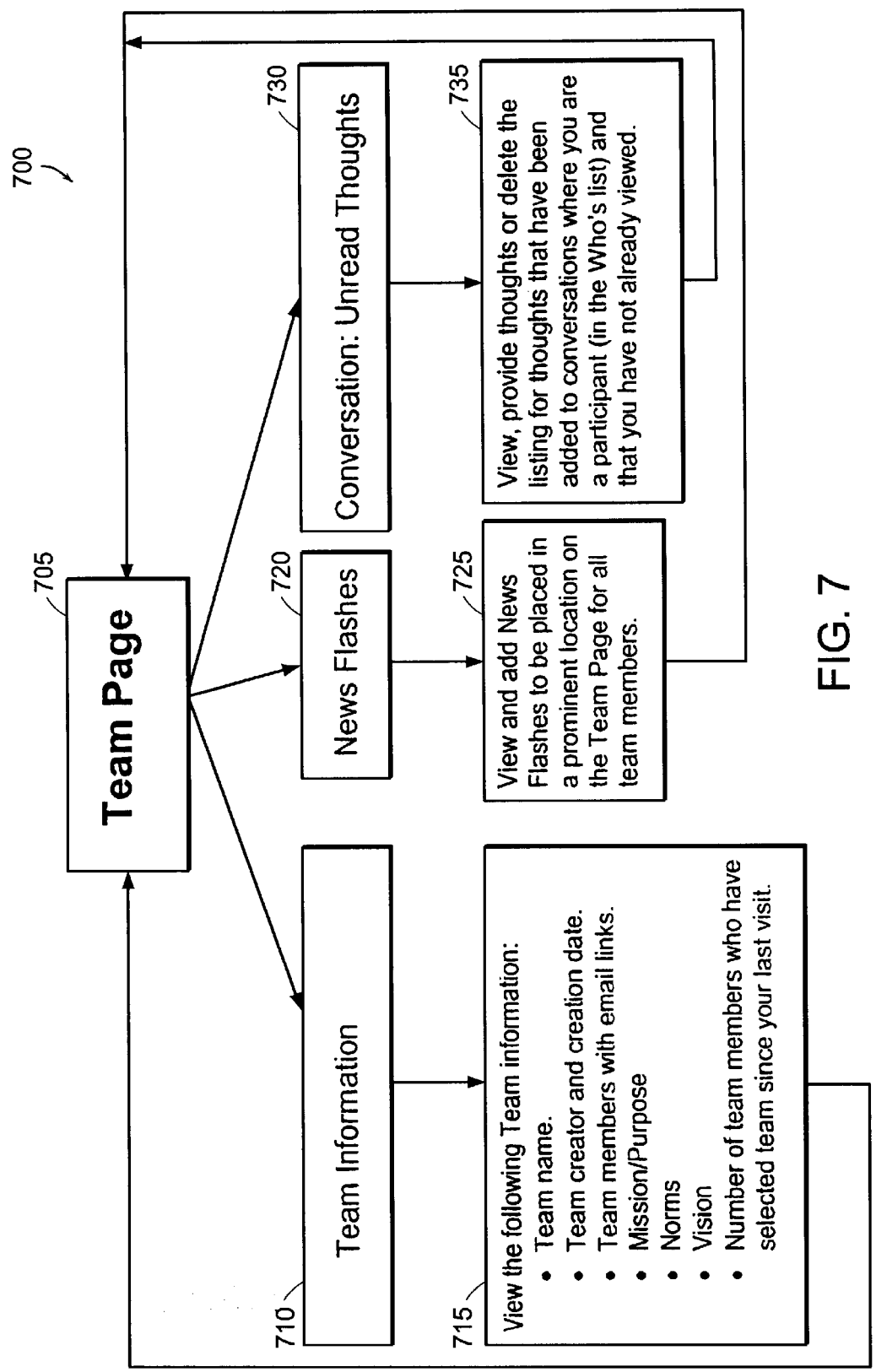
FIG. 7 is a flow diagram of a method supporting a team page of FIGS. 4A and 4B.

FIG. 7 is a flow diagram of a method 700 a user experiences at a team page 225 (FIG. 2A). At the team page step 705, the user may select team information, provided in step 710. In this particular embodiment, the team information, as listed in step 715, includes: team name, team creator and creation date, team members with email links, mission/purpose (of the team), norms, vision, number of team members who have used software system 200 (FIG. 2A) and have selected this team since this user's last visit. Following step 715, the method 700 returns back to step 705 for other selections.

In step 720, the user can view news flashes provided for the team members 15 to view. In step 725, the user can view and add news flashes to be placed in a prominent location on the team page 225 for all team members 15. Following step 725, the method returns to step 705.

In step 730, the user can view a conversation. An indication is highlighted, in this particular embodiment, indicating that there are "unread thoughts" in the conversation. In other words, thoughts have been added since the user last read through the conversation related to this team's tasks.

As will be discussed in reference to FIGS. 9 through 23, in a particular embodiment, the users have additional selections beyond those shown here in FIG. 7. These additional selections are provided through user selectable icons on the team page 225, where the icons may differ slightly from user to user based on whether the user is a team member 15, facilitator 20, shadow, or administrator.

Figure 8:
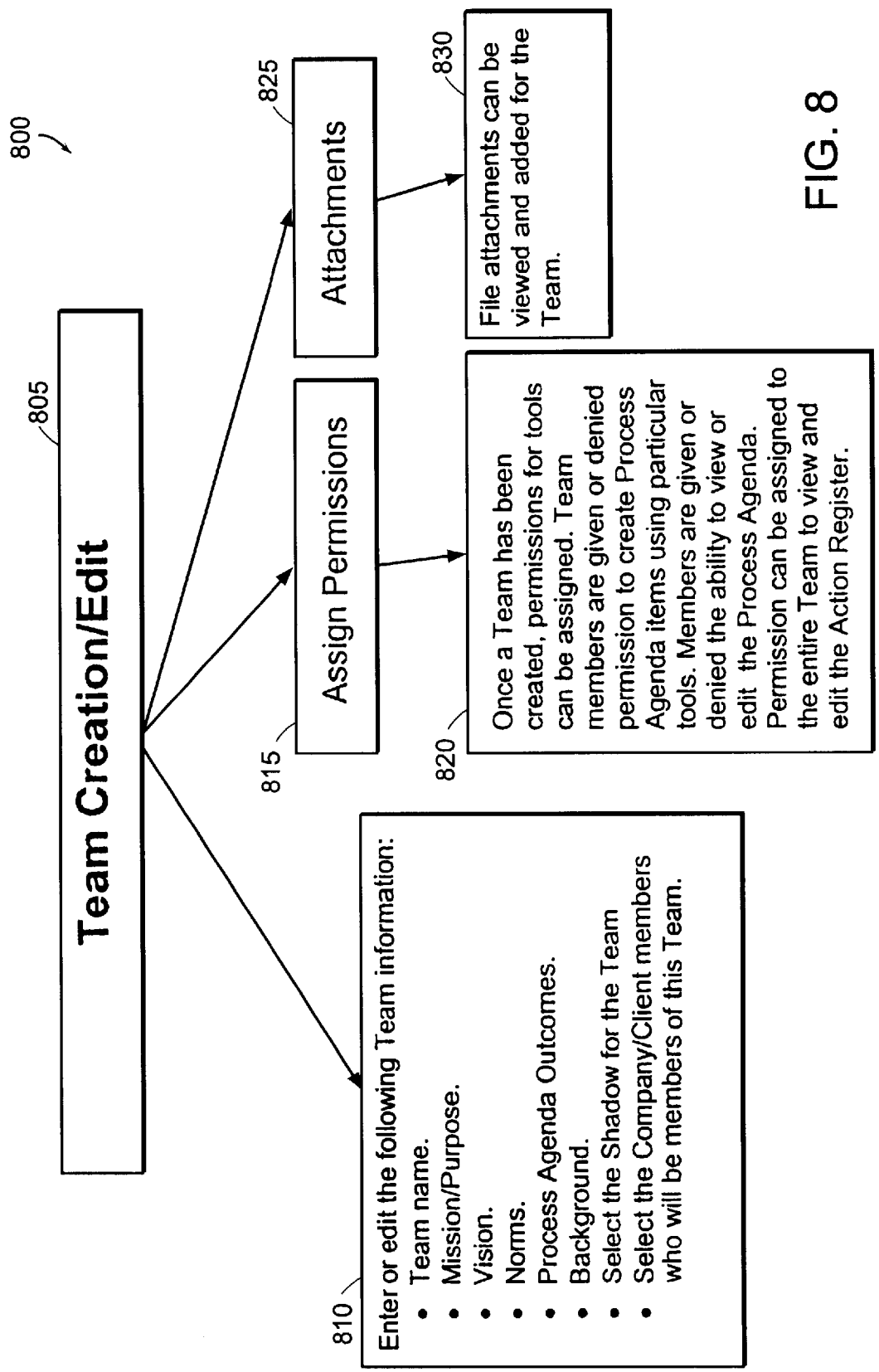
FIG. 8 is a flow diagram of a method employed by a facilitator to create or edit a team in a step of the method of FIG. 4A.

FIG. 8 is a flow diagram of a method 800 provided in the 'team creation' page 230 (FIG. 2A). In step 805, the facilitator, to whom this page is provided but not to team members 15 or shadows, may select from among three choices. In step 810, the facilitator 20 may enter or edit team information. Information that can be entered or edited includes, in this particular embodiment, the following: team name, mission/purpose, vision, norms, process agenda outcomes, background, shadows for the team, and company/client members who will be members of this team.

The facilitator 20 may also choose to assign permissions in step 815. In step 820, once a team has been created, permissions for tools (e.g., 'significance test' tool 243, 'significance scan' tool 244, or 'voting/rating' tool 241 (FIG. 2B)) are assigned. In this particular embodiment, team members 15 are given or denied an ability to view or edit the 'process agenda', and permission can be assigned to the entire team to view and edit the 'action register'.

The facilitator 20 may also choose to work with attachments in step 825. In step 830, the facilitator 20 may view and/or file attachments for the team to access.

Figure 9:
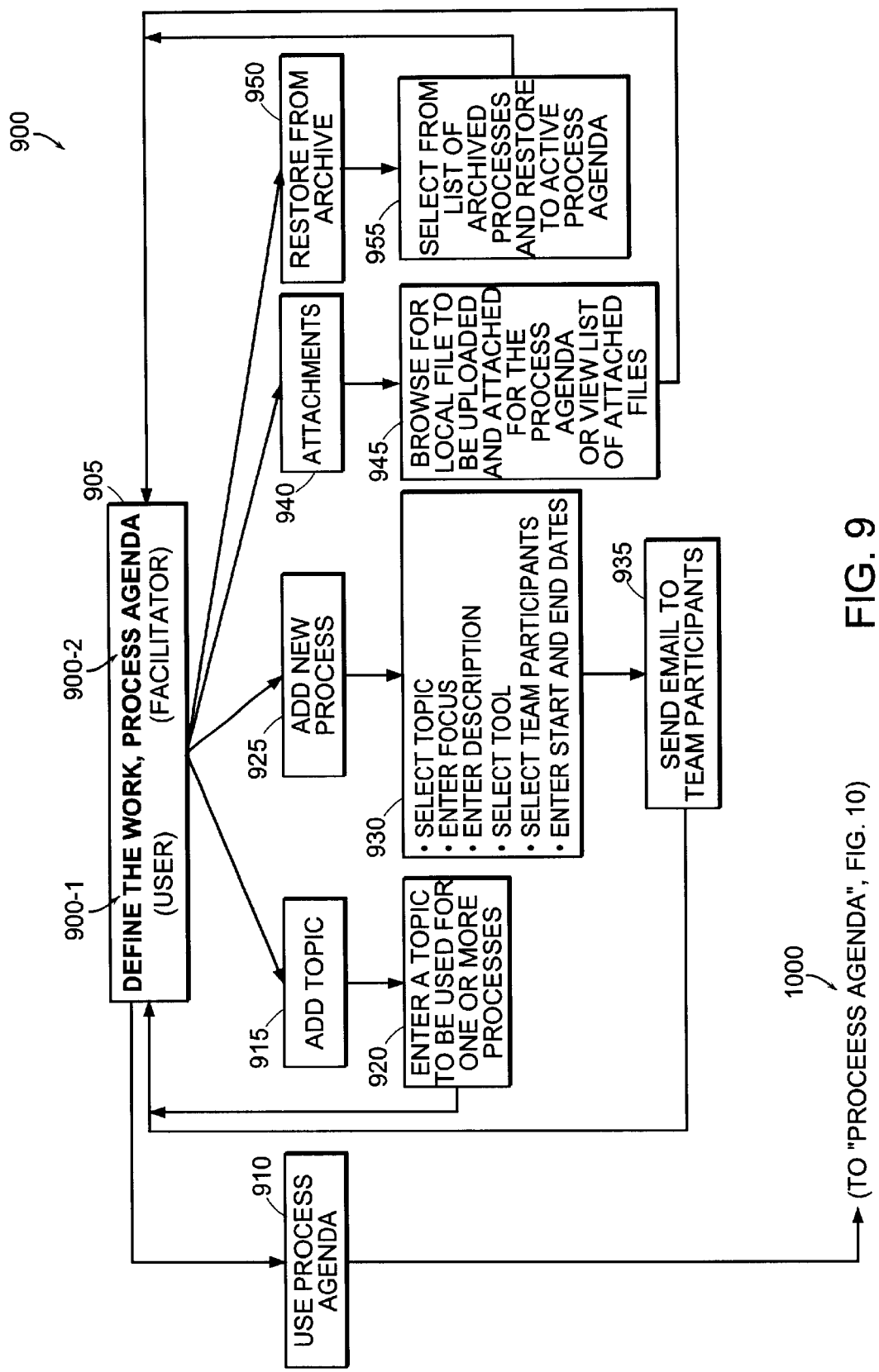
FIG. 9 is a flow diagram of a method defining a step in the flow diagrams of FIGS. 4A and 4B for defining the work of the team and process agenda for the team.

FIG. 9 is a flow diagram of two methods 900-1, 900-2 (collectively 900) executing in the software system 200 (FIG. 2A). One method 900-1, 'define the work', is for the team members 15 (i.e., users), and the other method 900-2 is used by a facilitator 20 to set up a 'Process Agenda'. These methods 900 are similar except for the permissions given to the team members 15 and facilitators 20. Team members 15 are able to define the work, but do not have permission needed in this particular embodiment to define starting dates and closing dates, provide instructions, allocate user capabilities, and provide other input to control the process agenda.

One possible definition of a process agenda is an agenda used to guide the work of a team and provide an overview of the team's online work. Each agenda item includes topic, focus, process, person(s) responsible, and anticipated completion dates.

Referring now to the flow diagram of FIG. 9, in step 905, the methods 900 determines whether a team member 15 has selected to 'define the work' 900-1 or a facilitator has selected a 'process agenda' tool 900-2. In either case, the flow is the same but for those aspects of the flow dependent on the permission of the user and the ability to define certain aspects of the flow or parameters of the output from the methods 900 based on this permission.

If the user has selected to add a topic (step 915), then the methods 900 allows this user to enter a topic (step 920) to be used for one or more processes that compose the process agenda for the team. The methods 900 return to step 905 allow the user to select another function of the methods 900. If the user chooses to add a new process (step 925), then the facilitator 20 provides input for the new process (step 930). Here, the user selects a topic, enters a focus, enters a description, selects a tool (e.g., harmony model, significance scan), selects team participants, and enters start and end dates.

Following the entry of this information, an email may be automatically generated for the facilitator 20 to send to the team participants (step 935). Following this action, the methods 900 return to allow the user further selections (step 905).

Step 940 allows the user to add attachments to a given process or the entire process agenda. In step 945, the user, as typical with most graphical user interfaces today, can (i) browse for a local file to be uploaded and attached for a given process or the process agenda or (ii) view a list of attached files. For example, in a balloon promotion topic having an associated process agenda, examples of files that the user may consider attaching to the process agenda are an image of a balloon, store-front display, graphics file of various balloon shapes, and so forth. The methods return to step 905 for continued use by the user.

In step 950, a user is allowed to restore a process from an archive. In step 955, the user is able to select from a list of archived processes and restore at least one of these processes to the active process agenda. The methods 900 return back to step 905 to allow the user to continue work.

Figure 10:
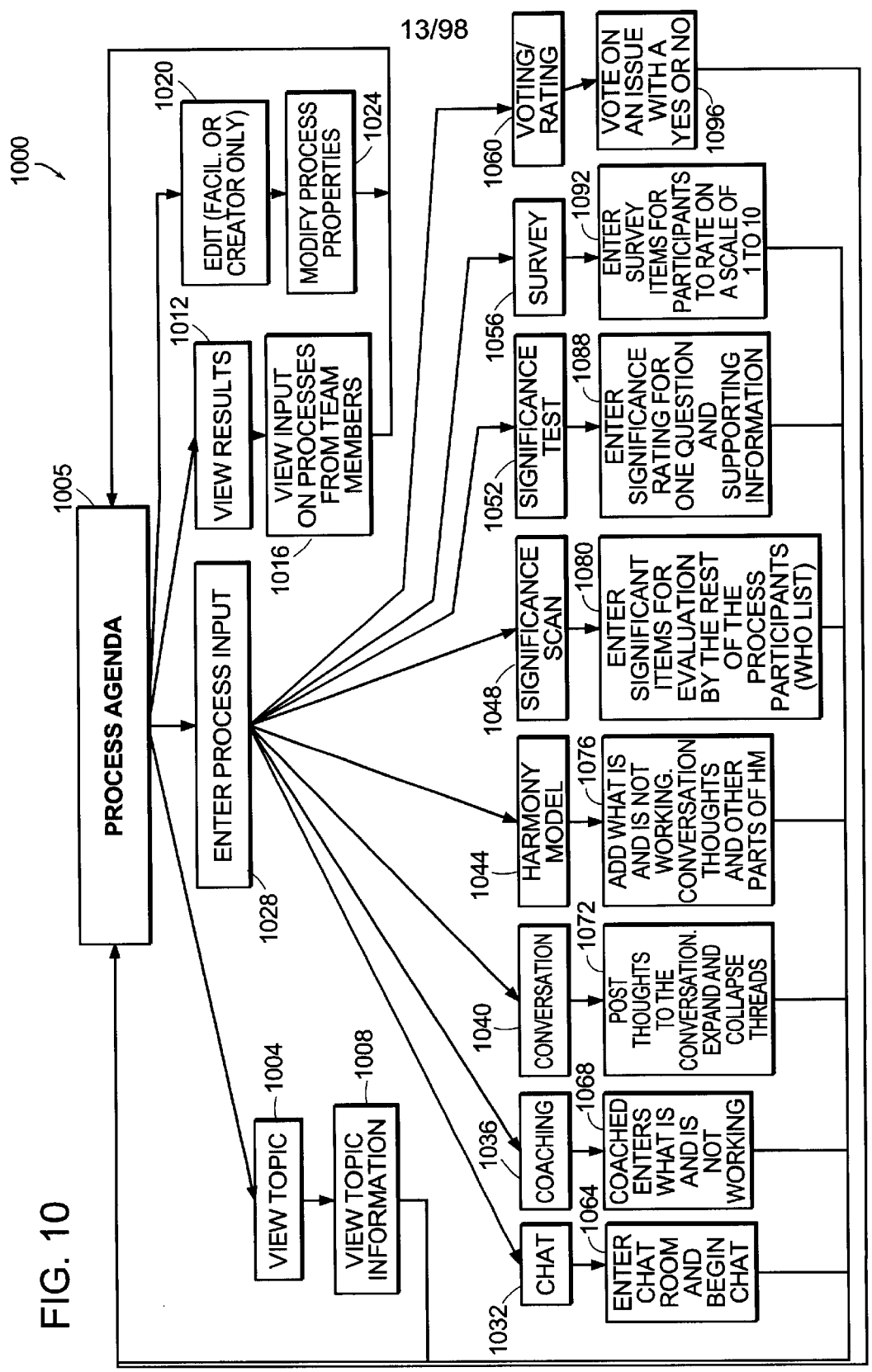
FIG. 10 is a flow diagram of a method for a 'process agenda' selected in FIG. 9.

If the user (i.e., team member 15 or facilitator 20) has selected to use the process agenda (step 910), then the methods 900 continues to the process of FIG. 10 (step 1000).

FIG. 10 is a flow diagram of method 1000 where the user uses the 'process agenda' tool. From the base step 1005, the user is able to view a topic (step 1004), view results (step 1012), or edit (facilitator 20 or creator, which is a team member 15 that created the process agenda, only) (step 1020).

A user wishing to view the topic (step 1004) views the topic information (step 1008) in a typical graphical user interface fashion.

A user who wishes to view the results of a process agenda (step 1012) is able to view input on the processes from the team members (step 1016), which may be shown in a tabular format, for example.

A user who edits the process agenda (step 1020), is then able to modify process properties (step 1024), affecting the way the process agenda works.

A user who enters a process input (step 1028) does so through the use of a plurality of tools (steps 1032–1060). These tools offer a varying degree of structure. The tools will be defined below and then discussed in reference to FIGS. 11–23 in terms of an embodiment of their respective method flows.

Tools Definitions:

The 'chat' tool 1032 allows team members 15 (FIG. 1A) to discuss a topic simultaneously from different locations. A full transcript is retained for the organization's knowledge base.

The 'coaching' tool 1036 enables a consultant or facilitator 20 to coach a member of a team or an organization on generating new possibilities for action.

A 'conversation' tool allows team members to free-flow ideas and record conversations during a period of time. Each team member 15 can remotely and asynchronously use the tool an unlimited number of times and build on the ideas that are emerging from the group. The 'conversation' tool 1040 can be used for brainstorming. A full transcript of the conversation is retained for the organization's knowledge base.

The 'harmony model' tool 1044 enables a team or an organization to identify the 'hear and now', agree on the resultant vision or end state the team wants to achieve, and defines the process to make it happen. The 'harmony model' tool can be used for a group, concept, project, conflict, current crisis and other management, team, and organizational issues.

A 'significance scan' tool 1048 enables a team or group to identify what is important to a team that needs to be addressed in order for the team to succeed. The 'significance scan' tool 1048 can also be used on an enterprise-wide basis to determine the important issues around a specific topic. Once the important issues are identified, it provides the mechanism to access the relative importance of each.

A 'significance test' tool 1052 allows group members to evaluate the likelihood of success of an idea or to measure the degree of commitment to that idea. The 'significance test' tool 1052 also surfaces issues, obstacles to success, and potential ways to resolve the issues. The 'significance test' tool 1052 can be used to clarify vision, evaluate an alternative, survey multiple alternatives, better understand conflict around an issue, etc. All ratings and comments are available to all participants, as anonymous or identified. Where the 'significance scan' tool 1048 is used to consider multiple topics at once, the 'significance test' tool 1052 addresses a single topic at a time.

A 'survey' tool 1056 enables an organization to poll members of a team or enterprise on any set of items. Results are available for the total group.

A 'voting/rating' tool 1060 allows team members to rate on a scale of 1–10 or vote 'yes' or 'no' on a given issue.

Referring again to the flow diagram of FIG. 10, beginning at the 'enter process input' step 1028, if the user selects 'chat,' then the 'chat' tool 1032 is launched on the browser 130, and the user enters a chat room and begins to chat (step 1064). In the case of the 'chat' tool 1032, there maybe an applet disposed on the user's computer 30, or other network device used to interface with the interactive collaboration system.

If the user's process input in step 1028 is 'coaching', then the "coached" user enters what is and is not working (step 1068).

If the user selects 'conversation' then, in step 1072, the user posts thoughts to a selected conversation. One feature of this conversation is an ability for the user to expand and collapse threads of the conversation to make reading easier.

If the user selects (step 1028) the 'harmony model' tool 1044, the user adds to a discussion, provides input of what is and is not working, conversation thoughts, and partakes in other parts of the 'harmony model' tool (step 1076), discussed by way of example later.

If the user wishes to participate in analyzing and making decisions, then the user may select the 'significance scan' tool 1048. Here the user enters significant items for evaluation by the rest of the process participants (step 1080).

If the user wants to analyze and/or make decisions for a single topic, then the user selects the 'significance test' tool 1052. Here, the user enters significance ratings for one question and supporting information (step 1088).

If the user wishes to take part in a survey, then the user selects the 'survey' tool 1056. In one particular embodiment, the user enters survey items for participants to rate on a scale of 1 to 10 (step 1092).

If the user wants to participate in voting/rating for a given topic, then the user selects the 'voting/rating' tool 1060. In one particular embodiment, the user votes on an issue with a 'yes' or 'no' (step 1096).

The tools 1032–1060 just described have varying degrees of structure. The 'chat' tool 1032 on the left is virtually unstructured, while the 'voting/rating' tool 1060 on the right is very structured with free-forming conversation, allowing binary 'yes' or 'no' inputs. The tools 1036–1056 between the 'chat' and 'voting/rating' tools have increasing levels of structure from left to right for the team members to provide their collaborative inputs.

As indicated by the flow of these embodiment of the method 1000, following the usage of the tools described above, the process agenda page 240 associated with the process agenda method 1000 tends to act as a main page for the interactive collaboration for the team members 15 and facilitator 20 when participating in the interactive collaboration, since all processes return back to the process agenda step 1005.

Figure 11:
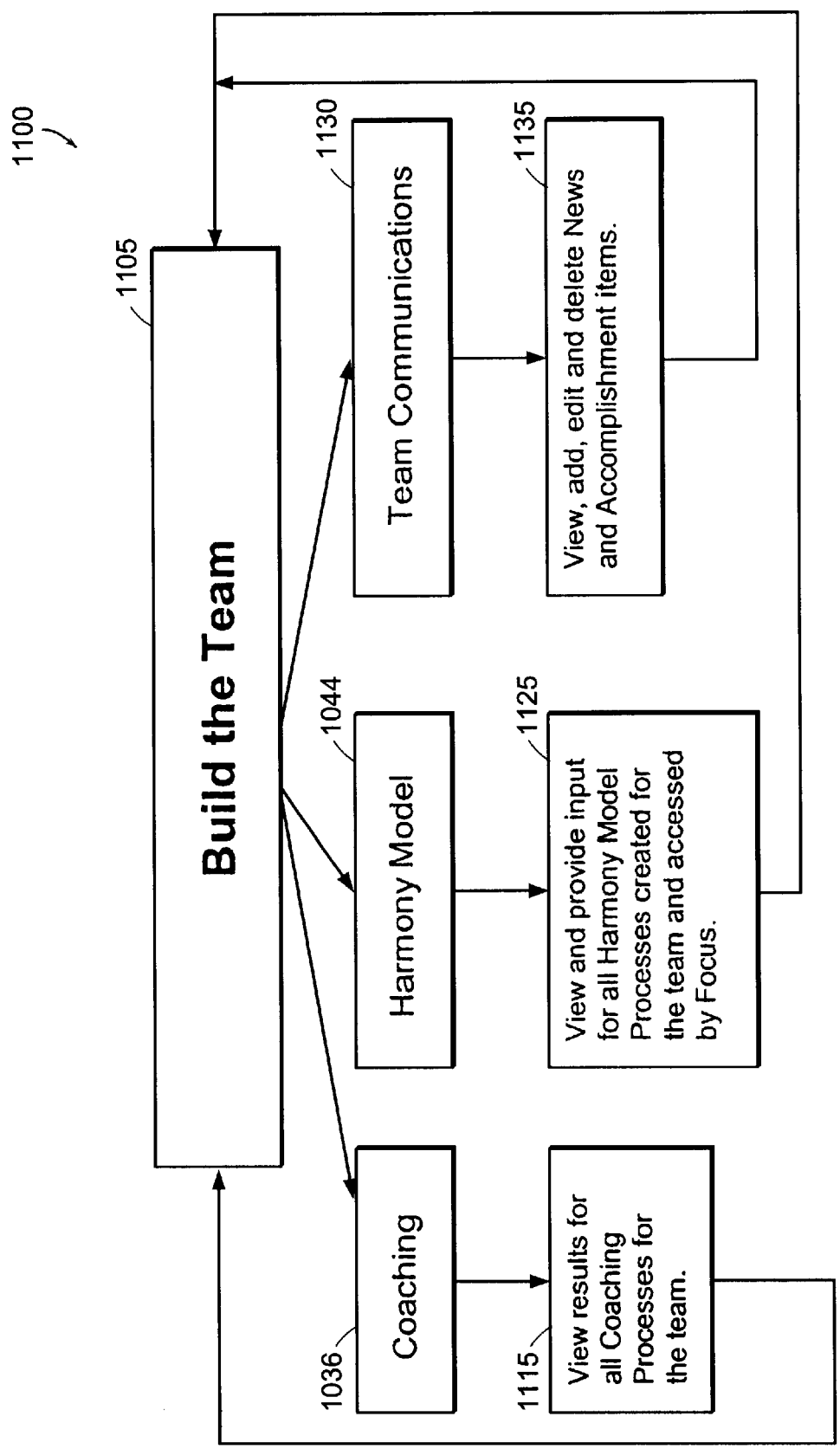
FIG. 11 is a flow diagram of a method used by a facilitator of FIG. 1A used in the process of FIG. 10 for building a team for the interactive collaboration.

FIG. 11 is a flow diagram of a method 1100 provided by the software system 200 to allow the team member 15 or facilitator 20 to build a team (step 1105). In building the team, the user can define the coaching using the 'coaching' tool 1036. Here, the user can view results for all coaching processes for the team (step 1115).

The user can also use the 'harmony model' tool 1044 to view and provide input for all 'harmony model' processes created for the team and accessed by the team members (step 1125).

The user can also use a 'team communications' tool 1130 to view, add, edit and delete news and accomplishment items (step 1135).

Figure 12:
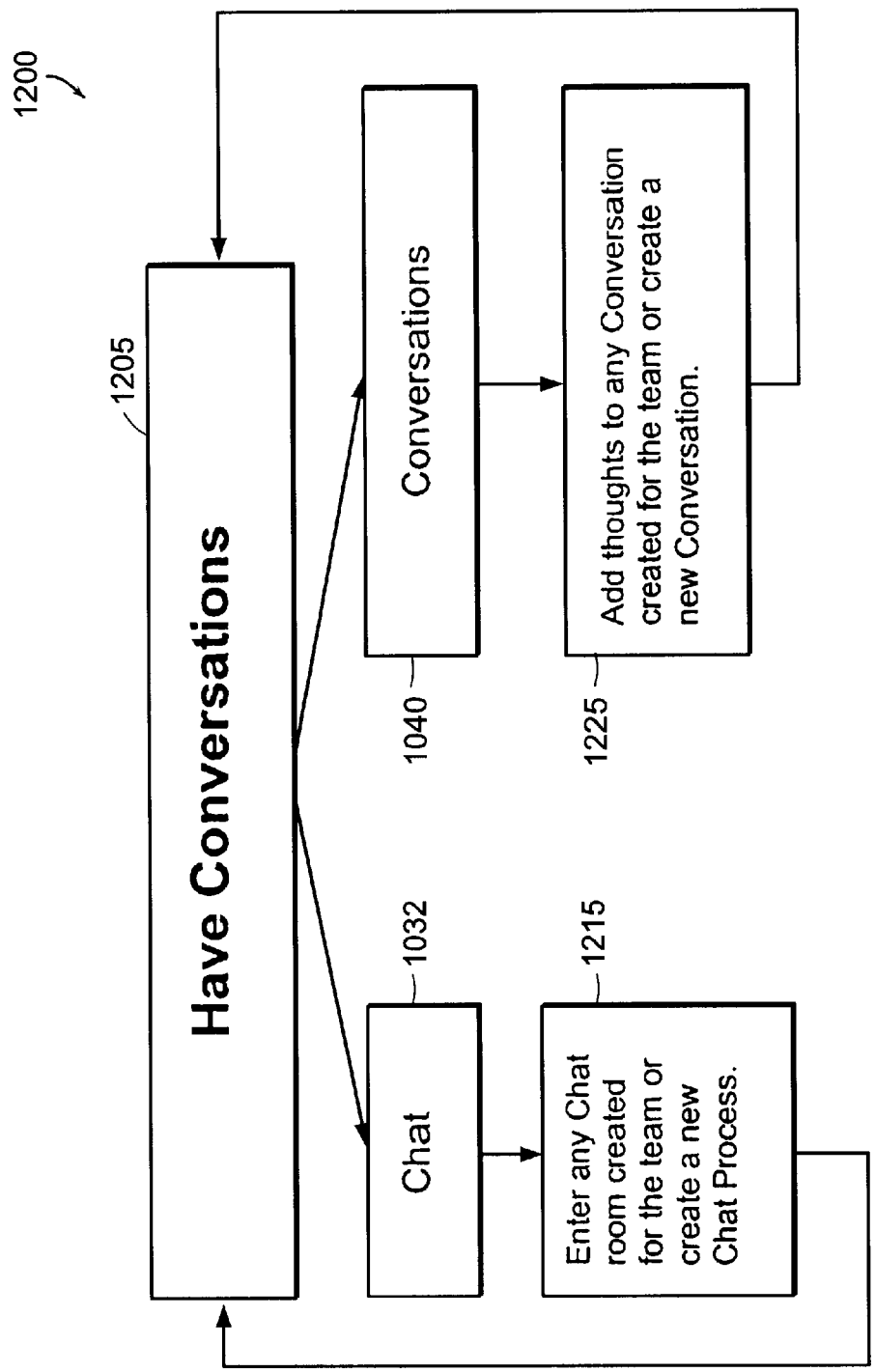
FIG. 12 is a flow diagram of a process used by team members of FIG. 1A during the interactive collaboration according to one embodiment.

FIG. 12 is a flow diagram of a method 1200 for having conversations among the users. When having conversations (step 1205), the user can choose whether to use the 'chat' tool 1032 or the 'conversations' tool 1040. If using the 'chat' tool 1032, the user can enter any chat room created for the team or create a new 'chat' process. If the user uses the 'conversations' tool 1040, the user can add thoughts to any conversation created for the team or create a new conversation (step 1225).

Figure 13:
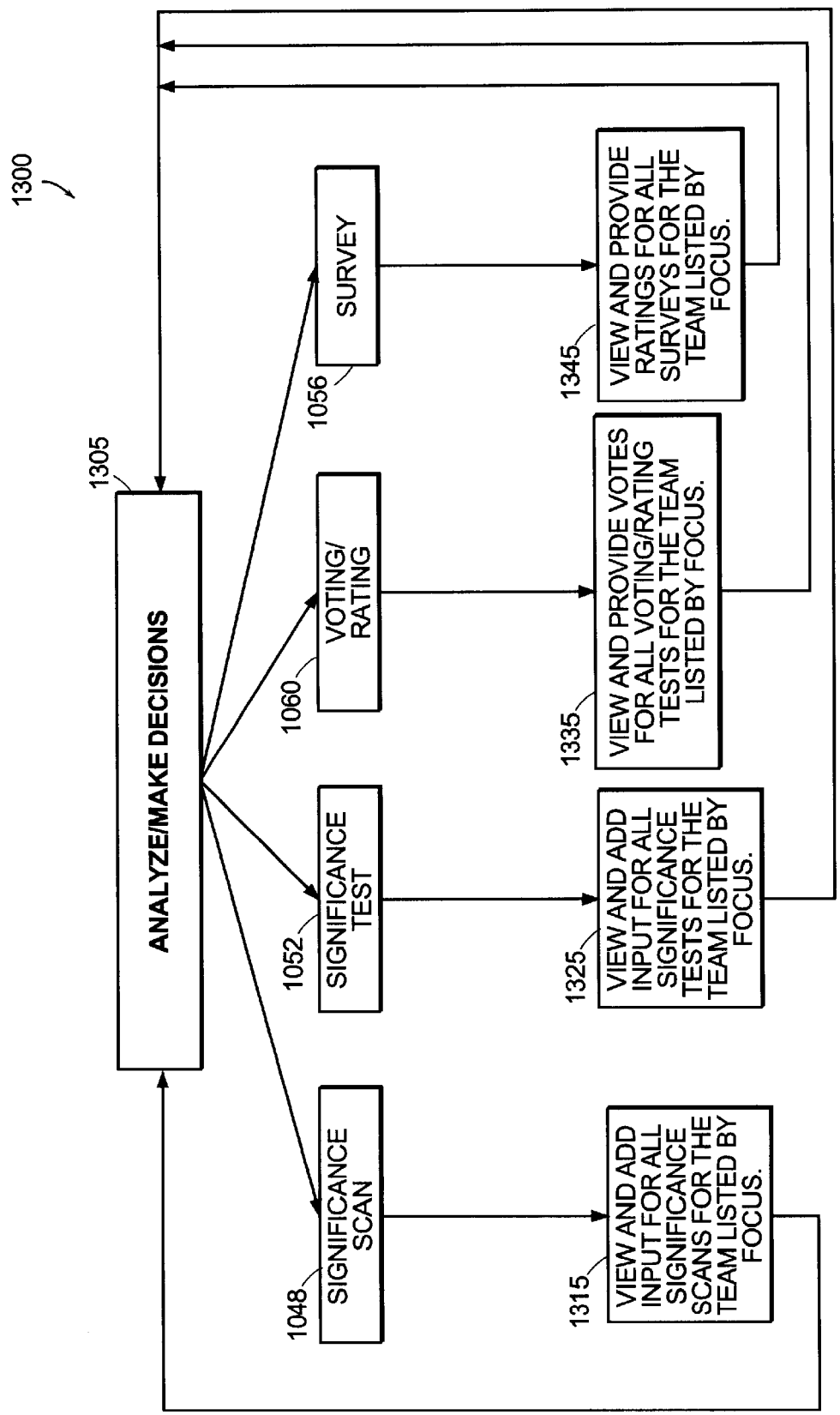
FIG. 13 is a flow diagram of a method used by the team members of FIG. 1A to analyze and make decisions resulting from input received from team members during the interactive collaborations.

FIG. 13 is a flow diagram of a method 1300 in which the user analyzes/makes decisions on a given topic. When analyzing/making decisions (step 1305) the user can select one of the following tools: significance scan, tool 1048, 'significance test' tool 1052, 'voting/rating' tool 1060, and 'survey' tool 1050. When using the 'significance scan' tool 1048, the user can view and add input for all significance scans for the team. When using the 'significance test' 1050, the user can view and add input for all significance test for the team (step 1325). When using the 'voting/rating' tool 1060, the user can view and provide votes for all voting/rating tests for the team (step 1335). When using the 'survey' tool 1056, the user can view and provide ratings for all surveys for the team (step 1345).

Figure 14:
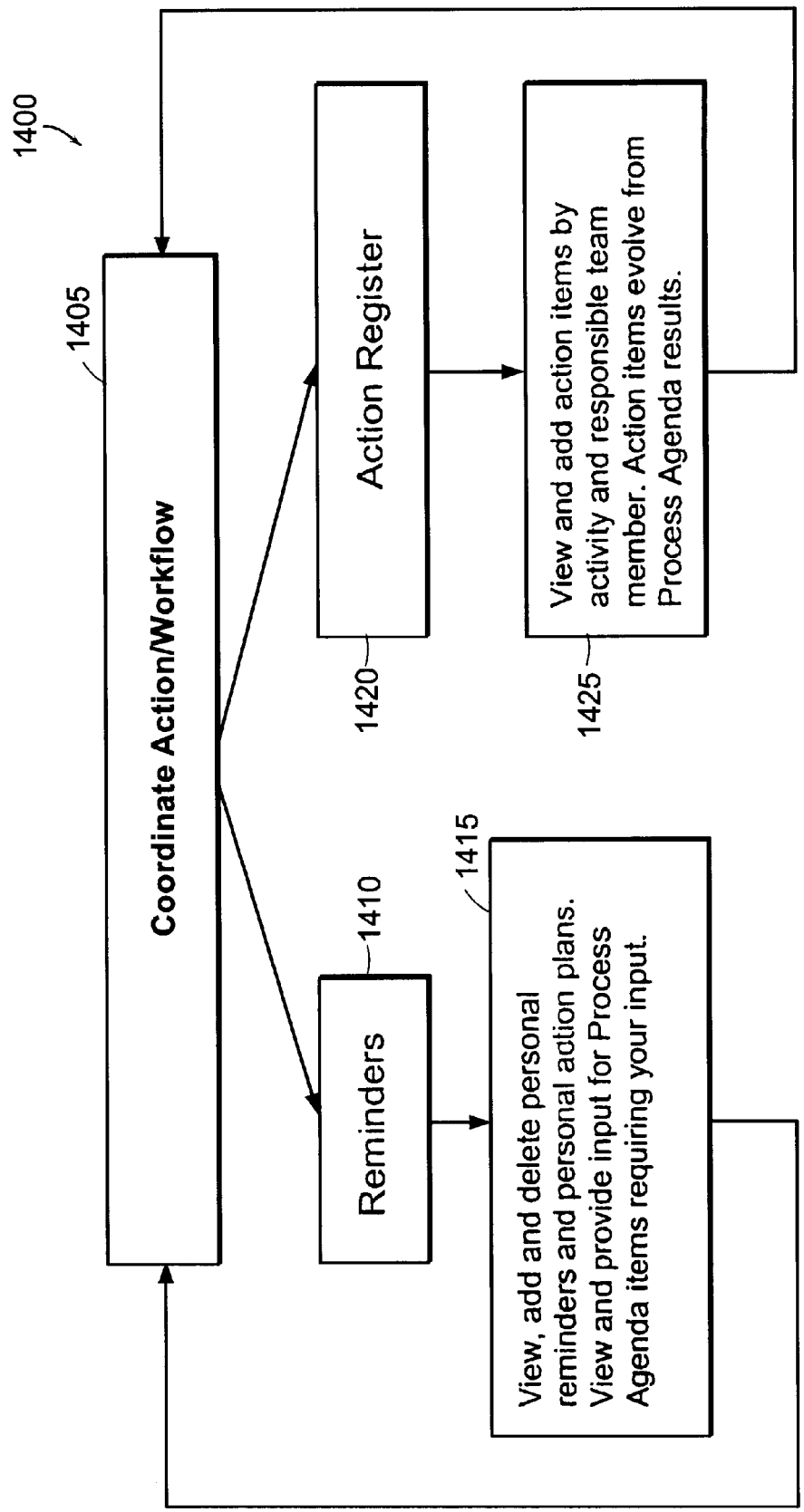
FIG. 14 is a flow diagram of a method used to coordinate action and work flow of the team members of FIG. 1A resulting from an interactive collaboration.

FIG. 14 is a flow diagram of a method 1400 for which the user can coordinate action/work flow. At step 1405, the user decides whether to use a 'reminders' tool 1410 or an 'action register' tool 1420. The 'reminders' tool 1410 provides a place for a team member to place his or her own reminders with the team reminders. When using the 'reminders' tool 1410, the user can view, add, and delete personal reminders and personal action plans (step 1415). Viewing and providing input for process agenda items requires the user's input.

When using the 'action register' tool 1420, the user can create an action plan including: what needs to be done, when it needs to be done, and who is going to do it. Items can be generated from other software system 200 (FIG. 2A) tools or spontaneously. The user can view and add action items by activity and responsible team member (step 1425). Action items evolve from process agenda results, as will be shown by example later.

Figure 15:
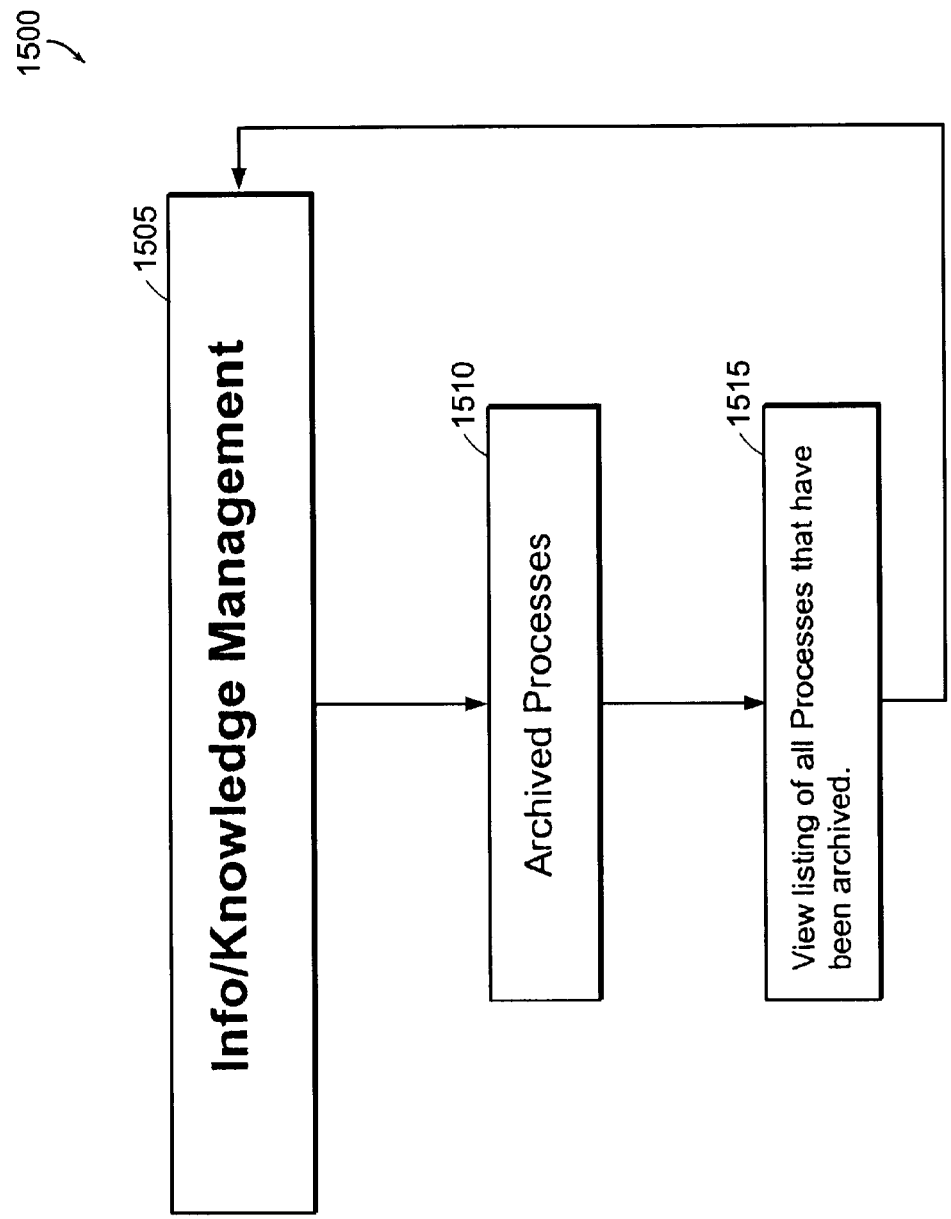
FIG. 15 is a flow diagram of a method used by the team members of FIG. 1A to review archived information collected during an interactive collaborations.

FIG. 15 is a flow diagram of a method 1500 for the user to provide information/knowledge management. The method 1500 begins in step 1505. In step 1510, the method 1500 retrieves archived processes. In step 1515, the method 1500 displays to the user a view listing of all processes that have been archived.

Figure 16:
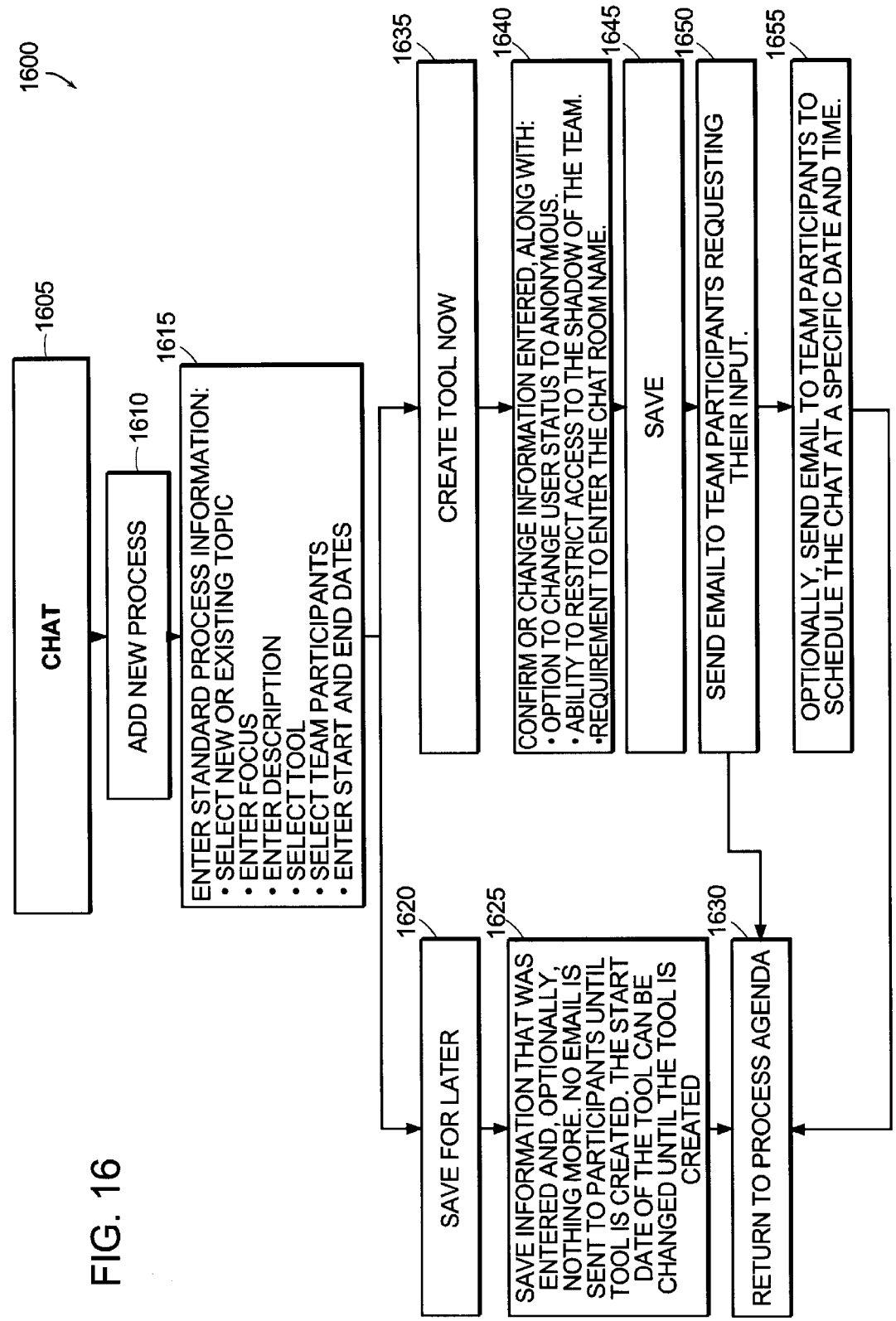
FIG. 16 is a flow diagram of a method used to create a 'chat' tool of FIG. 10.

FIG. 16 is a flow diagram of a method 1600 for creating a new 'chat' process. The method 1600 begins in step 1605. In step 1610, the user can add a new 'chat' process. In step 1615, the user enters standard process information, including: selecting an existing topic or a new topic, entering a focus for the topic, entering a description for the topic, selecting a tool (e.g., 'significance scan' tool 1048), selecting team participants, and entering start and end dates.

The user has the choice of saving the 'chat' process for later (step 1620) or creating the 'chat' process now (step 1635). If saving the 'chat' process for later (step 1620), then the method 1600 saves the information that was entered, and optionally, nothing more. Typically, no email is sent to participants until the 'chat' process is created. The start date of the 'chat' process can be changed until the 'chat' process is created. In step 1630, the method 1032 returns to the 'process agenda' tool 1000.

If the user chooses to create the 'chat' tool 1032 now (step 1635), then, in step 1640, the user confirms or changes the information entered, along with: (i) an option to change the user status to anonymous, (ii) an ability to restrict access for the shadow of the team, and (iii) a requirement to enter the chat room name. In step 1645, the 'chat' process is saved, and in step 1650, an email is sent to team participants requesting their input. Optionally, a second email can be sent to team participants to schedule the chat at a specific date and time (step 1655). After the email(s), the 'chat' method 1600 is complete, and processing continues in the 'process agenda' tool 1000.

Figure 17:
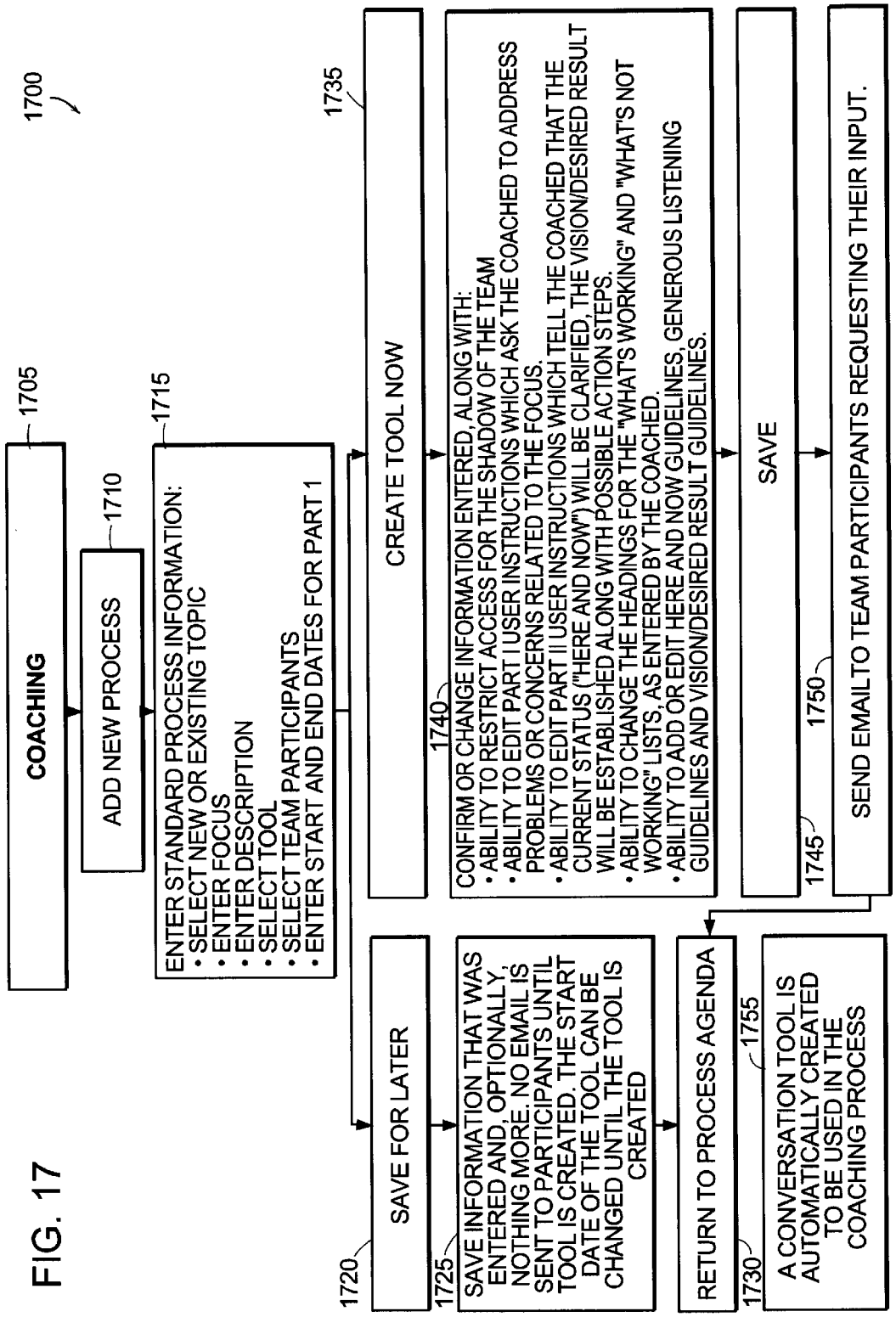
FIG. 17 is a flow diagram of a method used to create a 'coaching' tool of FIG. 10.

FIG. 17 is a flow diagram of a method for setting up a new 'coaching' process. After starting this method (step 1705), the user adds a new 'coaching' process (step 1710). When adding the new 'coaching' process, the user enters standard process information (step 1715), including: selecting an existing or new topic, entering a focus, entering a description, selecting a tool, selecting team participants, and entering start and end dates for Part 1 of the process. Note that the 'coaching' process has at least two parts in this particular embodiment.

The user may save the 'coaching' process for later (step 1720), in which case, the method 1700 saves information that was entered, and, optionally, nothing more. In a particular embodiment, no email is sent to participants until the 'coaching' process 1036 is created. The start date of the 'coaching' process can be changed until the 'coaching' process is created. Following this step, the method 1700 returns to the 'process agenda' tool 1000.

The user may also create the 'coaching' method at this point (step 1735). In step 1740, the user can confirm or change information entered, along with: (i) an ability to restrict access for the shadow of the team, (ii) an ability to edit Part I user instructions that ask the 'coached' to address problems or concerns related to the focus, (iii) an ability to edit Part II user instructions that tell the 'coached' that the current status ("here and now") will be clarified, the vision/desired result may be established along with possible action steps, (iv) an ability to change the headings for the "what's working" and "what's not working" lists, as entered by the "coached," and (v) an ability to add or edit "here and now" guidelines, generous listening guidelines, and vision/desired results guidelines. This information is saved (step 1745), and an email may be sent to team participants requesting that input (step 1750). It should be noted that a conversation tool may be automatically created for use in the 'coaching' process (step 1755). Following the email option, the method 1700 returns to the 'process agenda' tool 1000 in step 1730.

Figure 18:
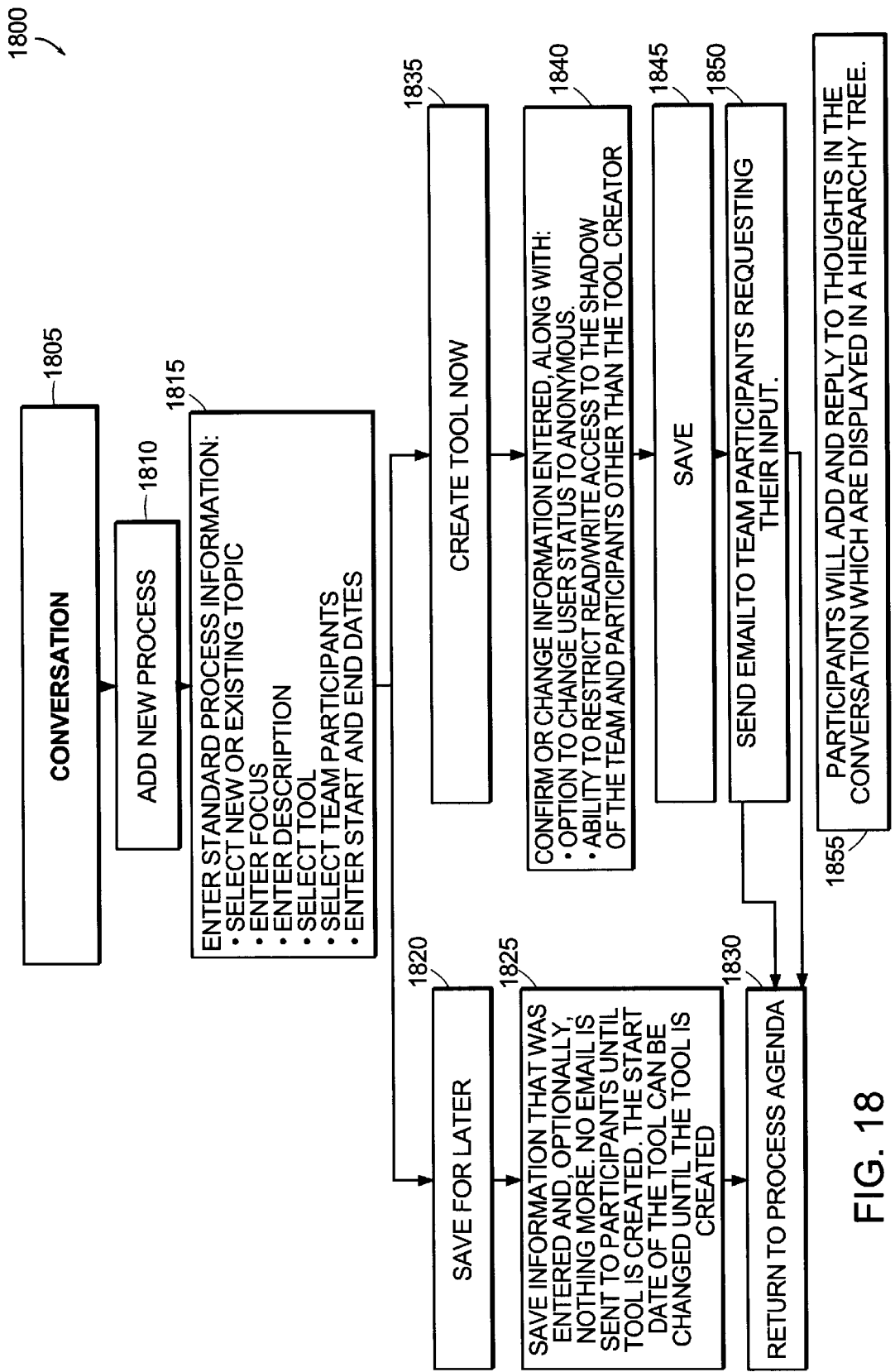
FIG. 18 is a flow diagram of a method used to create a 'conversation' tool of FIG. 10.

FIG. 18 is a flow diagram of a method 1800 for allowing the user to define a 'conversation' process. The method steps 1805 through 1855 are similar to those of methods 1700 for allowing the user to design the 'coaching' tool 1036. There are differences between these two methods 1800 and 1700, such as in step 1840, in which the extra information the users are allowed to confirm or change includes: (i) an option to change user status to anonymous and (ii) an ability to restrict read/write access for the shadow of the team and participants other than the tool creator. Further, in step 1855, the participants may add and reply to thoughts in the conversation that are displayed in a hierarchy tree when using the 'conversation' tool 1040.

Figure 19B:
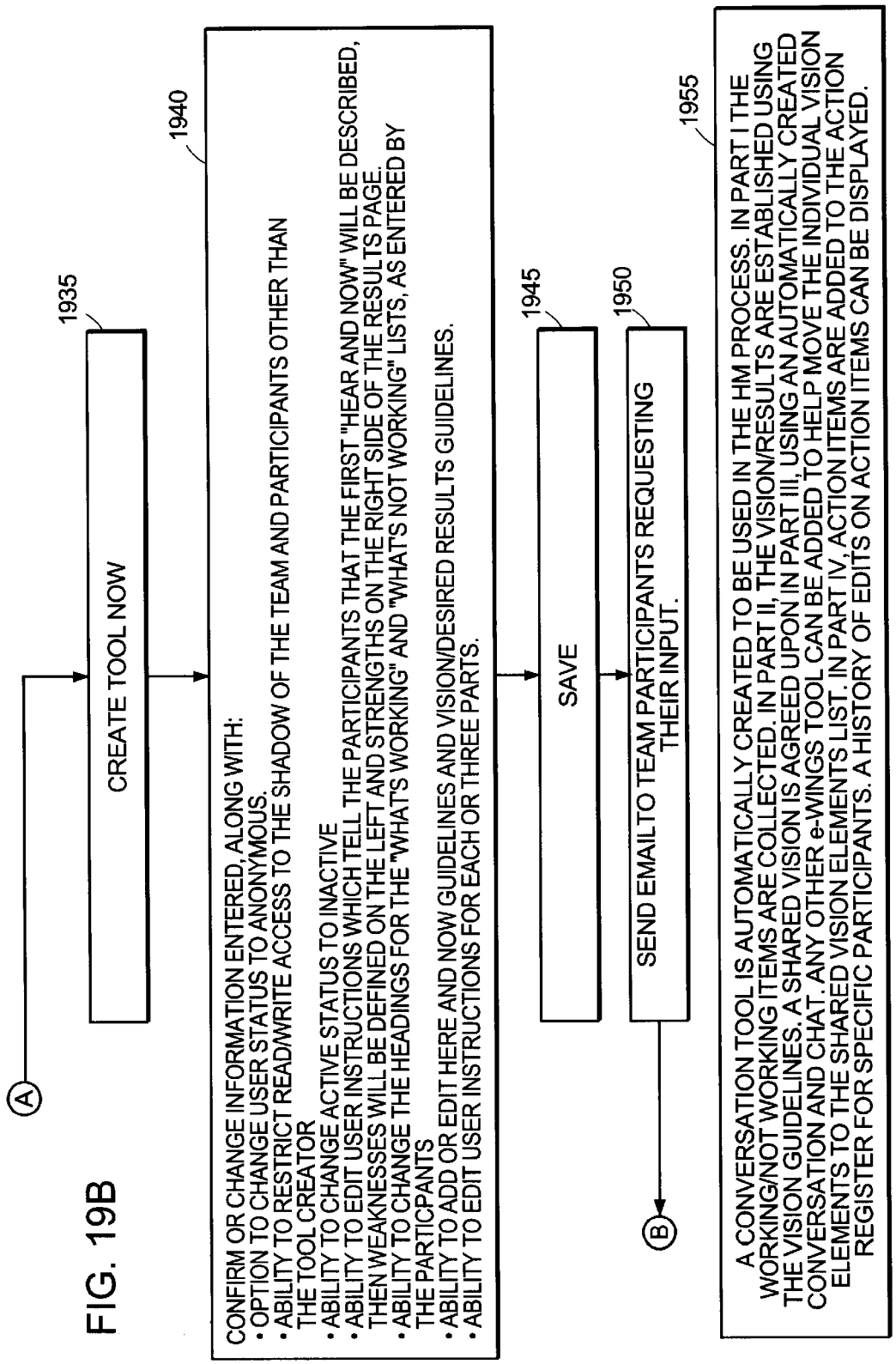
FIG. 19 is a flow diagram of a method used to create a 'harmony model' tool of FIG. 10.

FIG. 19 is a flow diagram of a method 1900 used to create a 'harmony model' tool 1044. The method 1900 for creating the 'harmony model' tool 1044 is similar to the method for designing the 'conversation' tool 1800 and 'coaching' tool 1700. Differences between this method 1900 and those methods 1800, 1700 are found in step 1940, in which the user can confirm or change information, along with: (i) an option to change user status to "anonymous", (ii) an ability to restrict read/write access for the shadow of the team and participants other than the 'harmony model' tool 1044 creator, (iii) an ability to change active status to inactive, (iv) an ability to edit user instructions that tell the participants that first the "here and now" will be described, then weaknesses will be defined on the left and strengths on the right of a results page, (v) an ability to change the headings for a "what's working" and "what's not working" lists, as entered by the participants, (vi) an ability to add or edit "here and now" guidelines and vision/desired results guidelines, and (vii) an ability to edit user instructions for each of three parts.

As stated in step 1955, pertaining to the 'harmony model' tool 1044, a 'conversation' tool 1040 may be automatically created to be used in the 'harmony model' process. In Part I of the 'harmony model' tool 1044, the working/not working items are collected. In Part II of the 'harmony model' tool 1044, the visions/results are established using the vision guidelines. A "shared vision" is agreed upon in Part III of the 'harmony model' tool 1044, using an automatically created conversion and chat. Any other tool discussed herein can be added to help move the individual "vision elements" to the "shared vision elements" list. In Part IV of the 'harmony model' tool 1044, action items are added to the action register for specific participants. A history of edits on action items can be displayed.

FIG. 20 is a flow diagram of a method 2000 designing the 'significance scan' tool 1048. This method 2000 is similar to the other methods discussed 1900, 1800, 1700, but differs in step 2040. In step 2040, the user can confirm or change information, along with: (i) an option to change user status to anonymous, (ii) an ability to restrict access for the shadow of the team, (iii) a requirement to enter a question or comment that is later addressed by multiple items entered by the participants, and (iv) an ability to edit user instructions that ask the participants for important items and the significance of each, in Part II of the 'significance scan' tool 1048. As discussed in step 2055, pertaining to the 'significance scan' tool 1048, Part I of the 'significance scan' ends when the end date is reached or the process status is changed to Part I completed. Part II of the scan asks participants to rate all of the items entered on a scale of 1 to 10 in one particular embodiment.

Figure 21A:
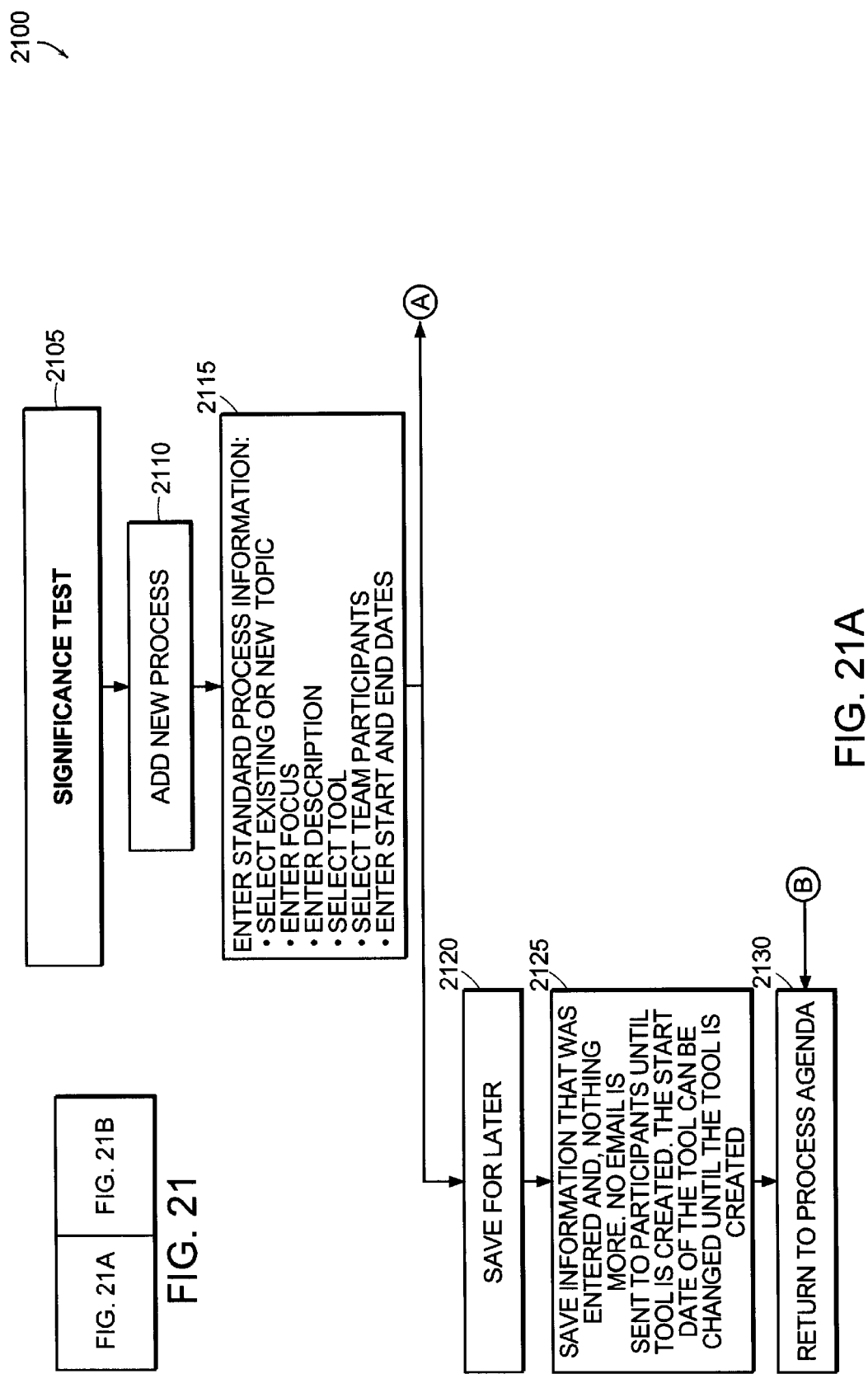
FIG. 21 is a flow diagram of a method used to create a 'significance test' of FIG. 10.
Figure 21B:
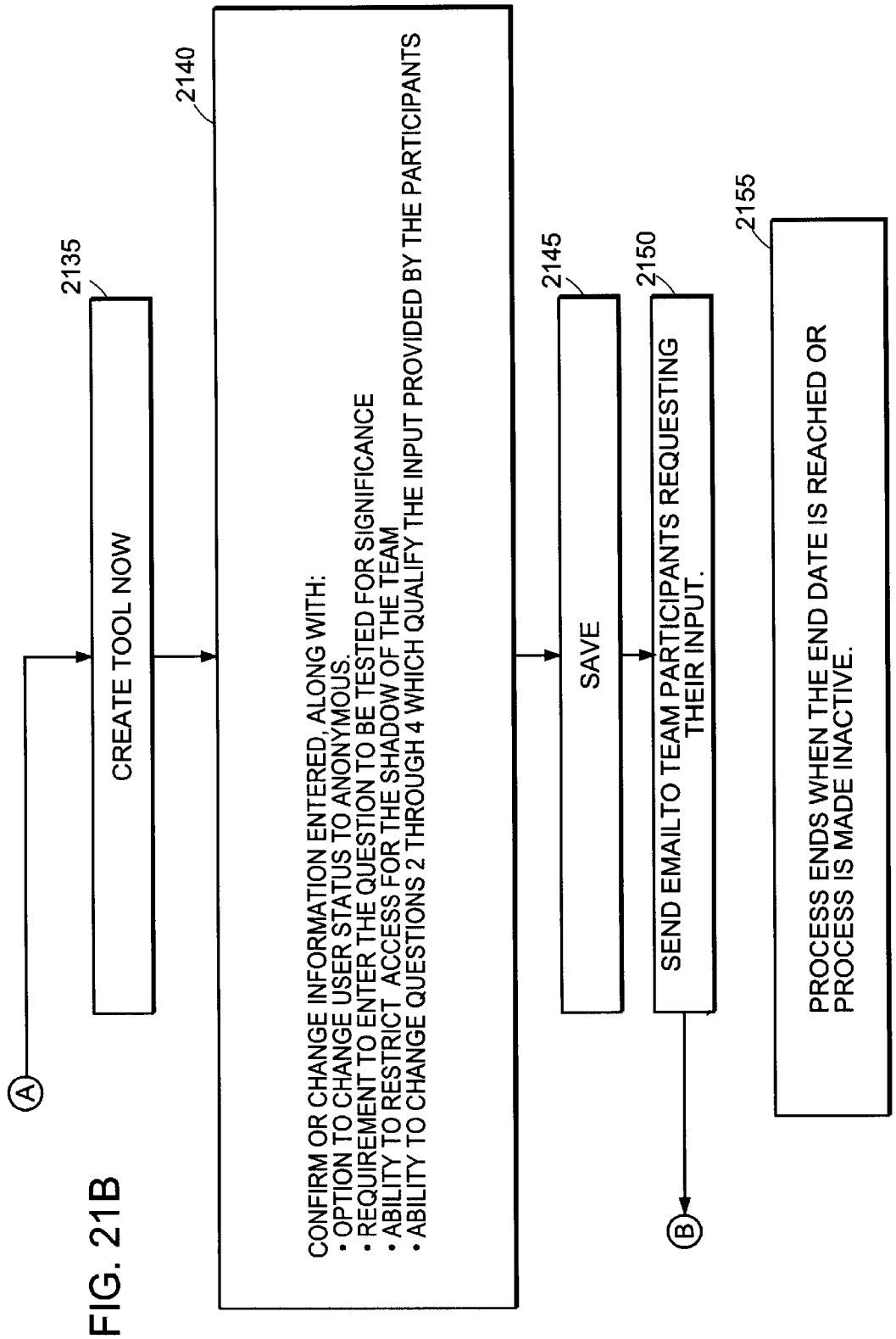

FIG. 21 is a method 2100 for designing a 'significance test' tool 1052. The method 2100 is similar to methods 2000, 1900, 1800, 1700, but differs in step 2140. In step 2140, the user can confirm or change information entered, along with: (i) an option to change user status to anonymous, (ii) a requirement to enter the question to be tested for significance, (iii) an ability to restrict access for the shadow of the team, and (iv) an ability to change questions 2 through 4 that qualify the input provided by the participants. In step 2155, which applies to the 'significance test' tool 1052 overall, the process ends when the end date is reached or the process is made inactive.

FIG. 22 is a flow diagram of a method 2200 for the user to design the 'survey' tool 1056. The method 2200 is similar to the previous methods 2100, ..., 1700 discussed above, but differs in step 2235 and 2250. In step 2235, the user can confirm or change information entered, along with: (i) an option to change user status to anonymous, (ii) an ability to restrict read/write access for the shadow of the team and participants other than the tool creator, (iii) an option to change the rating scale to 1 to 10, 1 to 7, or 1 to 5, and so forth, and (iv) an ability to edit user instructions, where the instructions request a rating of favorable or unfavorable for various items that are added by the creator. In step 2250, the user can add items for the survey provided by the 'survey' tool 1056, which is run by the user with a selection in the 'process agenda' tool 1000 (FIG. 10).

In step 2255, which applies to the 'survey' tool 1056, items are rated by participants with optional comments that can be added or edited. The facilitator or creator can delete items and make the survey inactive.

Figure 23B:
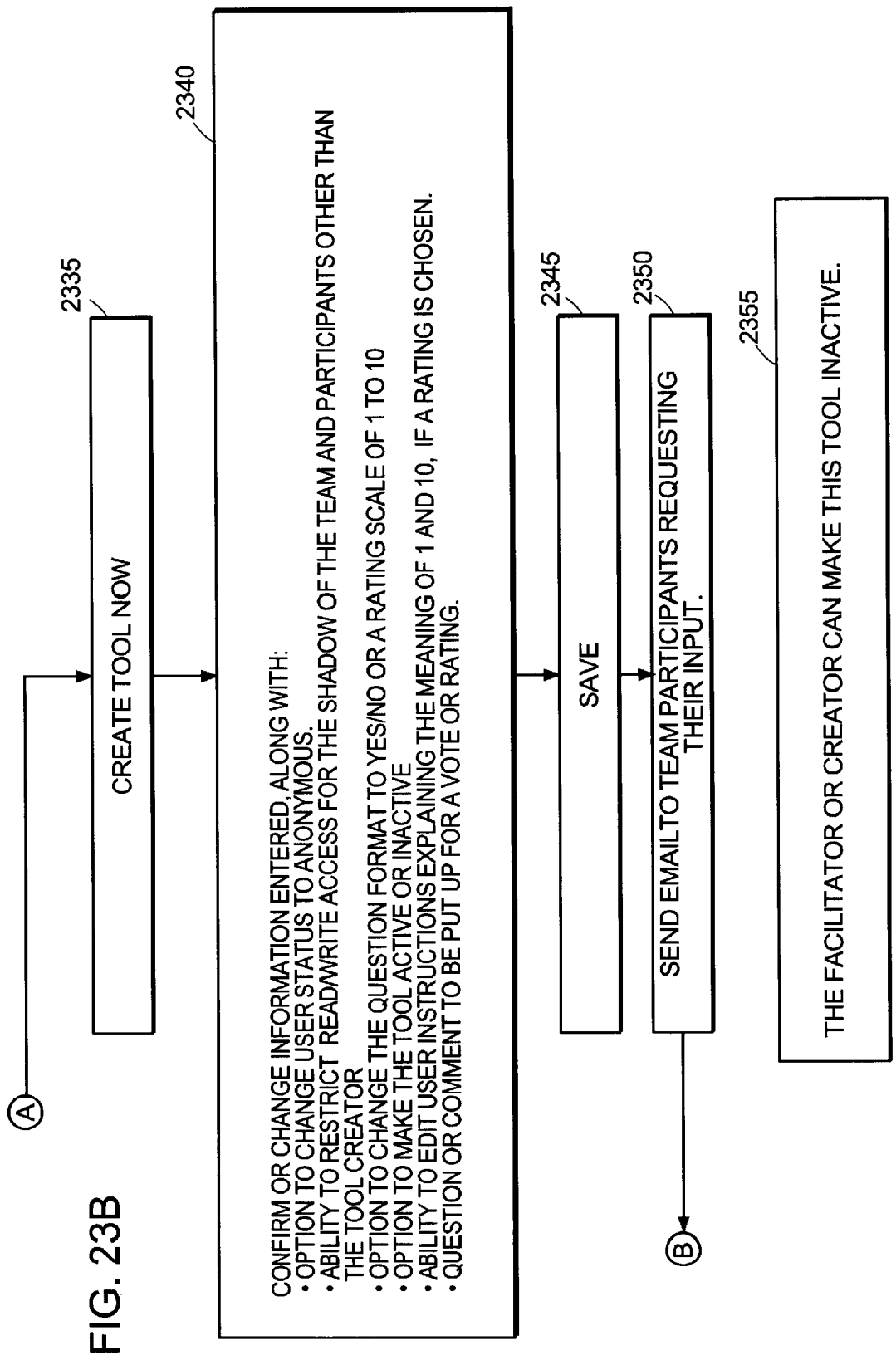
FIG. 23 is a flow diagram of a method used to create a 'voting/rating' tool of FIG. 10.

FIG. 23 is a flow diagram 2300 providing a user with a way to design the 'voting/rating' tool 1060. This method 2300 is similar to the other methods 2200, ..., 1700, except for step 2340. In step 2340, the user can confirm or change information entered, along with: (i) an option to change user status to anonymous, (ii) an ability to restrict read/write access for the shadow of the team and participants other than the 'voting/rating' tool 1060 creator, (iii) an option to change the question format to "yes/no" or a rating scale from 1 to 10, (iv) an option to make the 'voting/rating' tool 1060 active or inactive, (v) an ability to edit user instructions explaining the meaning of 1 and 10, if a rating is chosen and (vi) question or comment to be put up for a vote or a rating. In step 2355, the facilitator 20 or creator of the 'voting/rating' tool 1060 can make this tool inactive.

Figure 24:
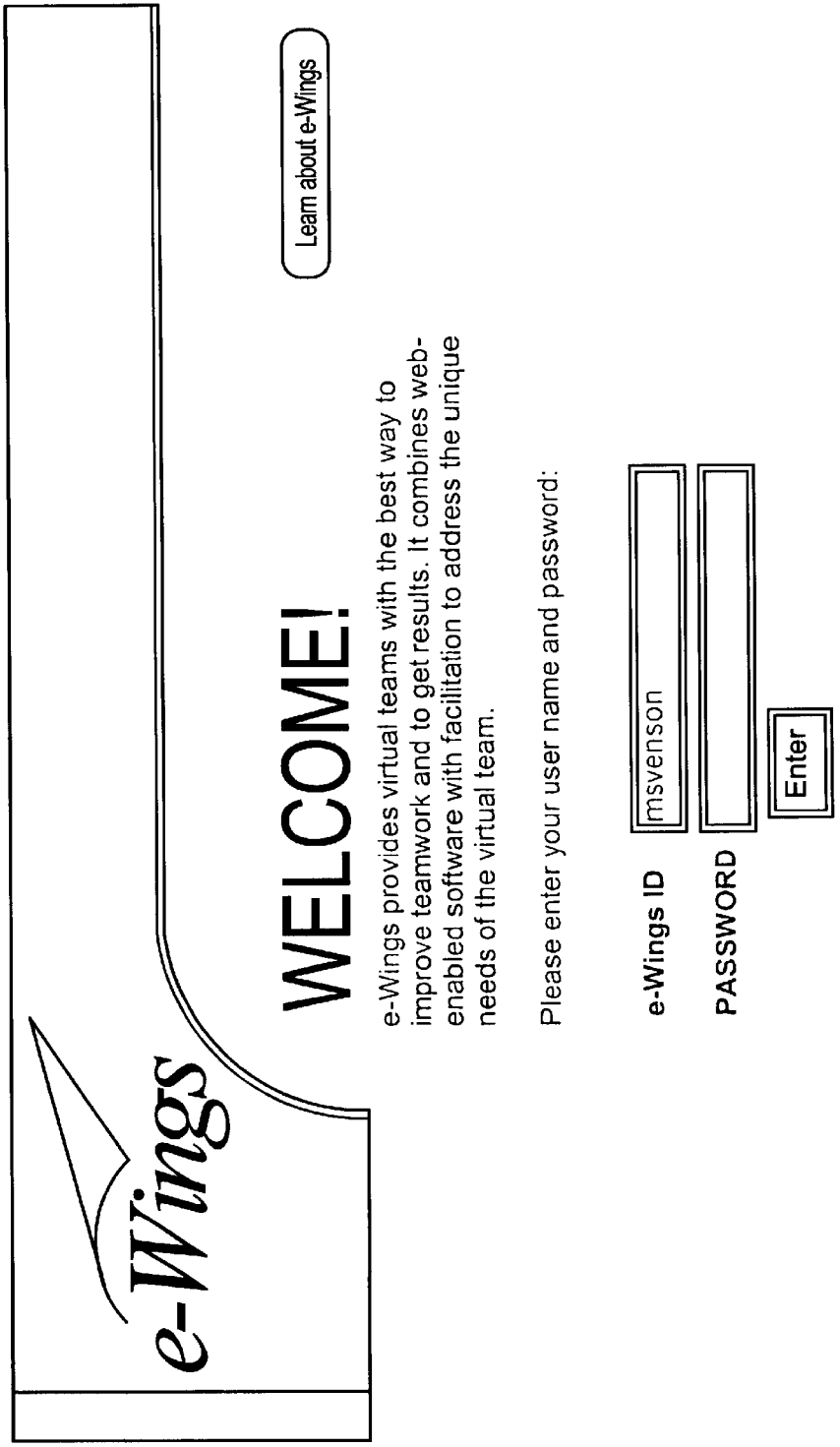

FIGS. 24–86 are screen shots printed from a Web browser, such as the Web browser 130 used by the team members 15 and facilitator 20. Some of these figures are of emails received from the software system 200 used to provide the interactive collaboration. The screen shots represent an output from a Web server 150 using data from the database server 145 that is transmitted to a Web browser 130 across the Internet 125 via data packets 160. Certain information in these screen shots of FIGS. 24–86 represent information provided by a team member 15 and/or facilitator 20 as part of the interactive collaboration or design thereof. It should be understood that the pages can be HTML or any other language or protocol capable of causing the browser 130 to display images on a computer monitor, LCD display, or other display device.

These screen shots also represent a manifestation of the software system of FIGS. 2A and 2B and the flow diagrams of FIGS. 4A–23. The underlying processes for providing the information in the screen shots and the information itself in these screen shots of FIGS. 24–86 may be stored in a manner consistent with the schematic diagram of FIG. 3. When interacting with the pages depicted in FIGS. 24–86, a user—team member 15 or facilitator 20, unless otherwise specifically pointed out—does so in a manner consistent with graphical user interfaces.

Before beginning the examples provided by FIGS. 24–86, an introduction as to the hypothetical users of the system is provided. In this hypothetical scenario, there are four users that are distributed about a computer network, such as the Internet 125, who have access to partake in the examples to be described. The names of these users are: Cameron Lindstrom, Genvieve Heyerdahl, Rod Lundquist, and Mark Svenson. The facilitator for these examples is Cameron Lindstrom.

One of the ideas that should come out of these examples is the concept of varying structure. Two examples of tools used during the processes described in the examples of FIGS. 24–86 are the 'significance scan' tool 1048 and the 'harmony model' tool 1044. As described above, the different tools provide different levels of structure for having the team members provide information for an interactive collaboration process. The tool selected to use in a given process is typically determined by the team or dictated by the facilitator, but may be selected in any other manner. The choice of tool to use is suggested to be appropriate for the process being conducted. These concepts should become more clear as the examples are discussed herein below.

Referring now to FIG. 24, team member Mark Svenson, log in name "msvenson", uses his browser 130 to navigate to the e-Wings™ website by typing the URL for the home page, and log into the interactive collaboration software system 200. Once entering the user name, Mark Svenson enters his password and uses a computer mouse, or other human-machine interface, to 'click' the "enter" soft-button. If the login information is correct, as determined by some type of authentication, then Mark Svenson gains access to the interactive collaboration software system 200.

Figure 25:
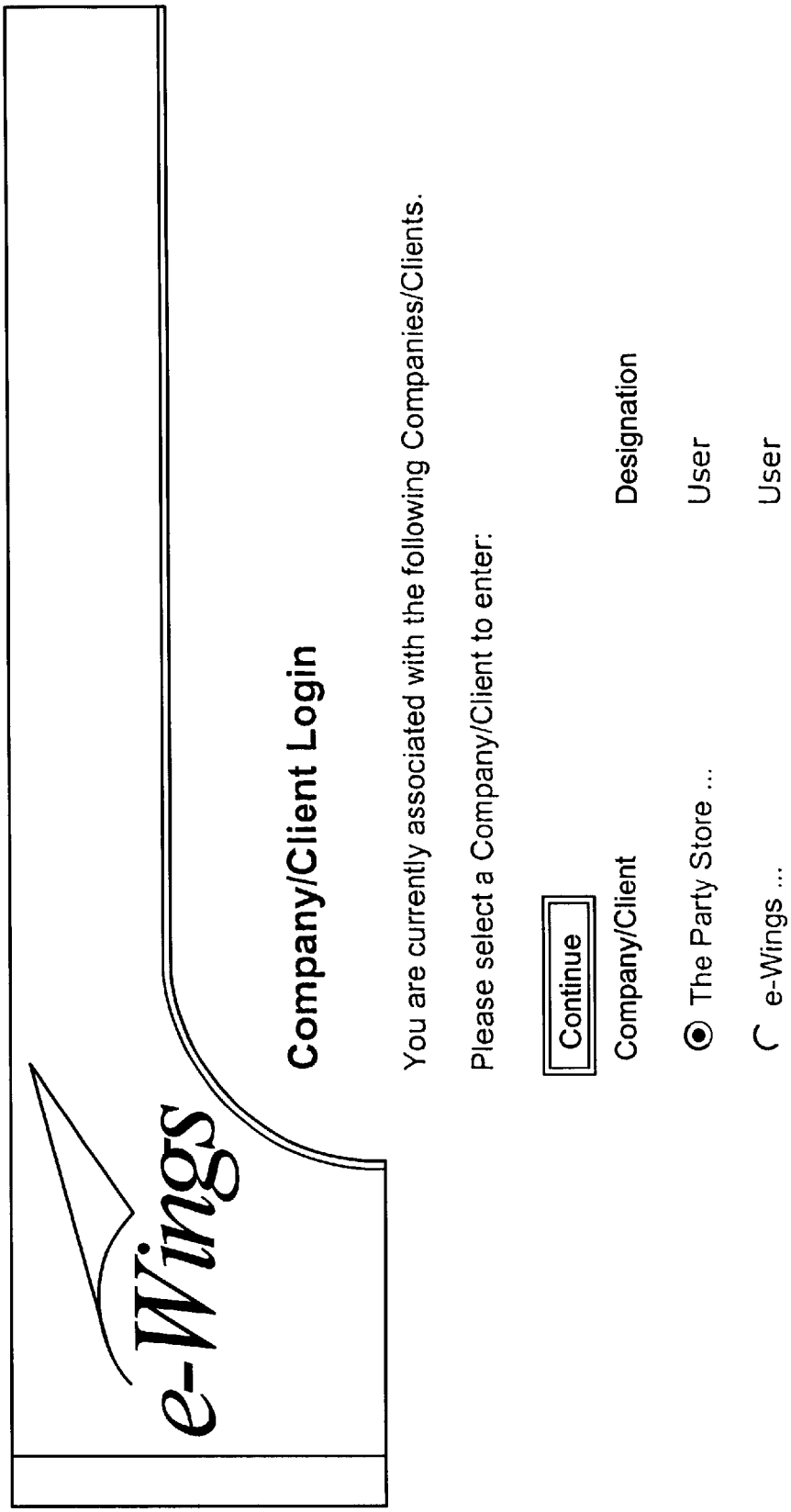

After entering the software system 200, Mark Svenson is asked in FIG. 25 to select a company/client with which he wants to participate in a collaboration effort at this time. In this case, Mark Svenson selects to provide input for "The Party Store", as indicated by the selection of the radio button to the left of the choices. It should also be noted that Mark Svenson is a designated user for both company/clients. If Mark Svenson were a facilitator for either company/client, then the term "facilitator" would be listed in the designation column in the same row as that company/client.

If following along with the flow diagrams of FIGS. 5–23, the previous two FIGS. 24–25 correspond to steps 505, 520, 525, 530, and 535 of FIG. 5.

Figure 26:
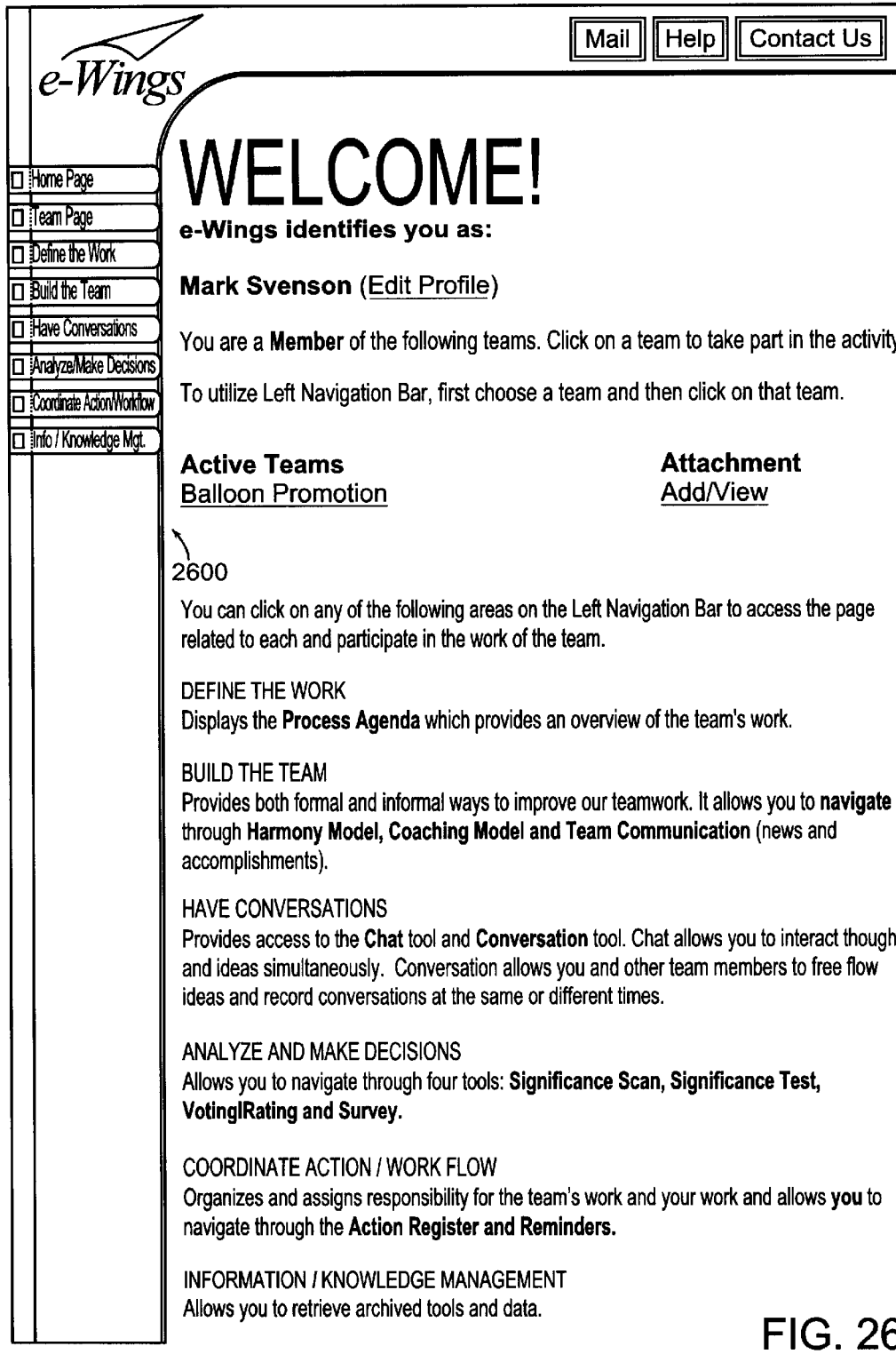

FIG. 26 is a screen shot of a home page associated with The Party Store. The screen shot of FIG. 26 is a manifestation of the method 600 of FIG. 6. A left navigation bar 2600, having a plurality of links to other related pages, allows Mark Svenson to quickly navigate the Web site in relation to The Party Store team.

In the home page for The Party Store—note that the "home page" is highlighted in the left navigation bar 2600—includes descriptions of the tools associated with the links in the left navigation bar 2600 to understand navigation choices. As stated toward the top of the Web page, Mark Svenson must first choose a team, then list it as an "active team", and then click on that team. Here, Mark Svenson has on one team to choose from, "balloon promotion."

Assuming Mark Svenson has correctly selected the balloon promotion team, he will have navigated to the Web page shown in the screen shot of FIG. 27. The corresponding method manifested by this Web page is shown as method 700 in FIG. 7. Also, if following along with the block diagram of the software system 200 in FIG. 2A, FIG. 27 corresponds to the team page 225.

Referring now to FIG. 27, the Web page indicates that there have been two visitors since Mark Svenson's last visit to this team page. Listed on the team page is team information. As shown, the team name is "Balloon Promotion", created on Jan. 29, 2002 by Cameron Lindstrom, and having team members: Genvieve Heyerdahl, Cameron Lindstrom, Rod Lundquist, and Mark Svenson. The mission/purpose of this team is listed as: "the mission of this team is to come up with new balloons and arrangements that will promote our store." The norms listed on this page include: special vendor requests are allowed; build on each others thoughts; nothing complicated for our sales staff. The vision for the balloon promotion team is described as: "at the end of this promotion, we will experience increased sales of our regular merchandise."

From this page, as described in reference to FIG. 7, Mark Svenson can choose to view "news flashes", conversation (to read unread thoughts), or choose to participate in a focus by selecting one of the selectable icons (i.e., links 2700 displayed on the right side of the page). Alternatively, Mark Svenson can choose to navigate to one of the pages associated with the links in the left navigation bar 2600 to participate in the work of the team. These pages are listed in FIG. 2A as modules 265–290.

FIG. 28 indicates that Mark Svenson has selected the link "define the work" in the left navigation tool bar 2600. This Web page shows a process agenda for the balloon promotion team. This Web page is a manifestation of the method 900 of FIG. 9.

At this Web page, a description of the outcomes and background provide Mark Svenson with and remind him of the reasons this "balloon promotion" team exists. The outcomes this team desires are listed as: ideas for new balloons, ideas for new arrangements, and gifts for community organizations. The background for the 'balloon promotion' team is described as, "we currently sell cartoon character, birthday, wedding, and holiday balloons in rubber and Mylar. It is time for a change!".

Once Mark Svenson has reminded himself of the reason this 'balloon promotion' team exists, he may choose to participate in one of the collaboration efforts listed in tabular form at the bottom of the page. The topics of the collaboration efforts include: balloon displays and vendor requests. The focus for the balloon displays is a window display. The process by which the focus of the balloon displays is to be collaborated by the team members is through use of the 'harmony model' tool. At this point in the process, the team is in part one of the harmony model, which is referred to as a "here and now" stage. All members on the team are participating in this process. A starting date for the balloon displays topic is Jan. 30, 2002, and the closing date for part one of the harmony model process is Feb. 6, 2002. In other words, the team has approximately one week to provide input for part one of the harmony model process.

A second topic for the balloon promotion team is "vendor requests." The focus for this topic is ideas for different balloons. The process being used to figure out ideas for different balloons by the balloon promotion team is a 'significance scan' process. At this stage, the 'balloon promotion' team members partaking in the vendor requests topic is at part one of the 'significance scan' process which is to add items for consideration by the team members. The starting date is Jan. 29, 2002 and the closing date is Feb. 10, 2002 for the team members to provide input for part one of the 'significance scan' process.

In accordance with the flow diagram of FIG. 9, Mark Svenson may also choose one of the links in the horizontal tool bar 2800 to add a topic, add a new process, add an attachment, or restore a process from an achieve. In general, any team member 15 or facilitator 20 may choose to take one of these actions. There may, however, be a permission level required in a particular embodiment in order to engage in one of these actions, where that permission level is assigned by the facilitator, Cameron Lindstrom, for the 'balloon promotion' team.

Figure 29:

FIG. 29 indicates that Mark Svenson has selected the 'significance scan' process for the focus ideas for different balloons of the topic vendor requests in the tabular listing of FIG. 28. The Web page of FIG. 29 includes descriptive information 2900 for this process. A question 2905 is posed for each of the team members, which reads "[w]hat kinds of balloons or balloon arrangements do you think would be popular with our customers? This includes balloons that do not exist." Mark Svenson can add an item by selecting the "add item" soft-button in the horizontal tool bar 2910 on this page.

Figure 30:
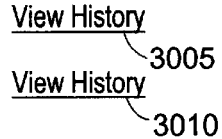
Figure 31:
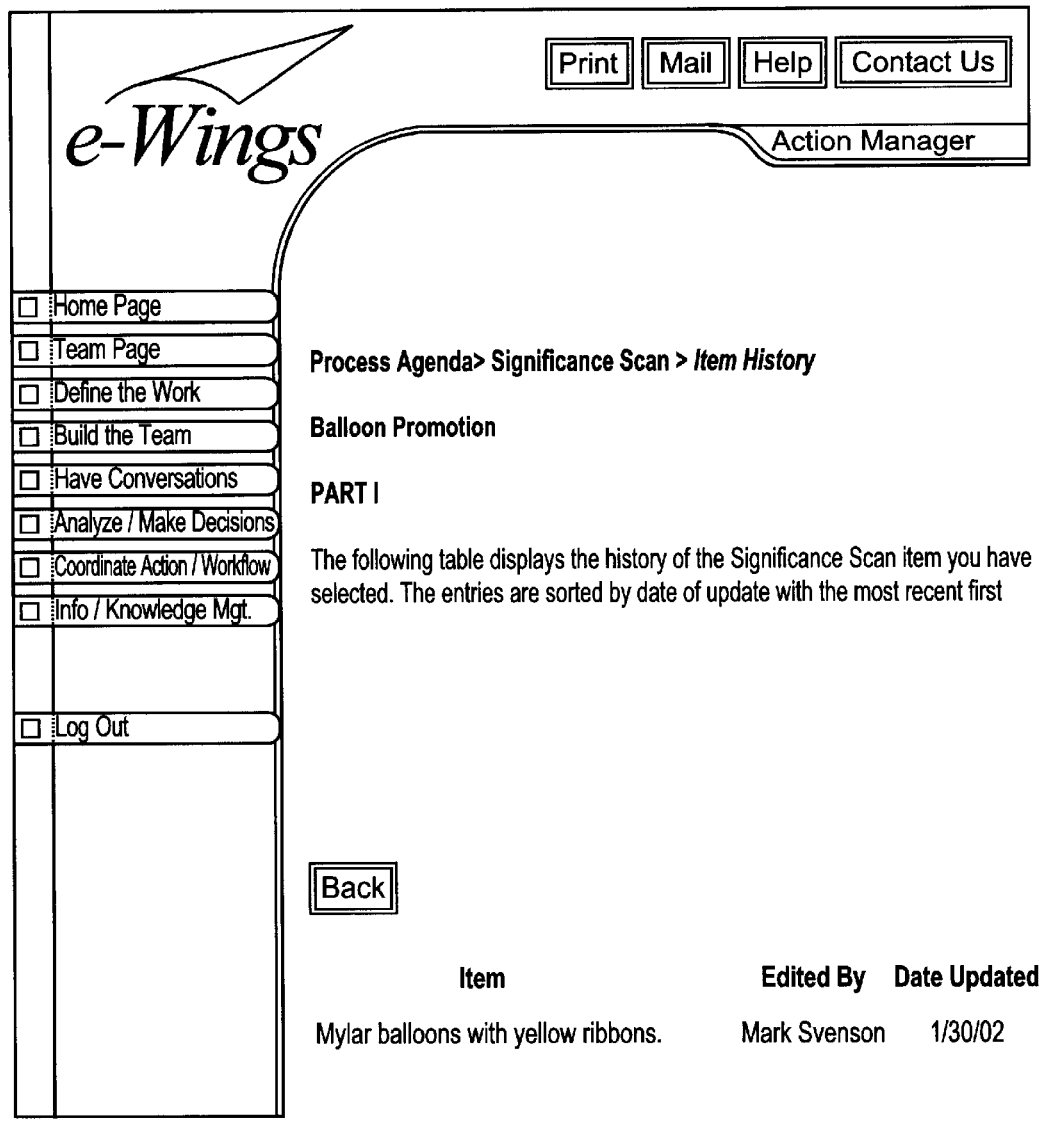
Figure 33:

FIG. 30 is a screen shot of the same Web page as FIG. 29 but includes input items added in response to the question 2905. The two input items are: (i) write-on balloons and (ii) mylar balloons with yellow ribbons. To determine which team member added which item, Mark Svenson can click on the "view history" links 3005, 3010 associated with the respective input item. FIG. 31 indicates that Mark Svenson was interested in finding out who provided the input, "mylar balloons with yellow ribbons." As it turns out, Mark Svenson himself had entered this item on Jan. 30, 2002.

Returning to the significance scan input, as now shown in FIG. 32, it appears that another team member has added yet another input item, which is "fruit and candy shapes" for a kind of balloon that that team member believes would be popular with the party store customers.

After refreshing his browser screen, Mark Svenson sees that yet another item has been input for part one of the 'significance scan' process as an idea for different balloons. This new input is "string licorice for the string."

The 'significance scan' process just discussed was set-up through the method 2000 of FIG. 20. That method 2000 could be run by a team member 15 or facilitator 20, depending upon the privileges afforded the team members by the facilitator 20.

Referring now to FIG. 34, Mark Svenson has returned some time later to the 'process agenda' page for the 'balloon promotion' team of The Party Store. As it turns out, the facilitator, Cameron Lindstrom, has chosen not to allow part one of the 'significance scan' process to go all the way to the closing date, which was scheduled for Feb. 10, 2002, but has, instead, closed out the part one of the 'significance scan' process and has started part two of the 'significance scan' process on Jan. 30, 2002, just one day after requesting input in part one of the 'significance scan' process for ideas for different balloons. Part two of the 'significance scan' process is defined, at least at this point, from a starting date of Jan. 30, 2002 until Feb. 6, 2002.

Mark Svenson may have returned to provide collaboration for the 'balloon promotion' team on his own volition, or may have been notified via email or other notification that his collaboration input is wanted. An example of an email notification is provided in FIG. 35. FIG. 35 shows that the facilitator, Cameron Lindstrom, has opened part two of the 'significance scan' process for the 'balloon promotion' team and has provided some information in that email regarding this matter. A link to the Web site has been provided in the email. This link brings Mark Svenson, by clicking on the link, to the home page of the collaboration software 200 in this particular embodiment; but, in an alternative particular embodiment, a link may include a URL with extra parameters that are used by the Web site to bring Mark directly to the Web page of FIG. 34 after logging into the Web site. By adding these extra parameters, Mark Svenson will not have to navigate through Web pages (e.g., FIGS. 24–27) to respond to the subject of the email of FIG. 35.

After deciding to partake in part two (rating items) of the 'significance scan' process for the focus of ideas for different balloons for the topic of vendor requests for the 'balloon promotion' team for The Party Store by clicking on the "significance scan" part two, rating items link in FIG. 34, Mark Svenson arrives at the Web page shown in FIG. 36.

On this page, Mark Svenson is able to rate the items on a scale of 1–10, where 10 indicates high importance and 1 indicates low importance. By seeing all of the input from all of the team members on a single display, Mark Svenson is able to consider the importance of each of the items with respect to the other items.

Mark Svenson enters a rating for each of the items, as shown in FIG. 37. For example, Mark Svenson rates "balloons with a scratch-and-sniff patch" with a rating of "10", "string licorice for the string" with a rating of "8", and "balloons that look and are shaped like candy, fruit and vegetables" with a rating of "3". Following that input, Mark Svenson chooses the "save" icon in the horizontal toolbar 3700.

Following this "save" selection, Mark Svenson sees a notification page, depicted in FIG. 38, which thanks Mark Svenson for his input and that his input has been submitted. By clicking the "back" soft-button 3800 he is shown a results page, depicted in FIG. 39A.

Referring to FIG. 39A, it appears that at least two people have provided input to the items in the 'significance scan' process, since the results table 3900 includes non-whole numbers. By studying this results table, Mark Svenson can make an assessment as to how his input compares to input from other team members for this part of the process.

Referring to FIG. 39B, Mark Svenson can see, for example, that his idea about balloons that "look and are shaped like candy, fruit and vegetables" is much less than Cameron Lindstrom's thought on this matter, but that his thoughts regarding balloons with a "scratch-and-sniff patch" are the same as Cameron Lindstrom's. Further, Mark Svenson believes that "string licorice for the string" is a much better idea than does Cameron Lindstrom.

Later that day, Cameron Lindstrom, fulfilling duties as facilitator, decides that part two of the 'significance scan' process is completed and sends out an email to all of the team members. This email is depicted in FIG. 40 and notifies Mark Svenson (i) that part two of the 'significance scan' process has been completed and (ii) that both the original and revised results are available. The revised results may include some form of processing or Cameron Lindstrom's final "facilitator" input, such as removing the high and low ratings from the set of ratings used to determine the average for each of the items.

Figure 41:
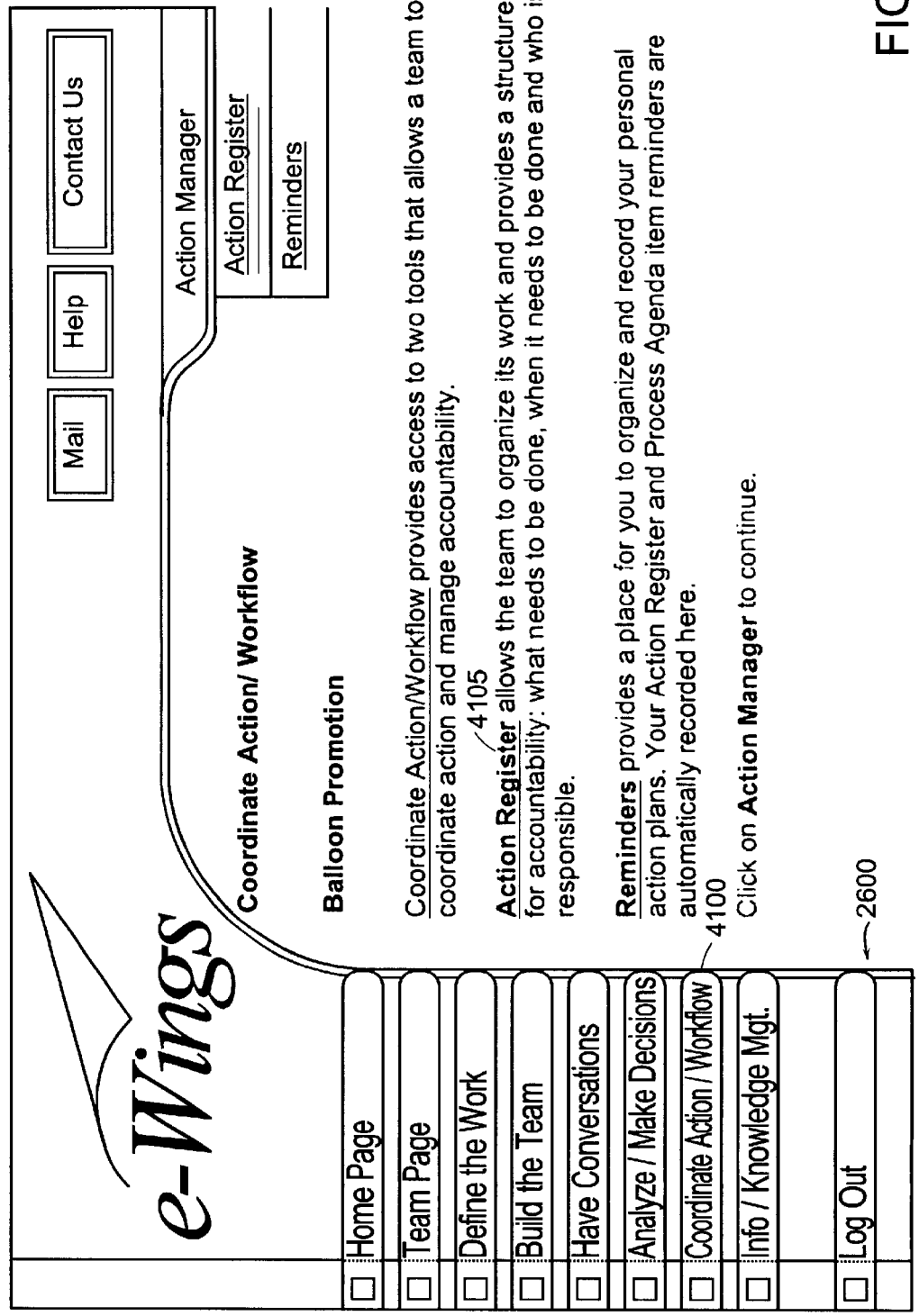

Some time later, Mark Svenson logs back into the interactive collaboration system and selects a 'coordinate action/workflow' link 4100 in the left navigation bar 2600. Through this selection, Mark Svenson goes to the associated page, depicted in FIG. 41. Once there, Mark Svenson reviews his options at this point and elects to go to the "action register" by selecting the 'action register' link 4105. The action register allows the team to organize its work and provides a structure for accountability, which may include items, such as: what needs to be done, when it needs to be done, and who is responsible. The underlying method for this page is module 280 (FIG. 2A).

Figures 43, 44:

FIG. 42 is a particular manifestation of the 'action register' module 245 (FIG. 2B). On the 'action register' page, action items may be assigned to team members. A due date may be assigned, a status may be applied, and text may be provided in an email text box 4205. For example, an example of text that may be sent to a member could be, "call the vendor about getting licorice strings." A spell check is available, as indicated in FIG. 43, for the text provided in the email text box 4205 of FIG. 42. Once an assignment has been made and the email has been entered, the input to the action register may be saved and closed, as indicated by a notification page in FIG. 44. This notification page indicates that an action item email notification has been sent to the team or possibly just to the individuals receiving action items.

It should be understood that either the facilitator 20, a team member who is selected as a team leader, or a team member who initiated the process to begin with is typically the person who is given permission to assign actions in the action register. However, there may be other persons assigned the task of assigning action items, such as a shadow or third party mediator. Mark Svenson then returns to the action register by clicking on the "done" soft-button 4400.

Returning to the action register in FIG. 45, Mark Svenson sees the action register keeping track of what needs to be done, when it needs to be done, and who needs to do it. As listed in the action table 4500, Mark Svenson needs to call the vendor about getting licorice strings by Jan. 30, 2002, and Cameron Lindstrom needs to get scratch-and-sniff materials by Jan. 30, 2002.

Even if Mark Svenson were not to visit this particular page, he would receive an email depicted in FIG. 46 in this particular embodiment. The email tells Mark Svenson that he has been assigned the action item of calling the vendor about getting licorice strings, and that this action is to be done by the given date.

That completes the "significance scan" process for the 'balloon promotion' team to work in a collaborative environment having an interactive forum for collecting information from the team members, then use that collected information to arrive at a collaboratively derived decision. The 'significance scan' tool 1048 (FIG. 10) has a given level of structure for the interactive collaboration. Specifically, as seen through the example pages of FIGS. 29–46, a pointed question is asked, input is received, ratings are requested of the team members, those ratings determine which items are significant enough to the team to be maintained and assigned as action items, and the action items are assigned with a due date. The 'significance scan' tool 1048 is of a moderate degree of structure compared to the 'chat' tool 1032, the left most tool depicted in FIG. 10, and the 'voting/rating' tool 1060, the right most tool in FIG. 10.

As a comparison to understand the varying degrees of structure provided by the software system 200 (FIG. 2A), an example of a process provided by the 'harmony model' tool 1044 is provided in FIGS. 47–77. This particular embodiment of a process provided by the 'harmony model' tool 1044 includes four stages of information collection and processing. In general, the 'harmony model' tool 1044 requests information from the team members 15 about what is and is not working, allows some conversation to transpire, determines a shared vision from the information provided by the team members 15, and culminates with action items for individual team members to handle.

Mark Svenson finds out that the 'harmony model' process has been started through the receipt of an email from the facilitator, Cameron Lindstrom. This process is for the focus "window display" for the topic "balloon displays" for the 'balloon promotion' team, as discussed in reference to FIG. 28. This email informs Mark Svenson that the input for part one, HERE and NOW, starts on Wednesday, Jan. 30, 2002, and that all information must be inputted by Wednesday, Feb. 6, 2002, which is the closing date. In this email, a direct link "ENTER HARMONY MODEL INPUT" is provided for Mark Svenson to click to go straight to the appropriate page following logging into the software system 200 over the Internet 125, as discussed above.

It turns out that instead of going directly to the page via that link, Mark Svenson chooses to provide regular collaboration participation (step 439, FIG. 4B) to view the team page, as shown in FIG. 48. Mark Svenson may have chosen this route to see if there were any conversations or news flashes that have appeared since his last visit. Also, Mark Svenson notices that there have been five visitors since his last visit.

Figure 49:
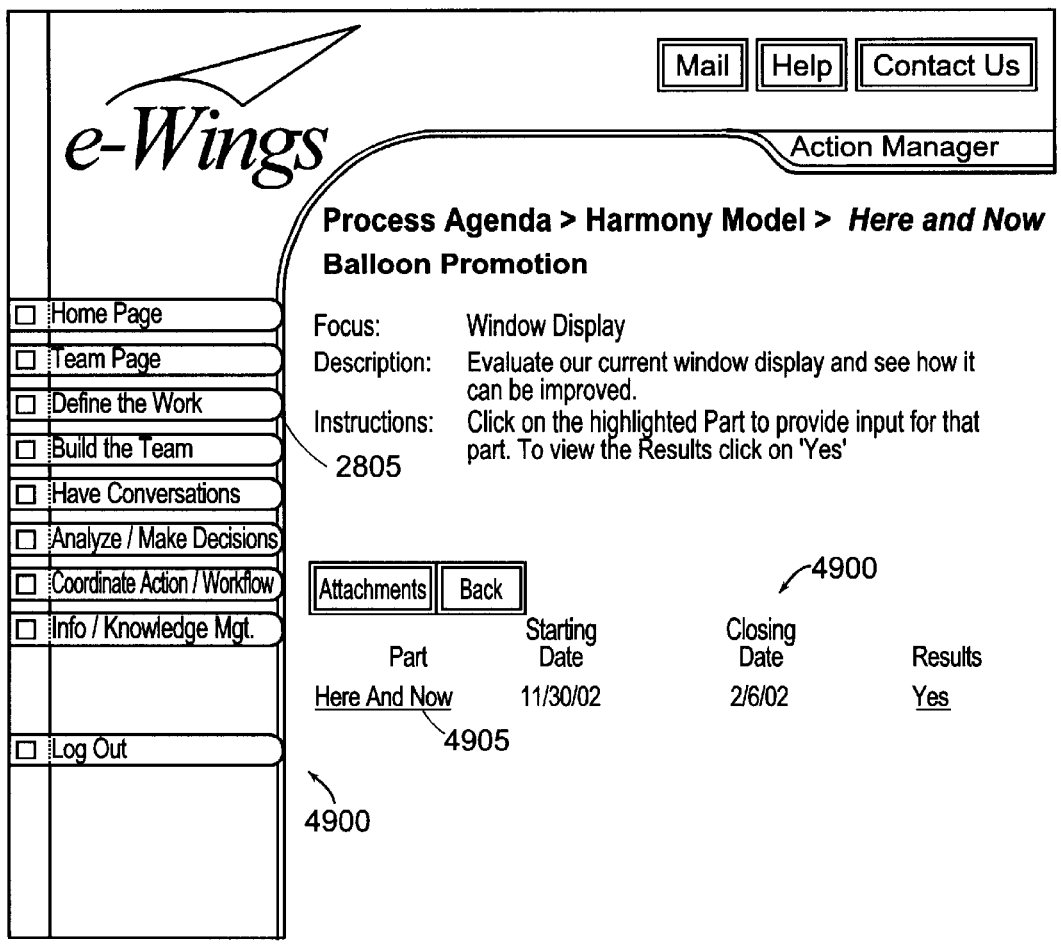

Deciding to move on to respond to the subject of the email of FIG. 47, Mark Svenson selects the "define the work" link 2805 in the left navigation bar 2600. A particular embodiment of the associated page is represented in FIG. 49. This page is also the page to which Mark Svenson would have been directed had he selected the direct link provided in the email of FIG. 47.

As indicated in the harmony model table 4900, the 'balloon promotion' team is at part one, HERE and NOW, of the 'harmony model' process. The process starting date is Jan. 30, 2002 and closing date is Feb. 6, 2002. Mark Svenson decides to provide input to this process by clicking on the "HERE and NOW" link 4905, as instructed on the page.

Figure 50:
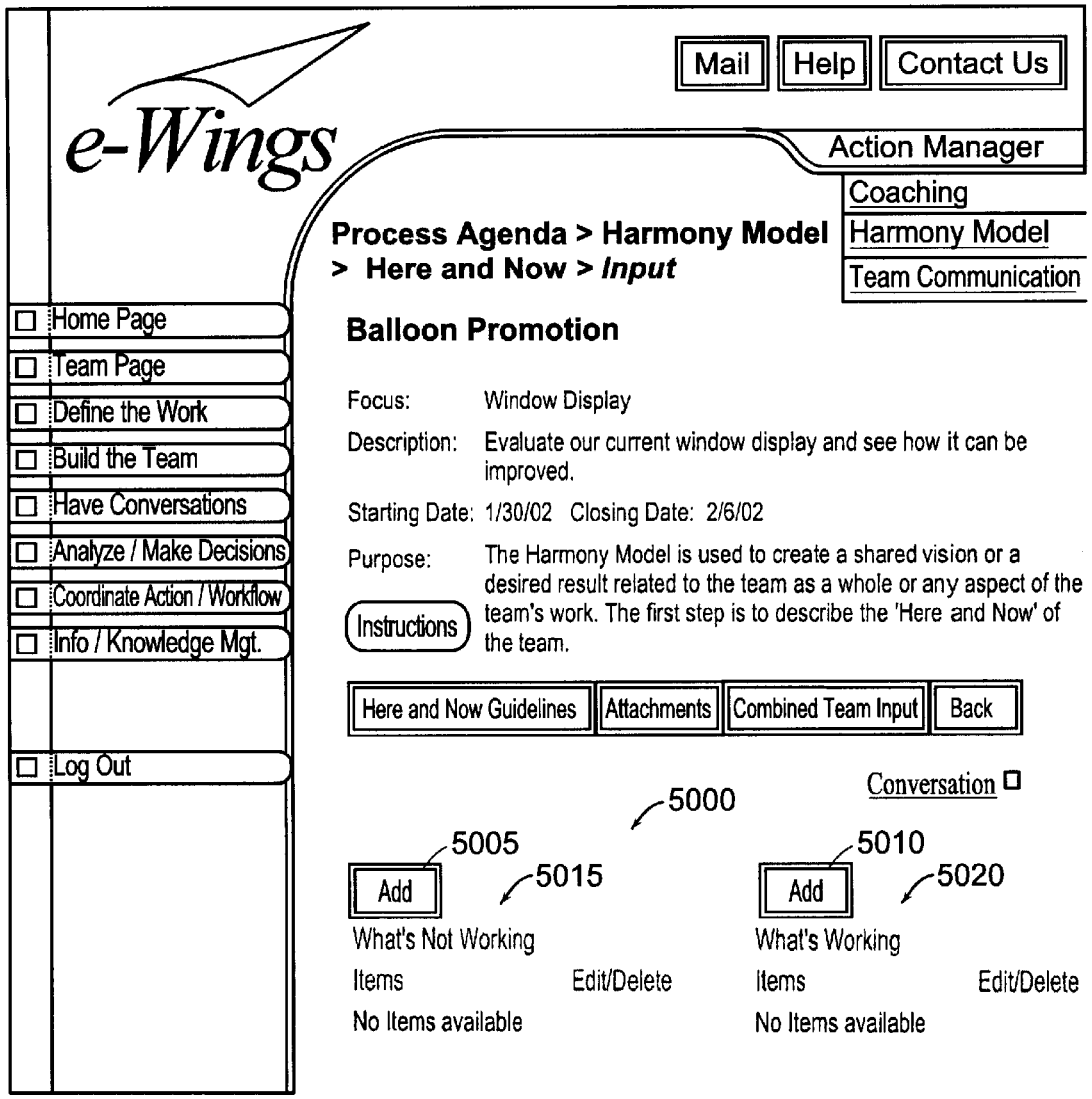

FIG. 50 is a screen shot of a particular embodiment of an input page for the 'harmony model' process. A table 5000 having column headings "What's not working" and "What's working" is provided as questions intended to elicit feedback from the team members to add comments, Mark Svenson selects the "add" soft-button 5005, 5010 associated with one of those questions. In this case, Mark Svenson has elected to add input for the "What's not working" column.

FIG. 51 is a screen shot of a particular embodiment of a page used to allow the team members to provide input for the posed question, "What's not working". Here, Mark Svenson enters, "The Party Store window should be more organized with respect to party themes" in the text box 5100. When done, Mark Svenson selects the "save and close" soft-button 5105 and goes back to the previous page.

Figure 52:
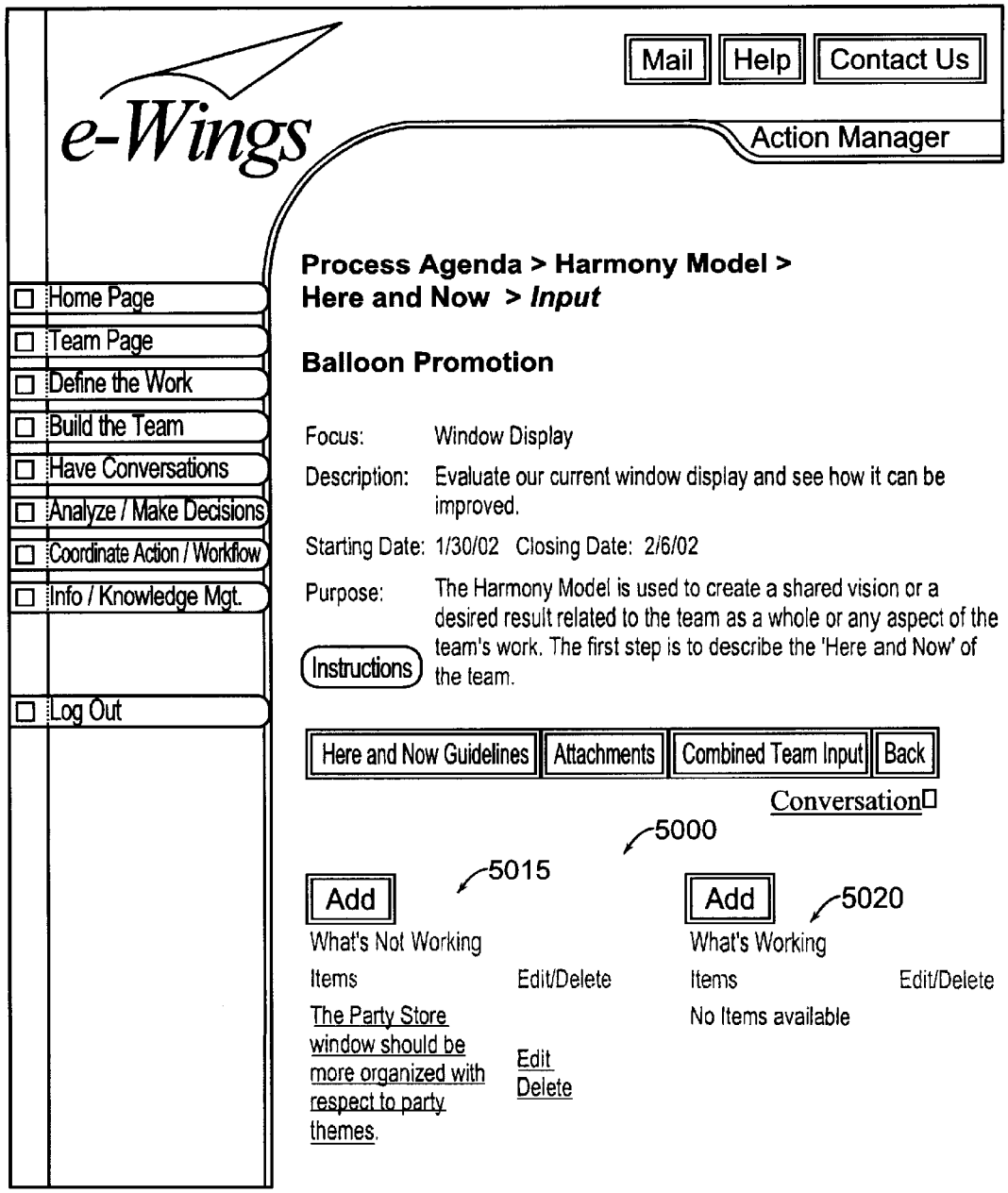
Figure 53:
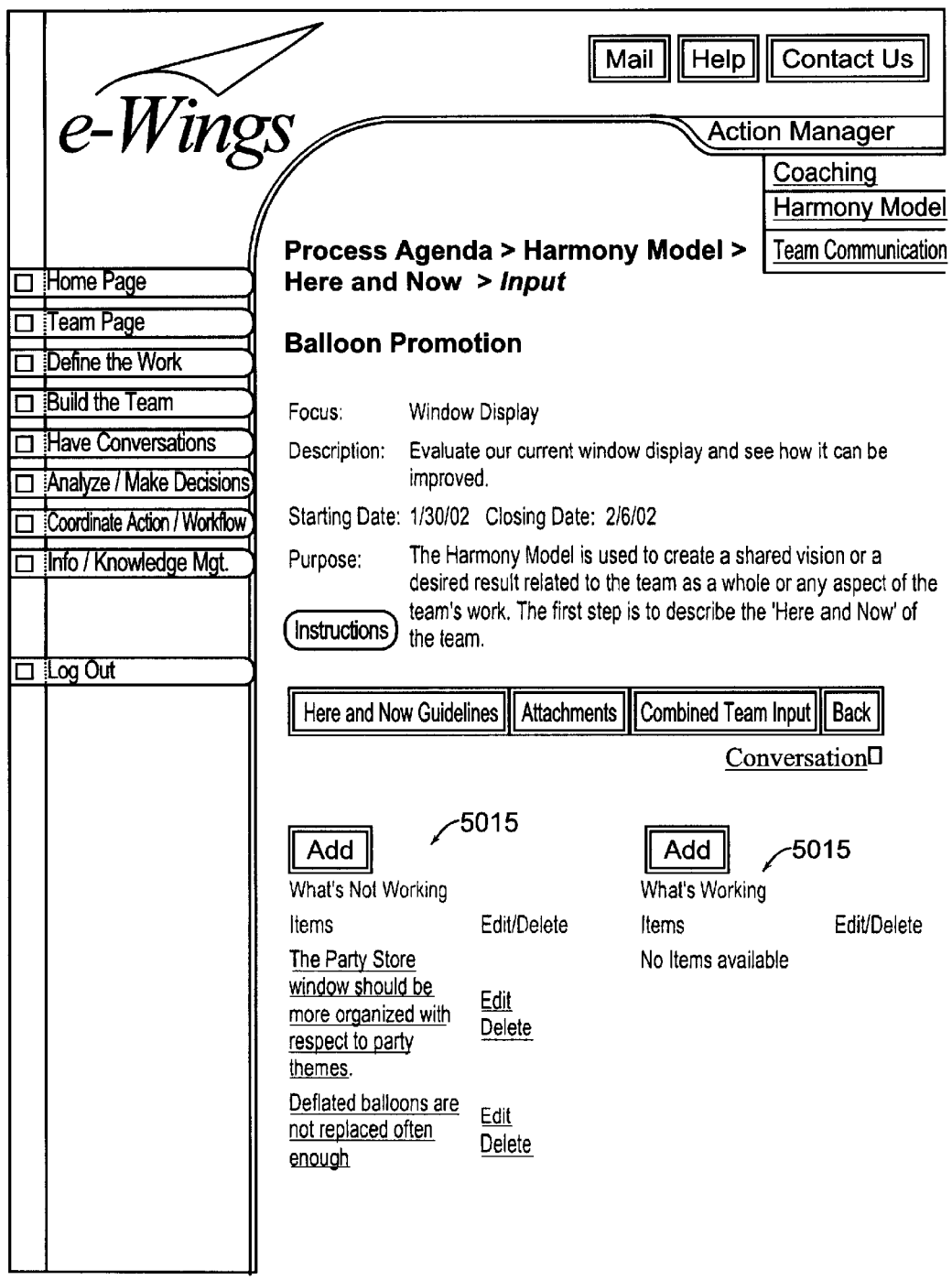

FIG. 52 is a screen shot of the previous page with Mark Svenson's item in the "What's not working" column 5015. Before continuing on, Mark Svenson decides to refresh his browser screen and learns that a second team member has provided an input to the "HERE and NOW" part of the harmony model in the "What's not working" column 5015. This input is shown in FIG. 53 as, "deflated balloons are not replaced often enough."

Dutifully, Mark Svenson adds an input for the "What's working" question, as indicated in the screen shot of FIG. 54. In a text box 5400, Mark Svenson enters, "the balloon colors and backdrops are appealing, especially at night with the colored lights illuminating the balloons." Returning to the previous page with his input as shown in FIG. 55, Mark Svenson sees that this other team member, or yet another team member, has responded to the "What's working" question. That response is, "the cartoon balloons get a lot of attention." Yet another input received is, "balloon arrangements get requests from customers."

Mark Svenson returns to view the "HERE and NOW" results page a short while later. In this particular embodiment, the facilitator, Cameron Lindstrom, must close part one "HERE and NOW" of the 'harmony model' process before Mark Svenson is able to view the results (i.e., input from the various team members). In an alternative embodiment, Mark Svenson is able to view the results at any intermediate time while part one is still open.

In FIG. 56A and 56B, the results are shown in the 'harmony model' table 5000 in their respective columns 5015, 5020. These results show that Cameron Lindstrom and Mark Svenson have provided input to the "What's not working" and "What's working" questions for the window display focus for the 'balloon displays' topic. Mark Svenson may also choose to initiate or join in an existing conversation by selecting the conversation link 5605 regarding the results in the 'harmony model' table 5000.

FIG. 57 is an email from the facilitator, Cameron Lindstrom, notifying Mark Svenson that part one, HERE and NOW, of the harmony model—window display process has been completed and the results are available. However, since Mark Svenson has already seen his results, he chooses to ignore this email.

FIG. 58 is a second email issued from Cameron Lindstrom following the conclusion of part one of the 'harmony model' process. This email informs Mark Svenson that input for the second part of the 'harmony model' process, entitled Vision/Results, starts on Wednesday Jan. 30, 2002. The deadline for submitting information is Wednesday, Feb. 6, 2002. Note that a direct link to enter the harmony model input for the vision/results part of the process is provided in the email.

FIG. 59 is a screen shot of the process agenda page of FIG. 28 but indicating that the 'harmony model' process is at part two, the Vision/Results' part. Mark Svenson decides to take part in this part of the process and arrives at a next page, shown in FIG. 60.

Figure 60:
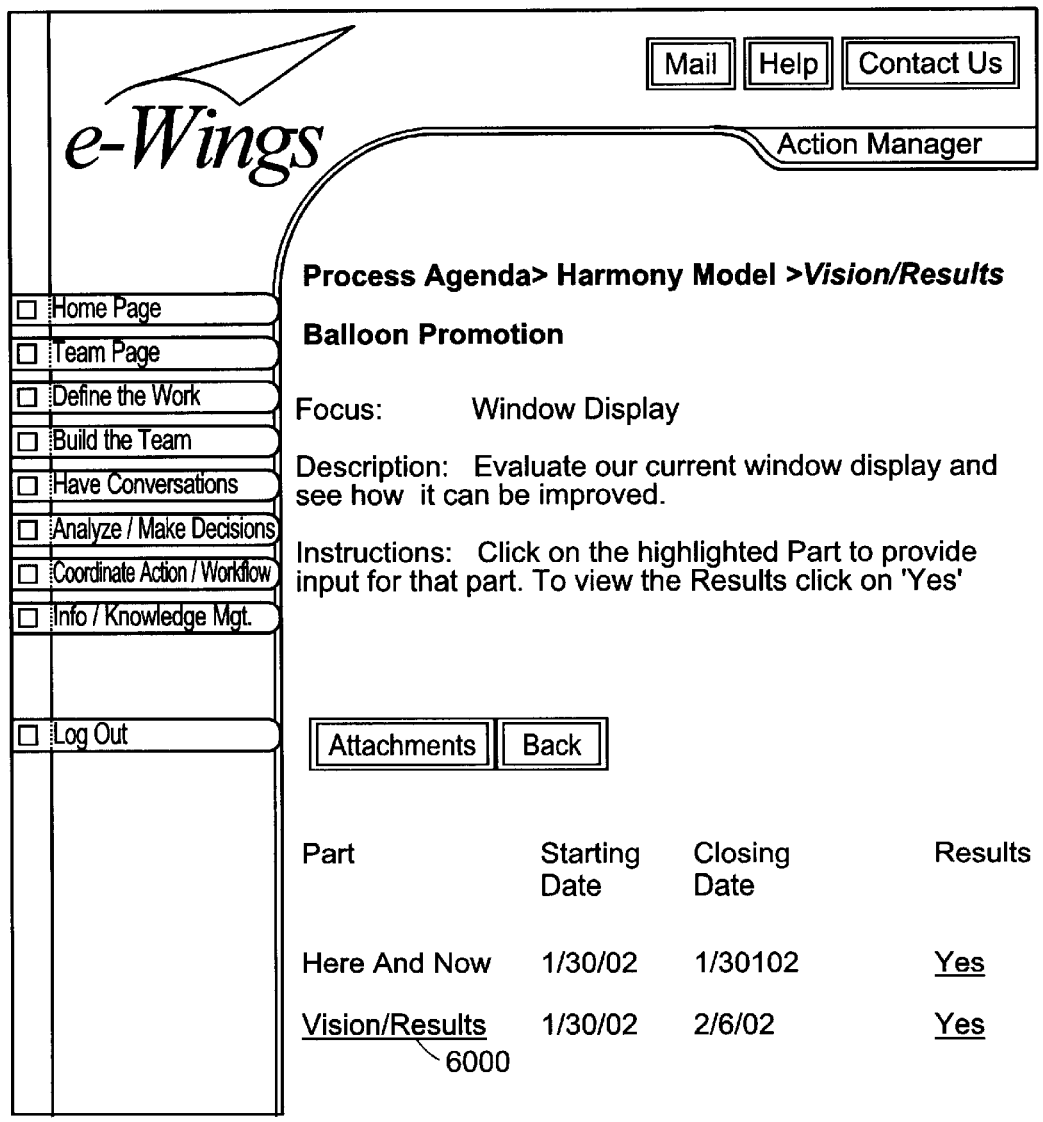
Figure 63:
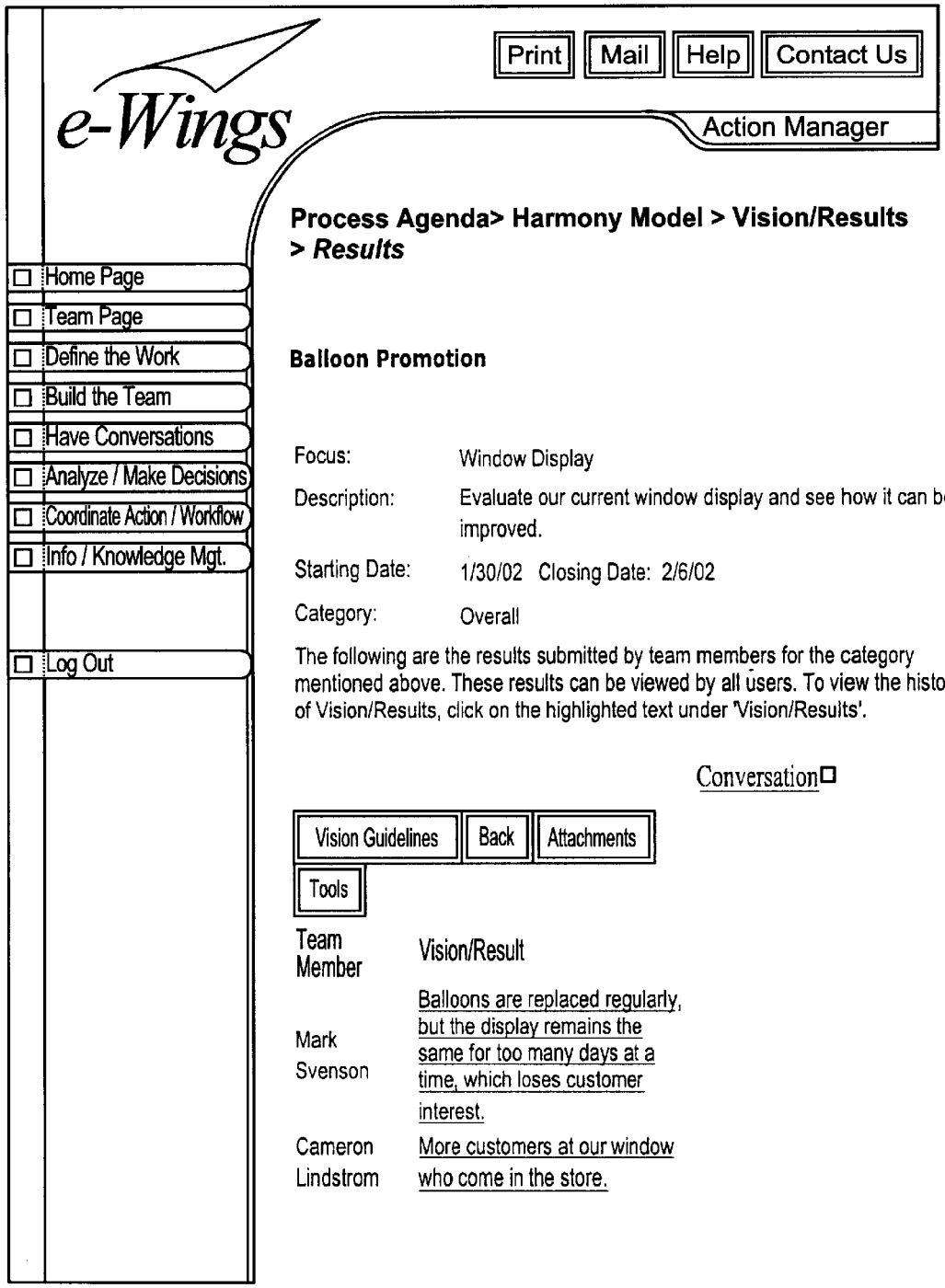

Referring to FIG. 60, Mark Svenson sees that the HERE and NOW part of the process is complete (i.e., solid black text) where as the Vision/Results part of the 'harmony model' process is still open (i.e., grey with an underline), and will remain open until Feb. 6, 2002. Mark Svenson then selects the Visions/Results link 6000 and a next page, FIGS. 61A and 61B, are provided to him.

Referring to FIG. 61A, the 'harmony model' table 5000 includes all of the entries in the "What's not working" column 5015 and the "What's working" column 5020 that were collected in the "HERE and NOW" part of the process. In FIG. 61B, a vision/results table 6100 is provided. Mark Svenson decides that he will enter a vision/result input to this table 6100.

FIGS. 62A and 62B represent that same page as FIGS. 61A and 61B, but, in FIG. 62B, Mark Svenson's input for vision/result is now listed. Specifically, Mark Svenson's input is, "balloons are replaced regularly, but the display remains the same for too many days at a time, which loses customer interest."

A short while later, Mark Svenson returns to the interactive collaborative system to see the results of part two of the 'harmony model' process. Mark Svenson sees not it only his input, but also the input of other teams members. Specifically, Cameron Lindstrom provided, "more customers at our winder who come in the store," for a vision/result. In this particular embodiment, the team members' names are associated with their entries. However, it is possible for the team members to be listed as "anonymous" so as to allow the team members anonymity to encourage more freedom of thought without ridicule or retribution from other team members.

Figure 64:

A short while later, Mark Svenson returns to the process agenda page, as depicted in FIG. 64. At this point, the "balloon displays" topic is shown as part two being completed.

FIG. 65 is a screen shot of the process agenda at a point where Cameron Lindstrom, the facilitator for the 'balloon promotion' team, has started part three of the 'harmony model' process, referred to as "shared vision." Mark Svenson selects the link 6500 to participate in this part of the process.

Figure 66:
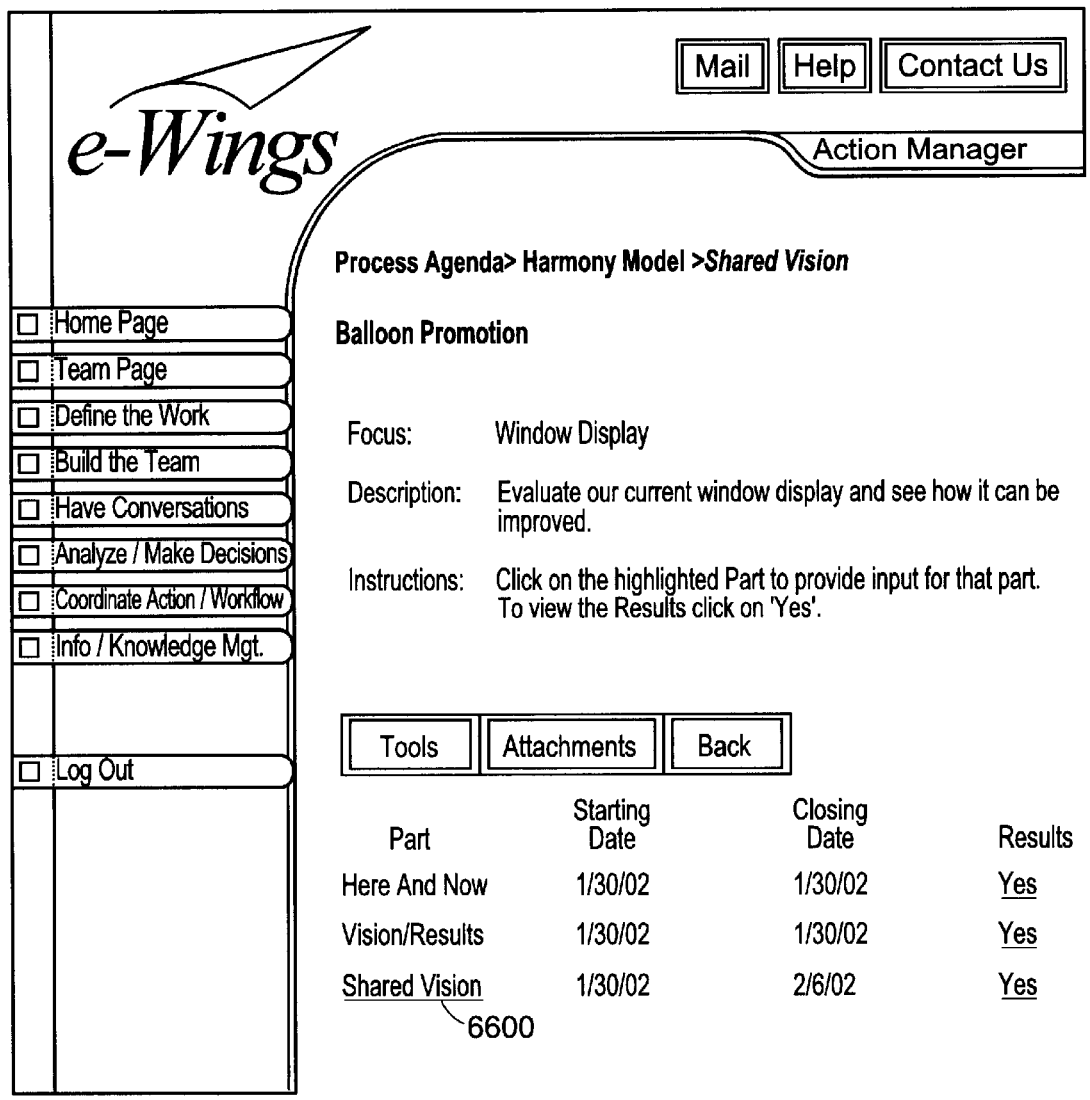

FIG. 66 is a screen shot of the 'harmony model, shared vision' page. Mark Svenson selects the 'shared vision' link 6600 and goes to the associated page, represented in FIG. 67.

Figure 67:
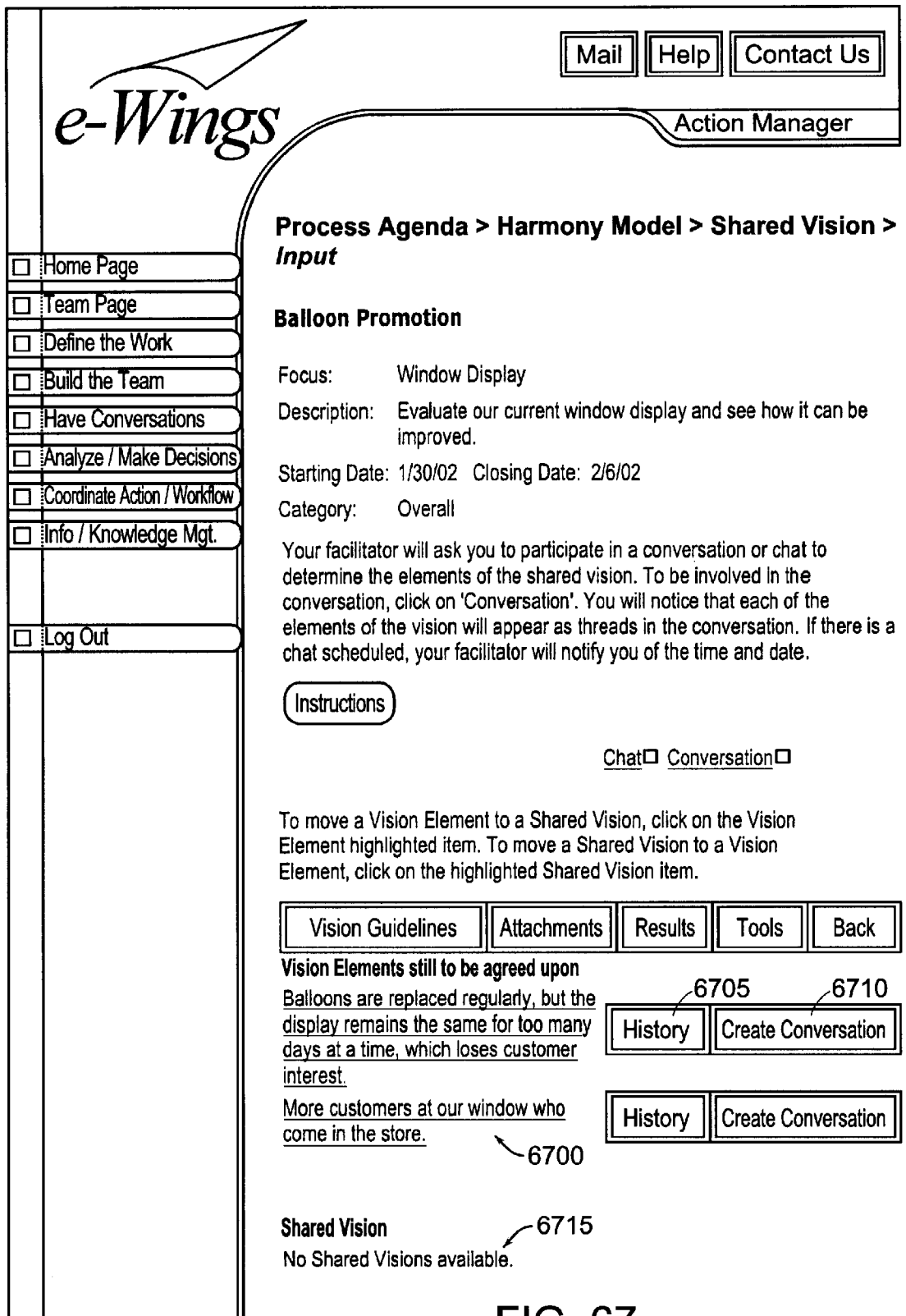

In FIG. 67, Mark Svenson reviews the vision elements still to be agreed upon in the input listing 6700. For each entry, Mark Svenson can view the history through use of a 'history' link 6705 and can create a conversation for the associated entry through the use of a 'create conversation' soft-button 6710. Mark Svenson also notices that there are no shared visions available yet, as indicated in the 'shared vision' column 6715.

Figure 68:
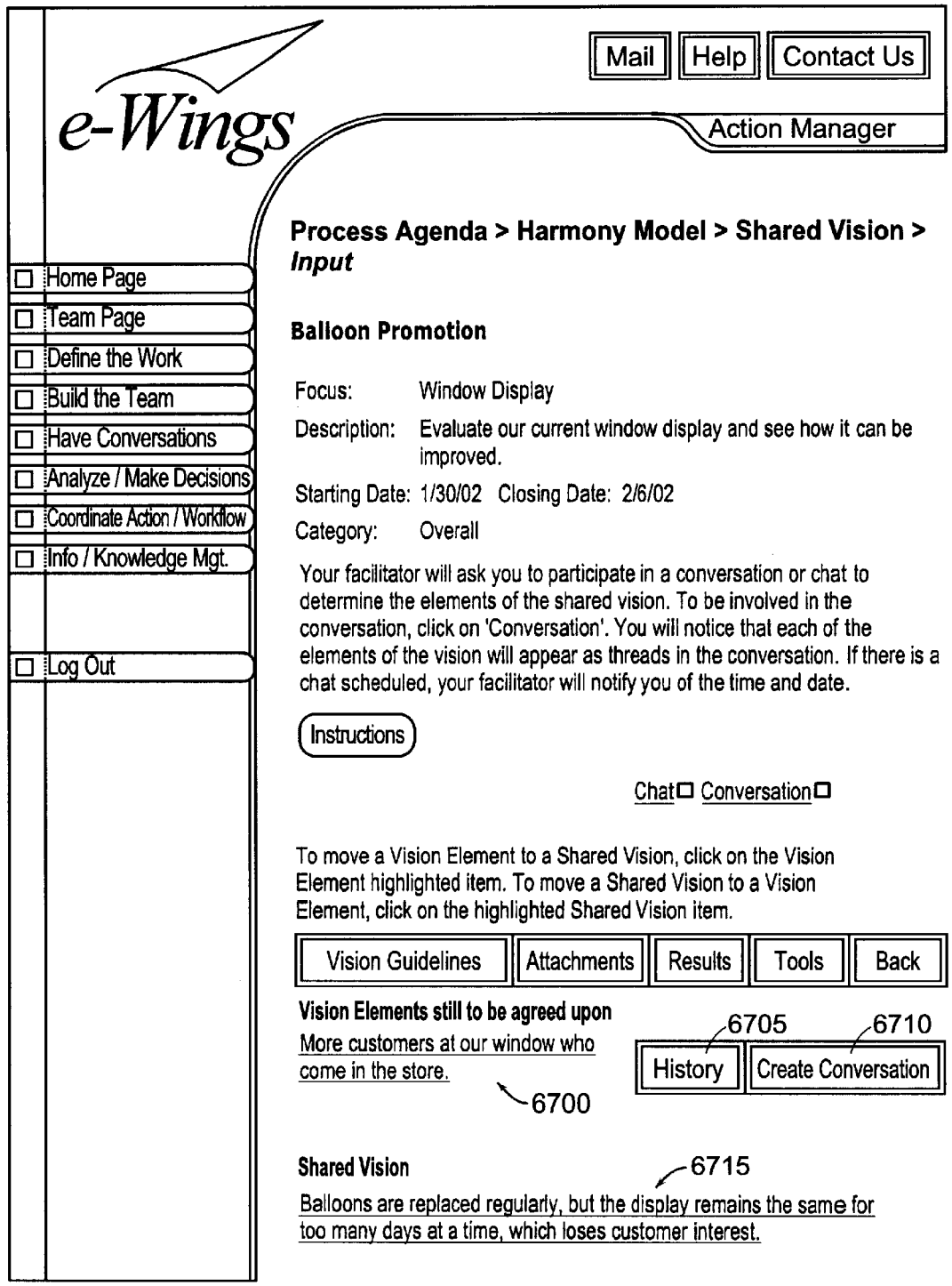

A short time later, however, Mark Svenson returns to this page, as represented in FIG. 68, and sees that the facilitator, Cameron Lindstrom, has made a decision that there is a shared vision among the team members that "balloons are replaced regularly but the display remains the same for too many days at a time, which loses customer interest." Mark Svenson recalls that this was his input and is glad to see that it is a shared vision.

Because the 'harmony model' tool 1044 (FIG. 10) is not as structured as was the 'significance scan' tool 1048 in that there is no metric assigned to the shared vision entries in this part of the process or entries regarding the "What works" and "What's not working" from part one of the process. The facilitator, Cameron Lindstrom, makes decisions from the associated on-line conversations regarding these entries.

Figure 70:
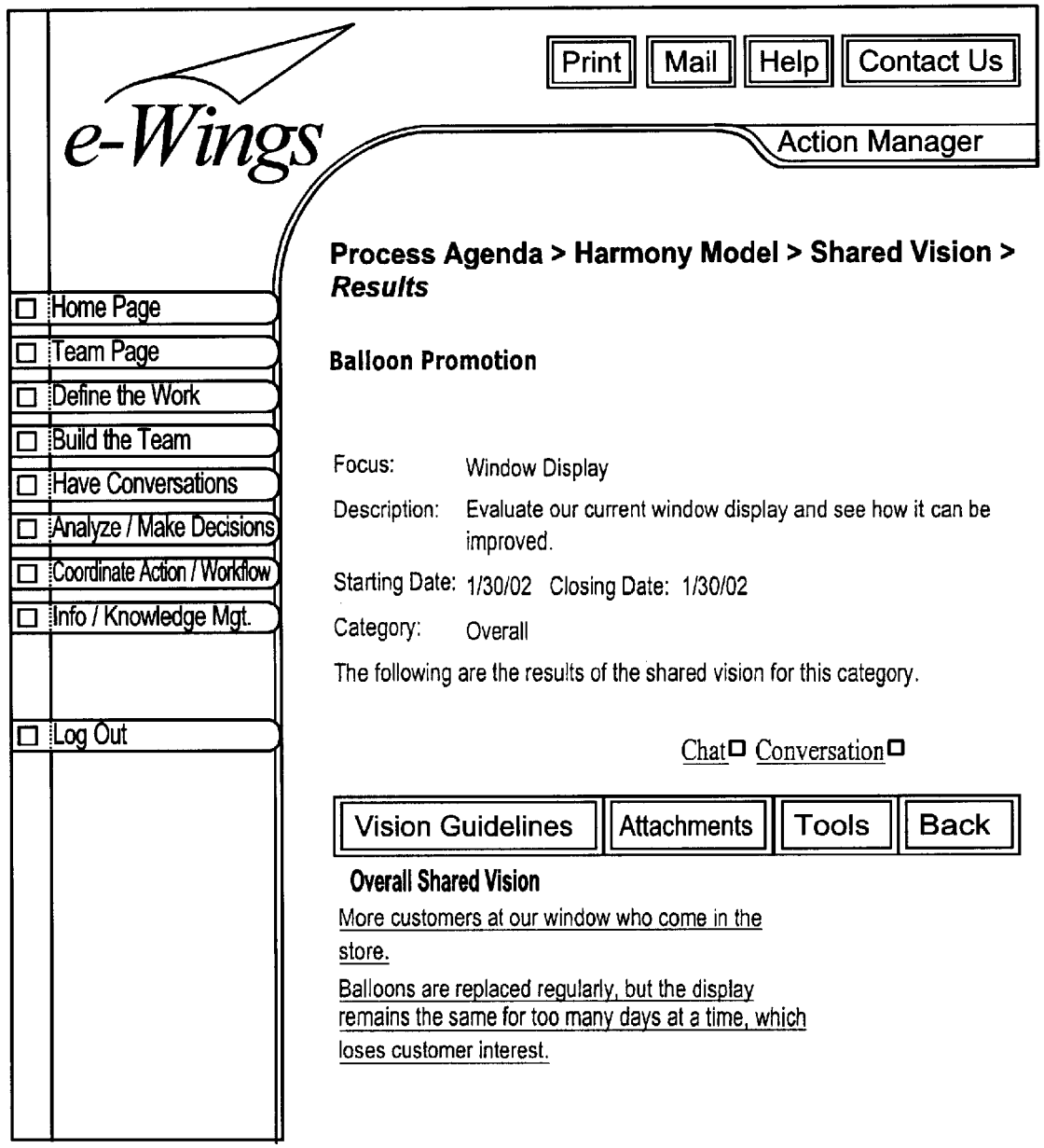

When Mark Svenson returns to the process agenda page in FIG. 69, he sees that the 'harmony model' process, part three, is completed. Mark Svenson selects the link 6905 to view the results, which are shown in FIG. 70. As it turns out, both entries were accepted by the team, and applied by Cameron Lindstrom as an overall shared vision. The team members can then participate in a chat or conversation regarding the results of the overall shared vision part of the 'harmony model' process.

Figure 72:
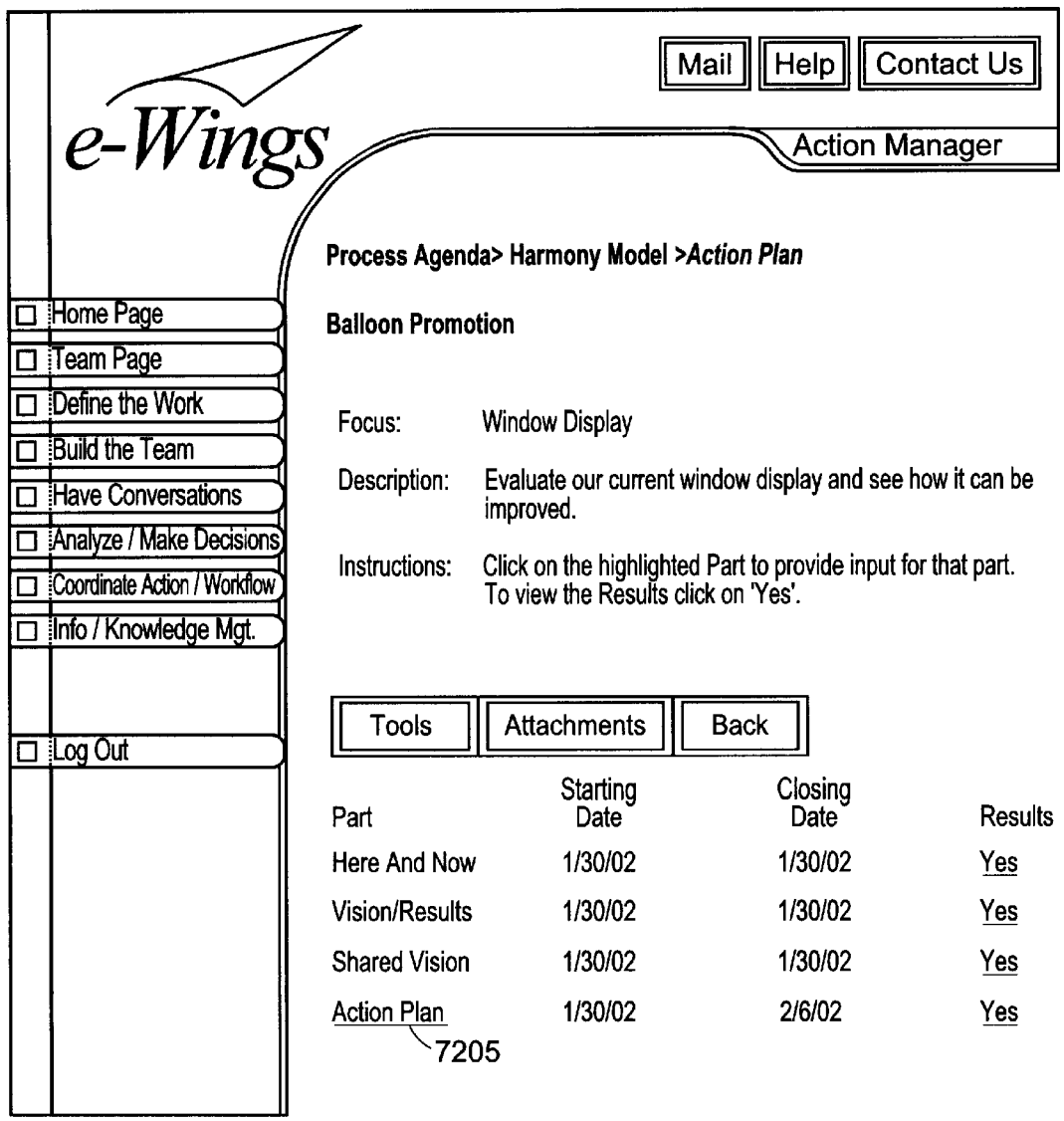
Figure 73:
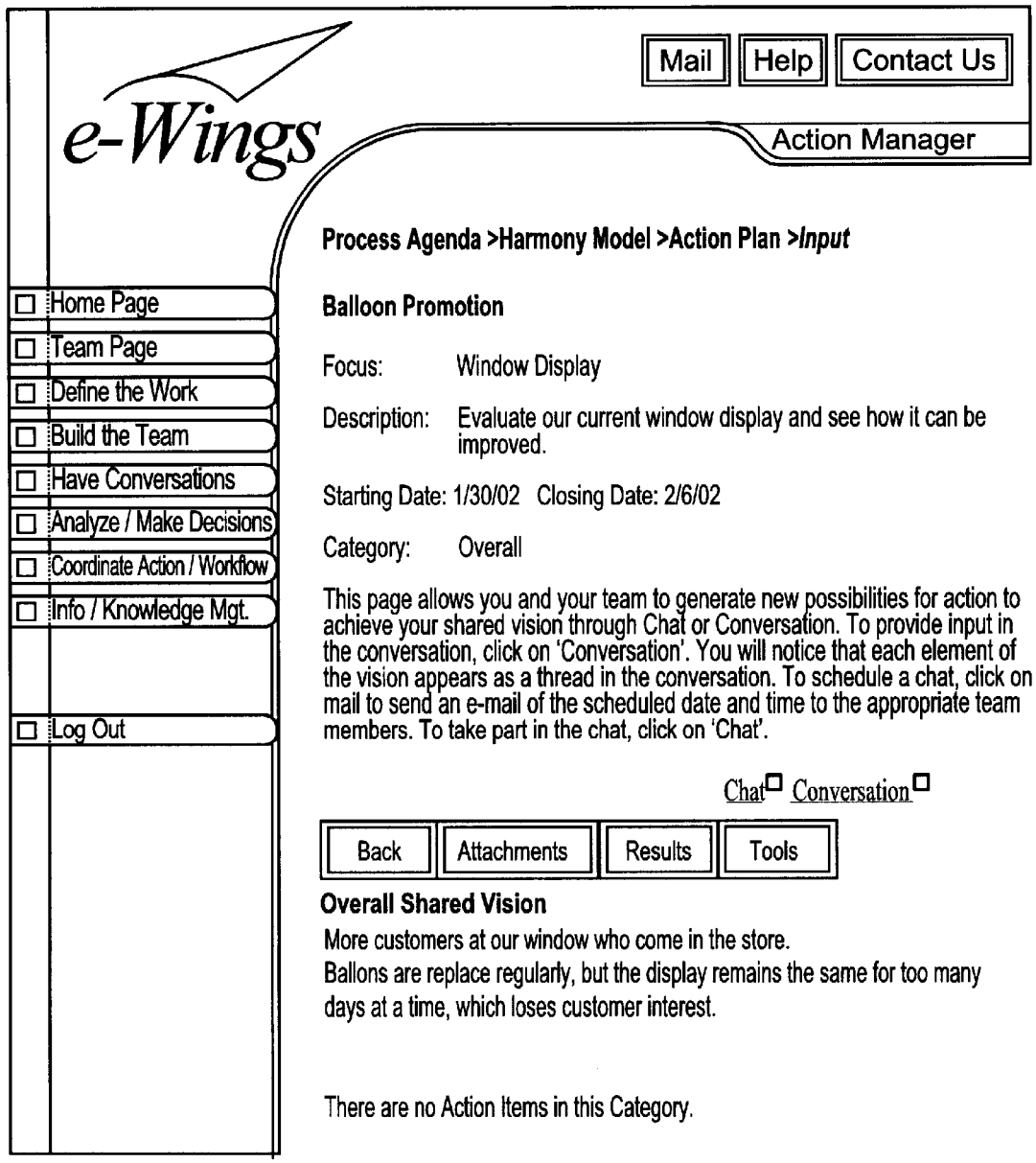

A short while later, Mark Svenson returns once again to the process agenda page and sees that for the balloon displays topic, having a window display focus, the 'harmony model' process has reached part four, which is to define an action plan. Mark Svenson selects the link 7105 to take part in the action plan part of the process. FIG. 72 shows the status of the parts of the 'harmony model' process, where the 'action plan' part, part four, is still active and the other three parts have been completed.

Mark Svenson selects that action plan link 7205 and goes to the associated page. When Mark Svenson gets to the action plan input page, he finds out that there are as of yet no action items in the category. He is also reminded of the overall shared vision of the 'balloon promotion' team for the focus of a window display. Mark Svenson decides that he will take part in a conversation or at least view a conversation regarding the action plan by selecting the 'conversation' link on this page. Selection of the link brings Mark Svenson to the screen shot of FIG. 74, which shows conversations related to the window display that have transpired up until this point. Mark Svenson returns to the previous page, which has a new action item, as shown in FIG. 75.

Figure 75:

In FIG. 75, an action plan table 7500 indicates that, "Mark Svenson has to replace the balloons every Wednesday." This action item was assigned by Cameron Lindstrom in his capacity as facilitator of the 'balloon promotion' team. Apparently, it is estimated that replacing the balloons every Wednesday should work toward keeping the customer interest, which is a shared vision of the 'balloon promotion' team.

Figure 76:

Briefly, to understand how the facilitator, Cameron Lindstrom, assigns an action item to one of the team members, in this case Mark Svenson, a screen shot in FIG. 76 has been provided. In this screen shot, Cameron Lindstrom selects a due date 7605, applies a status 7610, selects a team member to be assigned the action item, and provides a specific action in a text box 7620 to notify Mark Svenson of his assigned action. An email, provided in FIG. 77, is issued to Mark Svenson in case he has not seen the 'action plan' list 7500 (FIG. 75). The facilitator action register-edit page of FIG. 76 is a central point for sending the email and applying the notice in the 'action plan' list 7500 so that the email and list action items are consistent with one another.

FIGS. 78–86 provide examples of how a facilitator, Cameron Lindstrom in this example, might use the interaction collaboration system. FIGS. 2A and 2B provide a map as to the navigation through the Web site that the facilitator will take.

Figure 78:
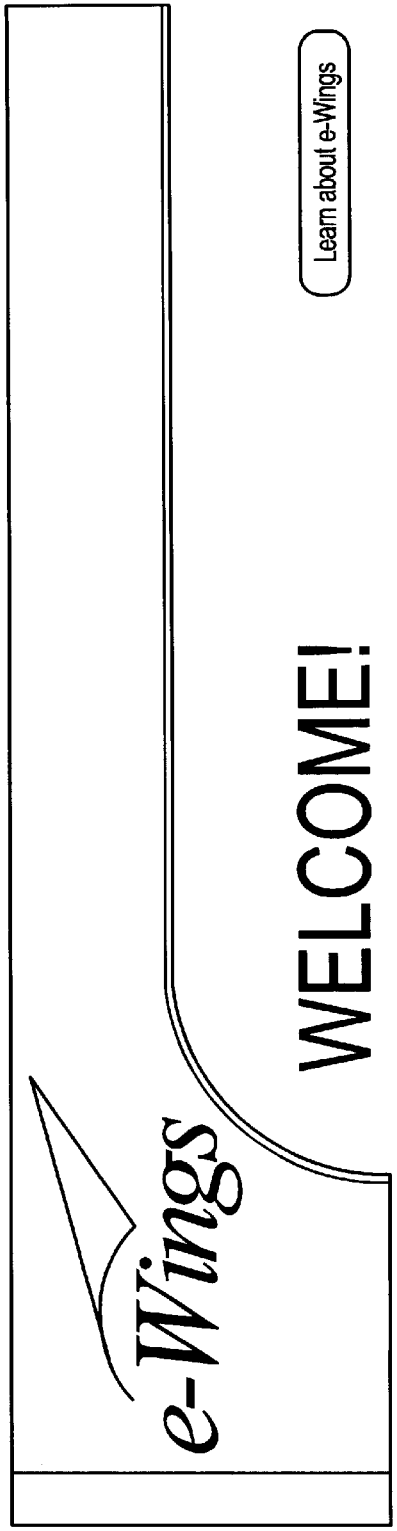

FIG. 78 is the same login page first seen in FIG. 24. Here, Cameron Lindstrom signs in and is authenticated to access the facilitator part of the Web site.

Figure 79:
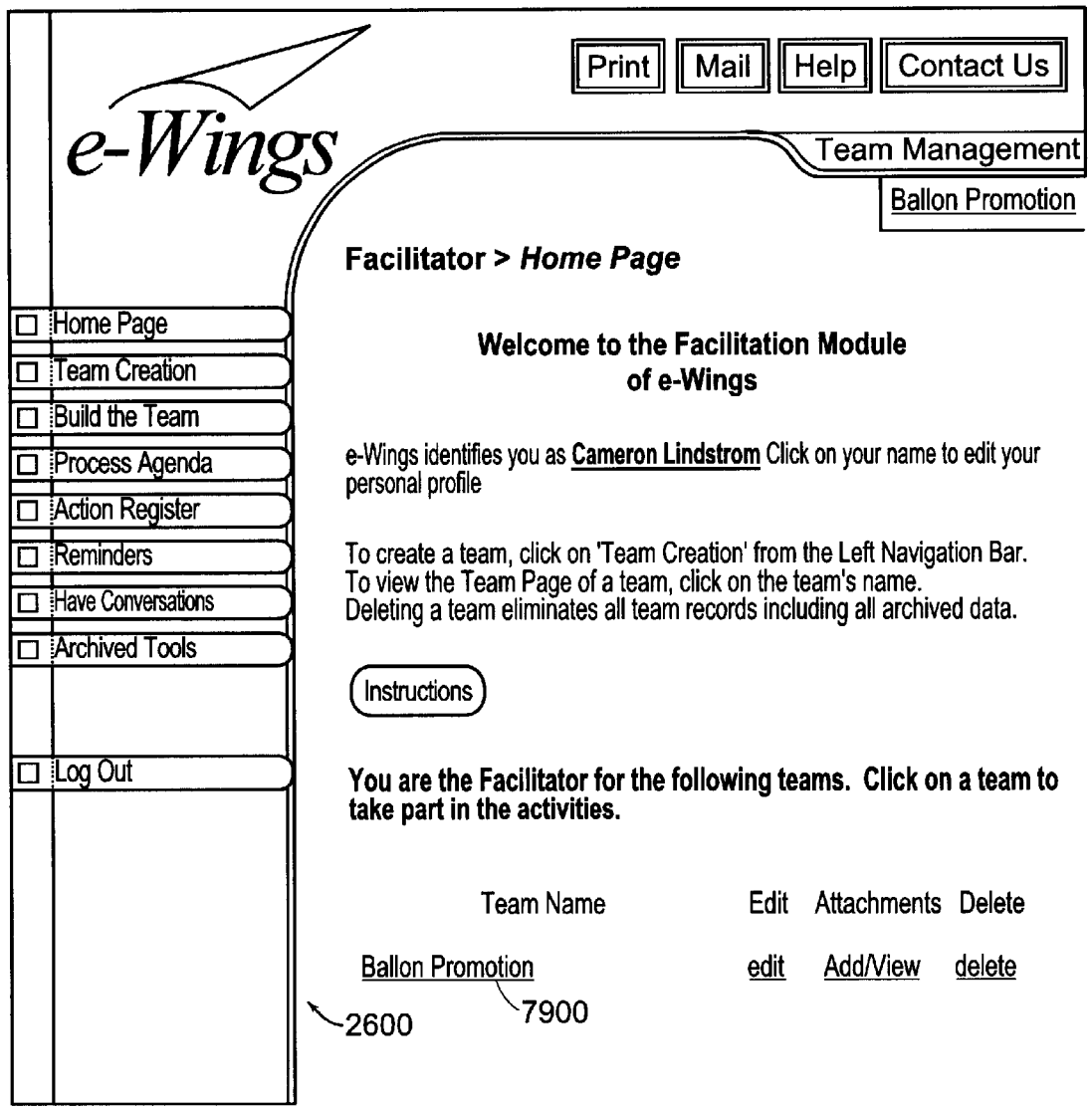

In FIG. 79, Cameron Lindstrom goes to the facilitator home page, supported by the facilitator home page module 210 (FIG. 2A). The facilitator home page also includes a left navigation bar 2600, though the links are different from the links that were provided for the team members because of the facilitators higher permission status. Cameron Lindstrom selects the 'balloon promotion' link 7900 and is sent the associated Web page across the network to his computer 30 (FIG. 1A). A particular embodiment of this Web page is depicted in FIG. 80. Cameron Lindstrom then selects the 'process agenda' link 8005 from the left navigation bar 2600 and is sent to the 'process agenda' page.

FIG. 81 is a particular embodiment of the 'process agenda' page for the facilitator. This page includes both topics from the previous two examples that Mark Svenson had gone through. Based on the process descriptions 8100, both processes are in part one, as discussed above with respect to Mark Svenson's example.

FIGS. 81A and 82B are screen shots of a particular embodiment of a 'harmony model' 'HERE and NOW' edit page. This page includes selectable parameter fields 8200 for the 'HERE and NOW' part of the 'harmony model' process. In particular, the fields 8200 include a focus field 8205, description field 8210, process/tool field 8212—which changes the model being used entirely, causing change of the fields—a starting date field 8215, closing date field 8220, instructions field 8225, user status field 8230, test status field 8235, permissions field 8240, shadow field 8245, left list heading field 8250, right list heading field 8255, "who" list field 8260, 'Here and Now guidelines' field 8265, and 'vision/desired result guideline' field 8270. The facilitator selects inputs for these fields, which should be understood from the teachings above and the team member example of FIGS. 24–77.

Figure 84A:

FIGS. 83A and 83B are screen shots of the facilitator's input pages for the 'significance scan' example. Here, the facilitator provides inputs for the team members in the various input fields, which are self-explanatory based on the discussion of the 'significance scan' process described in reference to FIGS. 29–46. Similarly, FIGS. 84A and 84B are screen shots of the facilitators input page for part two of the 'significance scan' pages provided to the team members. In particular, an email form is provided for the facilitator to generate an email to the team members 15 to notify them that part one of the significance scan is complete, as shown in the body of the email in FIG. 84B.

Figure 85:

FIG. 85 is a screen shot that informs the facilitator, Cameron Lindstrom, that the email has been sent after sending the email from the previous page.

FIG. 86 is the email as received by Mark Svenson resulting from the email sent by the facilitator, Cameron Lindstrom, from the 'significance scan' page notifying of the completion of part one of the significance scan.

In preferred embodiments of this invention, the collaborative software and applications also provide and are adapted to incorporate additional features including chat room, shared white board, discussion groups, knowledge base, audio/video conferencing, scheduling/calendaring and training.

Those of ordinary skill in the art should recognize that methods involved in a Distributed System for Interactive Collaboration may be embodied in a computer program product that includes a computer usable medium. For example, such a computer usable medium can include a readable memory device, such as a solid state memory device, hard drive device, CD-ROM, DVD-ROM, or computer diskette, having stored computer-readable program code segments. The computer readable medium can also include a communications or transmission medium, such as a bus or communications link, either optical, wired, or wireless, carrying program code segments as digital or analog data signals.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments and are not limited to the described environment.

What is claimed is:

1. A method of using a computer network for interactive collaboration, comprising:
    creating a collaborative environment for members of a team in communication with the computer network;
    soliciting input from the team members for a present state of a topic, an end state of the topic, and a process for proceeding from the present state to the end state;
    in the collaborative environment, collecting information from the members of the team in an interactive forum offering varying degrees of structure; and
    facilitating a collaboratively derived decision based on the collected information.

2. The method of claim 1 further including supporting an interactive process having a topic to be considered by the members of the team.

3. The method according to claim 2 further including employing techniques to collect data from the members of the team regarding the topic or process.

4. The method according to claim 3 wherein the techniques include requesting the members to consider at least one option regarding the topic.

5. The method according to claim 3 wherein the data is returned in the form of an absolute metric, relative measure, or free-form input.

6. The method according to claim 2 further including automatically informing members of the team of the topic in an asynchronous manner.

7. The method as claimed in claim 6 further including providing a direct link to the members for responding.

8. The method as claimed in claim 1 further including building the team in a manner that allows a member to be coached on the problem solving process in a manner driven by the team member.

9. An apparatus for interactive collaboration over a computer network, comprising:
    a collaborative environment for members of a team in communication with the computer network;
    a solicitation unit coupled to the collaborative environment that solicits input from the team members for a present state of a topic, an end state of the topic, and a process for proceeding from the present state to the end state; and
    in the collaborative environment, an interactive forum offering varying degrees of structure to collect information from the members of the team that is used to arrive at a collaboratively derived decision.

10. The apparatus as claimed in claim 9 further including an interactive process having a topic to be considered by the members of the team.

11. The apparatus as claimed in claim 10 further including techniques to collect data from the members of the team regarding the topic or process.

12. The apparatus as claimed in claim 11 wherein the techniques request the members to consider at least one option regarding the topic.

13. The apparatus as claimed in claim 11 wherein the data is in the form of an absolute metric, relative measure, or free-form input.

14. The apparatus as claimed in claim 10 further including a generator automatically informing members of the team of the topic in a asynchronous manner.

15. The apparatus as claimed in claim 14 wherein the generator provides a direct link to the members for responding.

16. The apparatus according to claim 9 further including a composer to build the team in a manner that allows a member to be coached on the problem solving process in a manner driven by the team member.

17. An apparatus for interactive collaboration over a computer network, comprising:
   means for creating a collaborative environment for members of a team in communication with the computer network;
   means for soliciting input from the team members for a present state of a topic, an end state of the topic, and a process for proceeding from the present state to the end state; and
   in the collaborative environment, means for providing an interactive forum offering varying degrees of structure for collecting information from the members of the team that is used to arrive at a collaboratively derived decision.

18. The apparatus according to claim 17 further including means for supporting an interactive process having a topic to be considered by the members of the team.

19. The apparatus according to claim 18 further including means for automatically informing members of the team of the topic in an asynchronous manner.

20. The apparatus according to claim 19 further including means for providing a direct link to the members for responding.

21. The apparatus according to claim 17 further including means for collecting data from the members of the team regarding the topic or process.

22. The apparatus according to claim 21 including means for requesting the members to consider at least one option regarding the topic.

23. The apparatus according to claim 21 wherein the data is returned in the form of an absolute metric, relative measure, or free-form input.

24. The apparatus as claimed in claim 17 further including means for building the team in a manner that allows a given team member to be coached on the problem solving process in a manner driven by the given team member.

25. A system for providing interactive collaboration, comprising: an interface coupled to a computer network;
   a processor coupled to the interface that creates a collaborative environment for members of a team in communication with the server over the computer network, the collaborative environment having an interactive forum offering varying degrees of structure to collect information from the members of the team that is used to arrive at a collaboratively derived decision;
   a solicitation unit coupled to the processor that solicits input from the team members for a present state of the topic, an end state of the topic, and a process for proceeding from the present state to the end state; and
   a data store coupled to the processor and storing the information from the members in the interactive forum for later retrieval.

26. The system as claimed in claim 25 further including an interactive process having a topic to be considered by the members of the team.

27. The system as claimed in claim 26 further including a collector associated with the solicitation unit that collects data from the members of the team regarding the topic or process.

28. The system as claimed in claim 27 wherein the collector requests the members to consider at least one option regarding the topic.

29. The system as claimed in claim 27 wherein the data is in the form of an absolute metric, relative measure, or free-form input.

30. The system as claimed in claim 26 further including a generator associated with the solicitation unit automatically informing members of the team of the topic in an asynchronous manner.

31. The system as claimed in claim 30 wherein the generator provides a direct link to the members for responding.

32. The system as claimed in to claim 25 further including a composer associated with the processor to build the team in a manner that allows a given team member to be coached on the problem solving process in a manner driven by the given team member.

* * * * *